US012699458B2

(12) United States Patent (10) Patent No.: US 12,699,458 B2
Rosenberg et al. (45) Date of Patent: **\*Aug. 4, 2026**

(54) HUMAN-COMPUTER INTERFACE SYSTEM

(71) Applicant: Cirque Corporation, Sandy, UT (US)

(72) Inventors: Ilya Daniel Rosenberg, Sunnyvale, CA
(US); John Aaron Zarraga, Sunnyvale,
CA (US); Shuangming Li, Sunnyvale,
CA (US); Ninad Sathe, Sunnyvale, CA
(US); Darren Lochun, Sunnyvale, CA
(US)

(73) Assignee: Cirque Corporation, Sandy, UT (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/936,520

(22) Filed: Nov. 4, 2024

(65) Prior Publication Data

US 2025/0123689 A1      Apr. 17, 2025

Related U.S. Application Data

(63) Continuation of application No. 18/207,603, filed on
Jun. 8, 2023, now Pat. No. 12,164,690, which is a
continuation-in-part of application No. 18/204,818,
filed on Jun. 1, 2023, now Pat. No. 12,299,200, and a
continuation-in-part of application No. 18/099,698,
filed on Jan. 20, 2023, now Pat. No. 12,050,748, said
application No. 18/204,818 is a continuation of (Continued)

(51) Int. Cl.
*G06F 3/01* (2006.01)
*G06F 3/041* (2006.01)
*G06F 3/045* (2006.01)

(52) U.S. Cl.
CPC ........... *G06F 3/016* (2013.01); *G06F 3/0416*
(2013.01); *G06F 3/045* (2013.01); *G06F*
*2203/04105* (2013.01)

(58) Field of Classification Search
CPC ........ G06F 3/016; G06F 3/0416; G06F 3/045;
G06F 2203/04105; G06F 1/1616; G06F
1/1662; G06F 1/169; G06F 1/1692; G06F
3/03547; G06F 3/04144; G06F 3/04886
See application file for complete search history.

(56) References Cited

U.S. PATENT DOCUMENTS 10,402,000 B2 * 9/2019 Jamshidi-Roudbari ......................
G06F 3/0447
10,459,542 B1 * 10/2019 Costante ................ H05K 7/142
(Continued)

*Primary Examiner* — Ibrahim A Khan

(57) ABSTRACT

One variation of a system for a touch sensor includes: a
substrate; a cover layer; a spacer element; a second elec-
trode; and a controller. The substrate includes: a support
location arranged on the substrate; and a first electrode
arranged proximal the support location. The cover layer
defines a touch sensor surface arranged over the substrate.
The spacer element: is coupled to the substrate at the support
location; and yields to displacement of the substrate down-
ward responsive to forces applied to the touch sensor
surface. The second electrode: is arranged opposite the first
electrode to define a nominal gap; and is configured to effect
electrical values of the first electrode responsive to displace-
ment of the substrate. The controller is configured to: read a
set of electrical values from the first sense electrode; and
interpret a first force magnitude of a first touch input based
on the set of electrical values.

17 Claims, 27 Drawing Sheets

Related U.S. Application Data application No. 17/855,747, filed on Jun. 30, 2022, now Pat. No. 11,703,950, said application No. 18/099,698 is a continuation of application No. 17/669,209, filed on Feb. 10, 2022, now Pat. No. 11,592,935, said application No. 17/855,747 is a continuation of application No. 17/367,572, filed on Jul. 5, 2021, now Pat. No. 11,422,631, said application No. 17/669,209 is a continuation of application No. 17/191,636, filed on Mar. 3, 2021, now Pat. No. 11,281,330, said application No. 17/367,572 is a continuation-in-part of application No. 17/092,002, filed on Nov. 6, 2020, now Pat. No. 11,360,563, which is a continuation of application No. 16/297, 426, filed on Mar. 8, 2019, now Pat. No. 10,866,642, which is a continuation-in-part of application No. 15/845,751, filed on Dec. 18, 2017, now Pat. No. 10,564,839, which is a continuation-in-part of application No. 15/476,732, filed on Mar. 31, 2017, now Pat. No. 10,331,265.

(60) Provisional application No. 63/350,327, filed on Jun. 8, 2022, provisional application No. 63/063,168, filed on Aug. 7, 2020, provisional application No. 63/048,071, filed on Jul. 3, 2020, provisional application No. 63/040,433, filed on Jun. 17, 2020, provisional application No. 62/984,448, filed on Mar. 3, 2020, provisional application No. 62/640,138, filed on Mar. 8, 2018, provisional application No. 62/343,453, filed on May 31, 2016, provisional application No. 62/316,417, filed on Mar. 31, 2016.

(56) References Cited

U.S. PATENT DOCUMENTS

| | | | | |
|---|---|---|---|---|
| 11,127,547 | B1 * | 9/2021 | Wang | G06F 1/1684 |
| 12,099,667 | B1 * | 9/2024 | Zannier | G06F 3/044 |
| 2008/0202251 | A1 * | 8/2008 | Serban | H03K 17/962 |
| | | | | 29/25.03 |
| 2009/0002328 | A1 * | 1/2009 | Ullrich | G09B 21/004 |
| | | | | 345/173 |
| 2009/0091548 | A1 * | 4/2009 | Fujii | G06F 3/045 |
| | | | | 345/173 |
| 2010/0156818 | A1 * | 6/2010 | Burrough | G06F 3/04883 |
| | | | | 345/173 |
| 2010/0253633 | A1 * | 10/2010 | Nakayama | G06F 3/03547 |
| | | | | 345/169 |
| 2011/0025631 | A1 * | 2/2011 | Han | G06F 3/0445 |
| | | | | 345/173 |
| 2011/0141052 | A1 * | 6/2011 | Bernstein | G06F 3/041 |
| | | | | 341/5 |
| 2011/0175845 | A1 * | 7/2011 | Honda | G06F 3/0447 |
| | | | | 345/174 |
| 2012/0068938 | A1 * | 3/2012 | Kontio | G06F 3/03547 |
| | | | | 345/173 |
| 2012/0068971 | A1 * | 3/2012 | Pemberton-Pigott | |
| | | | | G06F 3/0416 |
| | | | | 345/175 |
| 2012/0188194 | A1 * | 7/2012 | Sulem | G06F 1/1643 |
| | | | | 345/174 |
| 2012/0293450 | A1 * | 11/2012 | Dietz | G06F 3/04144 |
| | | | | 178/18.05 |
| 2013/0187742 | A1 * | 7/2013 | Porter | G06F 3/046 |
| | | | | 336/200 |
| 2013/0194210 | A1 * | 8/2013 | Pfau | G06F 3/016 |
| | | | | 345/173 |
| 2013/0264179 | A1 * | 10/2013 | Ryonai | G06F 3/041 |
| | | | | 200/269 |
| 2014/0002113 | A1 * | 1/2014 | Schediwy | G06F 3/0446 |
| | | | | 324/661 |
| 2014/0085213 | A1 * | 3/2014 | Huppi | G06F 3/0445 |
| | | | | 345/82 |
| 2014/0247239 | A1 * | 9/2014 | Jamshidi-Roudbari | |
| | | | | G06F 3/0447 |
| | | | | 345/174 |
| 2014/0253305 | A1 * | 9/2014 | Rosenberg | G01L 1/22 |
| | | | | 345/174 |
| 2016/0033342 | A1 * | 2/2016 | Lyon | G01L 1/142 |
| | | | | 73/862.626 |
| 2016/0209441 | A1 * | 7/2016 | Mazzeo | G06F 3/0447 |
| 2017/0052616 | A1 * | 2/2017 | Lin | G06F 3/044 |
| 2017/0076885 | A1 * | 3/2017 | Stryker | G06F 3/0393 |
| 2017/0102809 | A1 * | 4/2017 | Son | G06F 3/0412 |
| 2017/0249031 | A1 * | 8/2017 | Jiang | G06F 3/0412 |
| 2017/0285848 | A1 * | 10/2017 | Rosenberg | G06F 3/04883 |
| 2017/0336904 | A1 * | 11/2017 | Hsieh | G06F 3/0412 |
| 2018/0039351 | A1 * | 2/2018 | Zhu | G06F 3/0443 |
| 2018/0081479 | A1 * | 3/2018 | Kravets | G06F 1/1637 |
| 2019/0212842 | A1 * | 7/2019 | Hinson | H04M 1/02 |
| 2019/0339776 | A1 * | 11/2019 | Rosenberg | G06F 3/045 |
| 2021/0109615 | A1 * | 4/2021 | Hu | G06F 3/045 |
| 2021/0278293 | A1 * | 9/2021 | Kinokuni | G06F 3/0447 |

* cited by examiner

100

150, "first polarity"      172      102, 170      150, "second polarity"      172

S      N

N      S

| N | S |
|---|---|
| S | N |

F₁

F₂

| N | S |
|---|---|
| S | N |

181      182      192      181   182      192

100

F₁      150, "first polarity"      172      102, 170      150, "second polarity"      172

S      S      N      N

N      N      S      S

| N |   | N |
|---|---|---|
| S |   | S |

| N |   | N |
|---|---|---|
| S |   | S |

F₂

182      181      192      182      181      192

"GAP"

100

(COMPUTING DEVICE)

112

192    174  181    102    105

100

112

"KEYBOARD REGION"

"TRACKPAD REGION"

HUMAN-COMPUTER INTERFACE SYSTEM

CROSS-REFERENCE TO RELATED APPLICATIONS

This application is a continuation of U.S. patent application Ser. No. 18/207,603, which claims the benefit of U.S. Provisional Patent Application No. 63/350,327, filed on 8 Jun. 2022, each of which is incorporated in its entirety by this reference.

U.S. patent application Ser. No. 18/207,603 is also a continuation-in-part application of U.S. patent application Ser. No. 18/204,818, filed on 1 Jun. 2023, which is a continuation of U.S. patent application Ser. No. 17/855,747, filed on 30 Jun. 2022, which is a continuation of U.S. patent application Ser. No. 17/367,572, filed on 5 Jul. 2021, which claims priority to U.S. Provisional Application No. 63/048,071, filed on 3 Jul. 2020, which is incorporated in its entirety by this reference.

U.S. patent application Ser. No. 17/367,572 is also a continuation-in-part application of U.S. patent application Ser. No. 17/092,002, filed on 6 Nov. 2020, which is a continuation application of U.S. patent application Ser. No. 16/297,426, filed on 8 Mar. 2019, which claims the benefit of U.S. Provisional Application No. 62/640,138, filed on 8 Mar. 2018, each of which is incorporated in its entirety by this reference.

U.S. patent application Ser. No. 16/297,426 is also a continuation-in-part application of U.S. patent application Ser. No. 15/845,751, filed on 18 Dec. 2017, which is a continuation-in-part application of U.S. patent application Ser. No. 15/476,732, filed on 31 Mar 2017, which claims the benefit of U.S. Provisional Application No. 62/316,417, filed on 31 Mar. 2016, and U.S. Provisional Application No. 62/343,453, filed on 31 May 2016, each of which is incorporated in its entirety by this reference.

U.S. patent application Ser. No. 18/207,603 is also a continuation-in-part application of U.S. patent application Ser. No. 18/099,698, filed on 20 Jan. 2023, which is a continuation of U.S. Non-Provisional patent application Ser. No. 17/669,209, filed on 10-FEB-2022, which is a continuation of U.S. Non-Provisional patent application Ser. No. 17/191,636, filed on 3 Mar. 2021, and claims the benefit of U.S. Provisional Patent Application Nos. 62/984,448, filed on 3 Mar. 2020, 63/040,433, filed on 17 Jun. 2020, and 63/063,168, filed on 7 Aug. 2020, each of which is incorporated in its entirety by this reference.

TECHNICAL FIELD

This invention relates generally to the field of touch sensors and more specifically to a new and useful human-computer interface system in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 22:
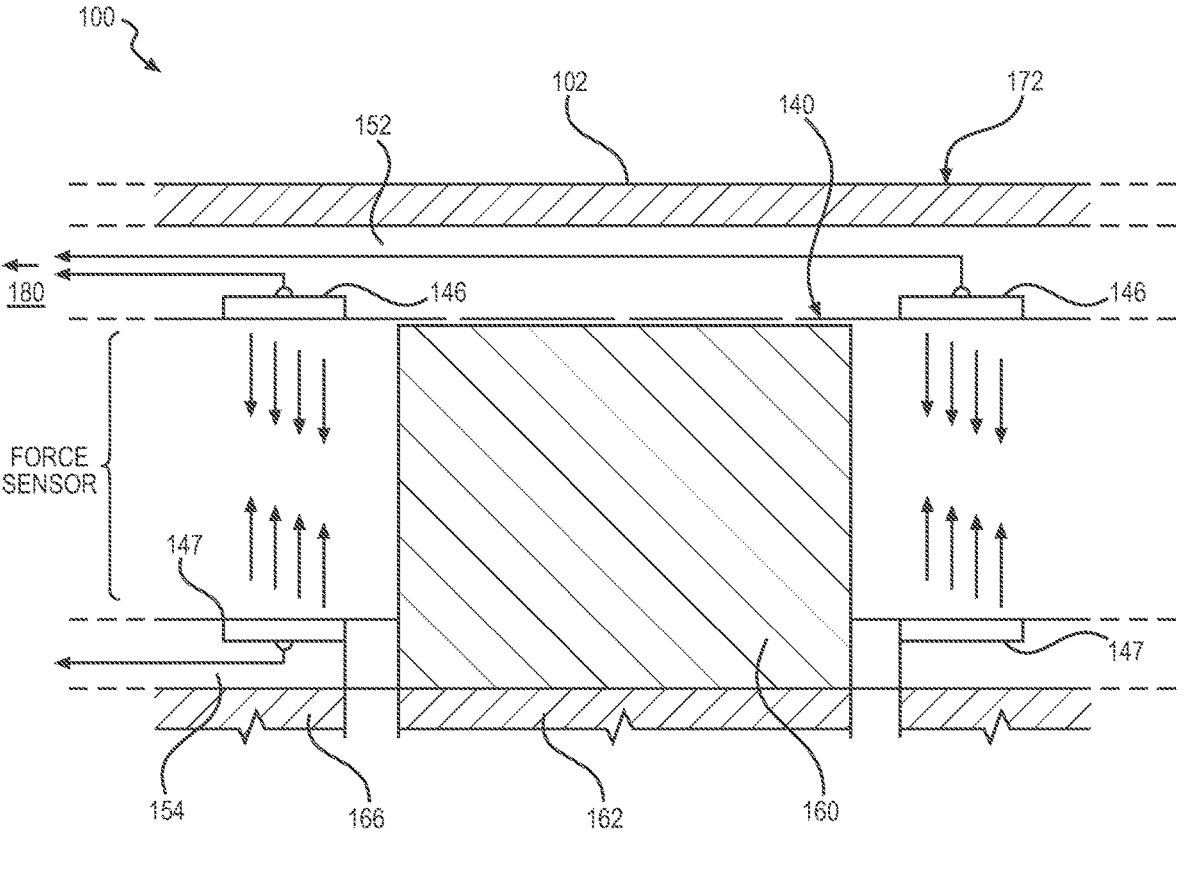
FIG. 22 is a schematic representation of one variation of the system.
Figure 23A:
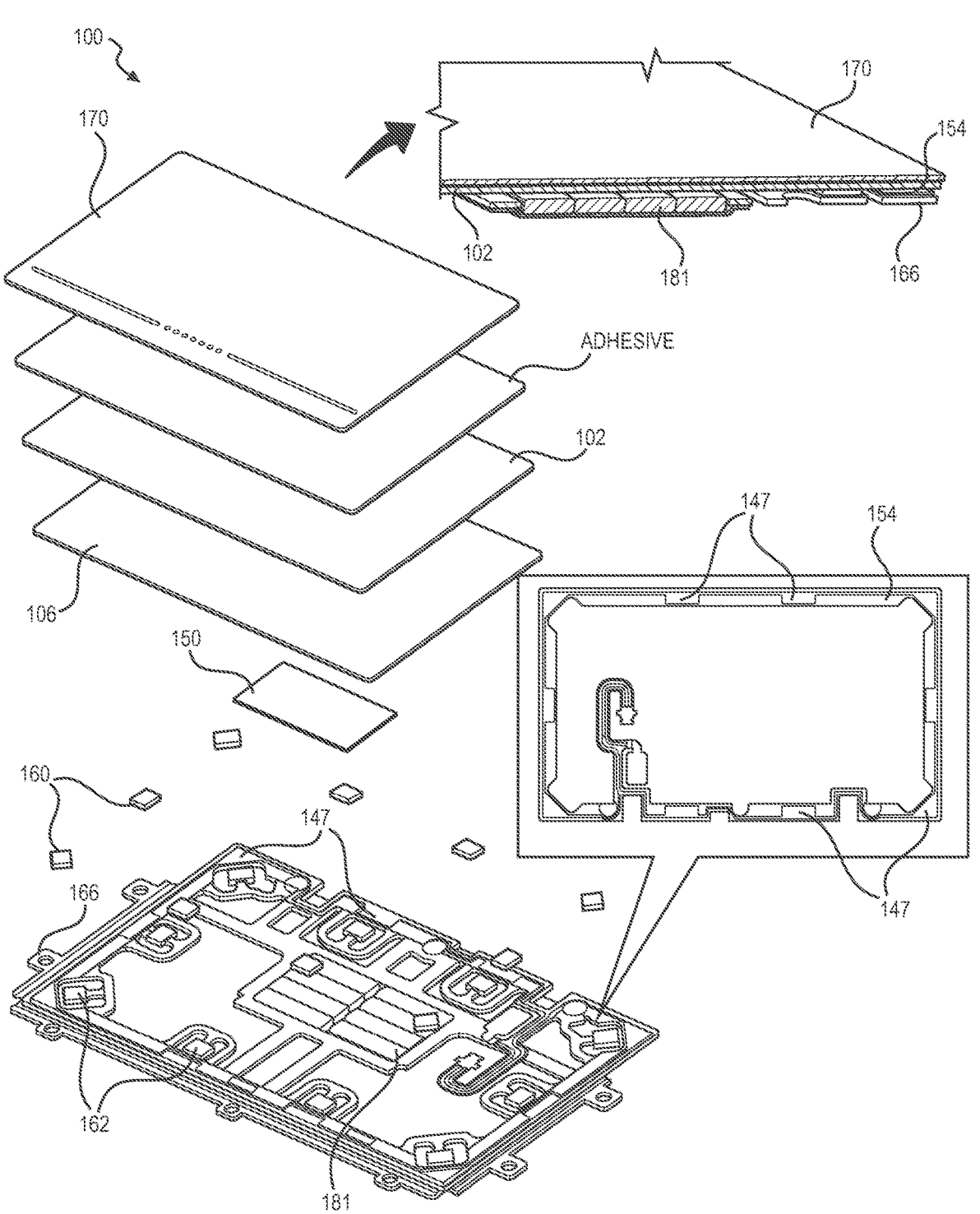
FIGS. 23A and 23B is a schematic representation of one variation of the system.
Figure 23B:
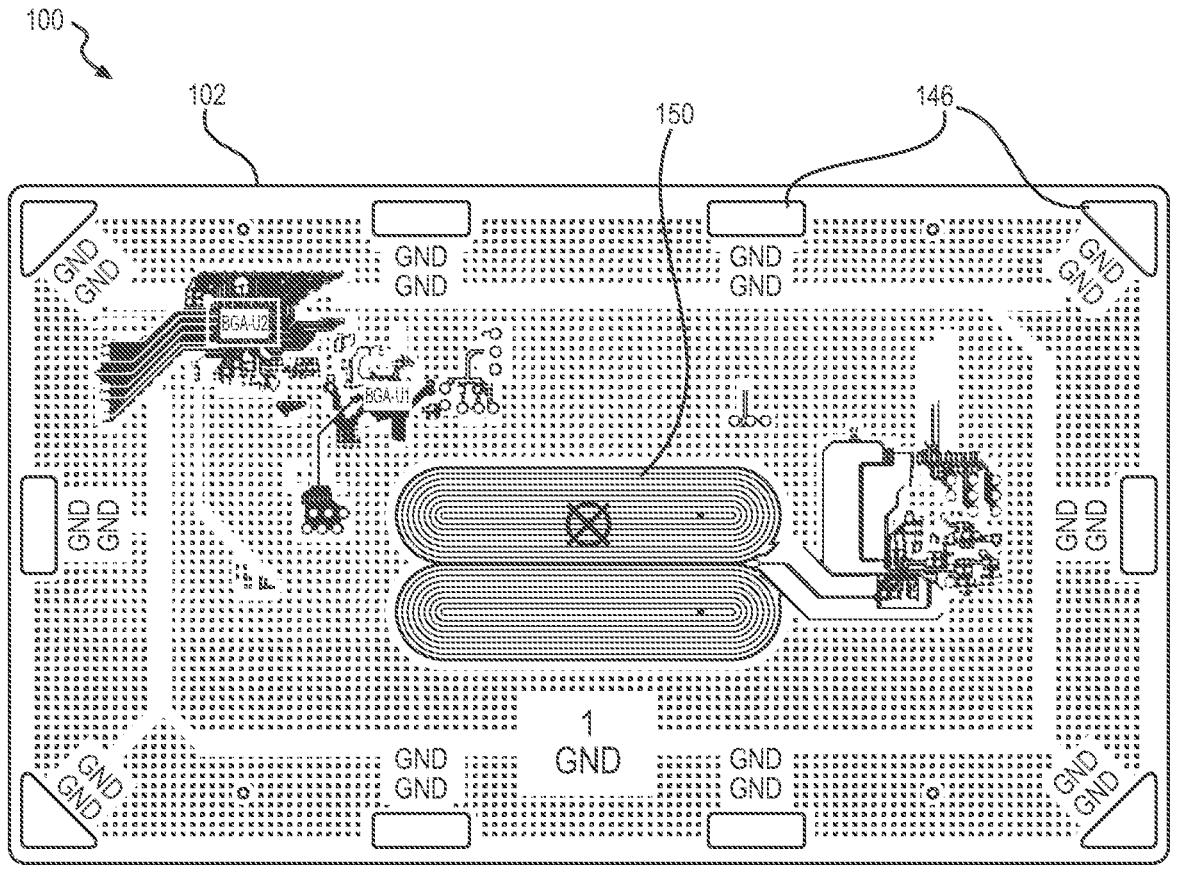
Figure 24A:
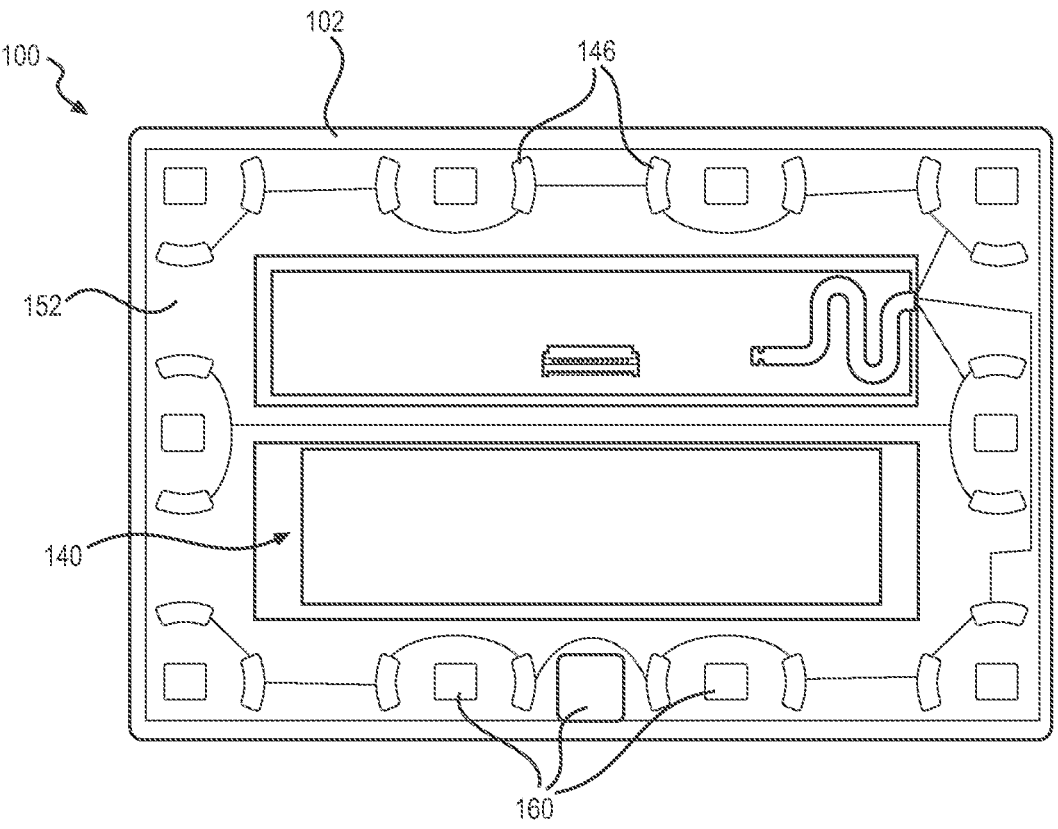
FIGS. 24A and 24B are schematic representations of one variation of the system.
Figure 24B:
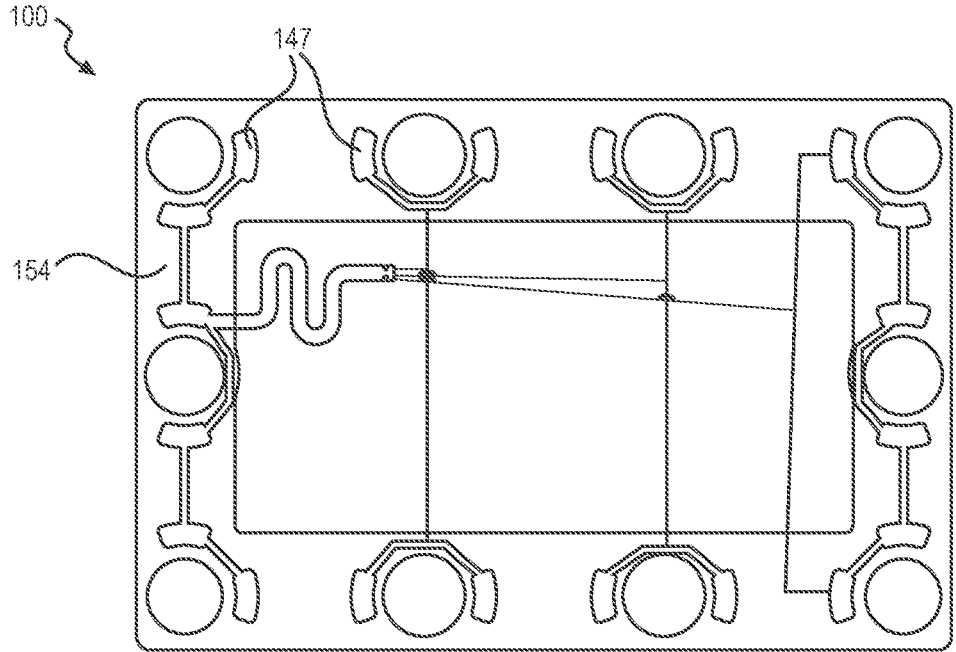
Figure 25A:
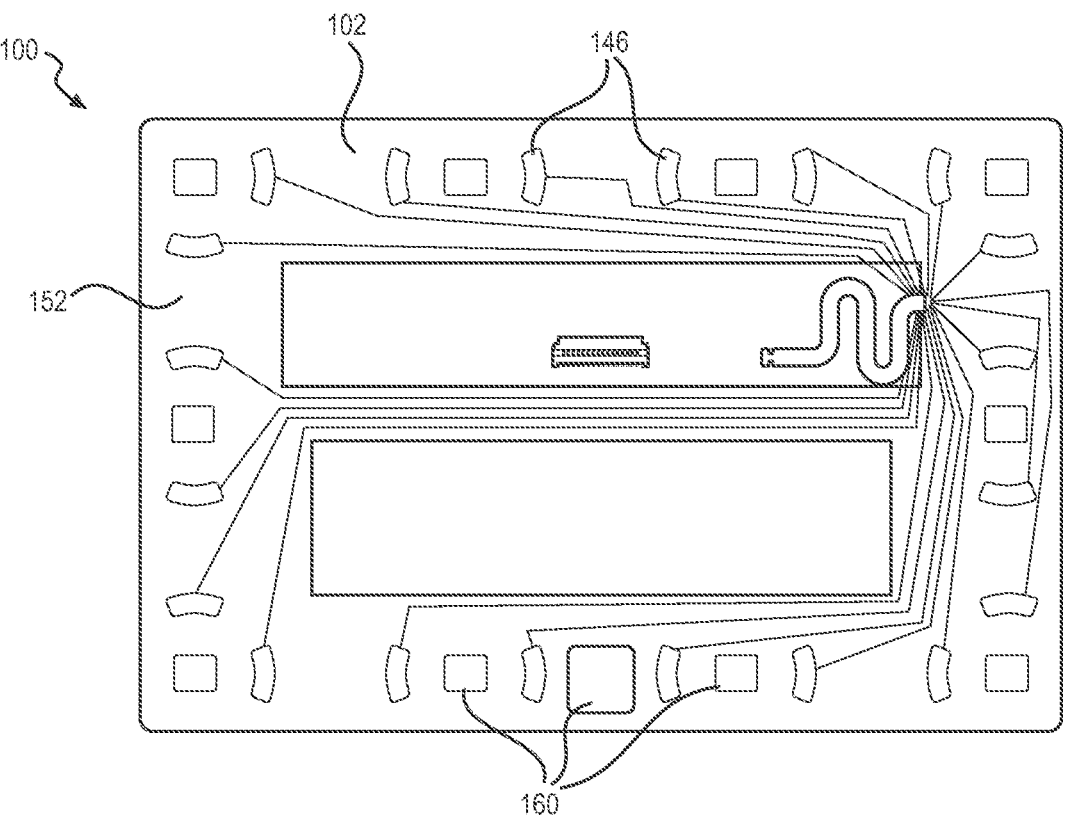
FIGS. 25A and 25B are schematic representations of one variation of the system.
Figure 25B:
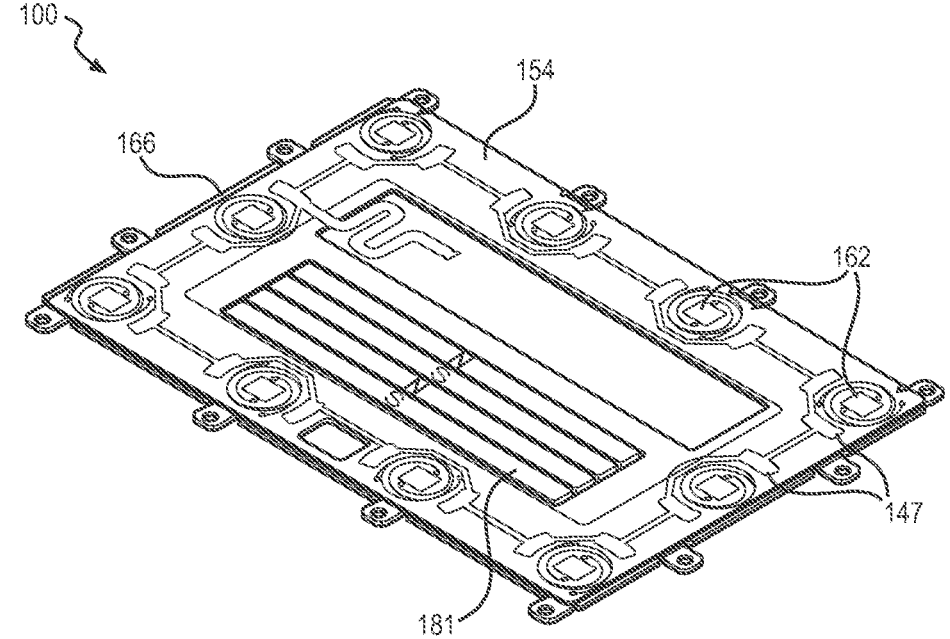
Figure 26:
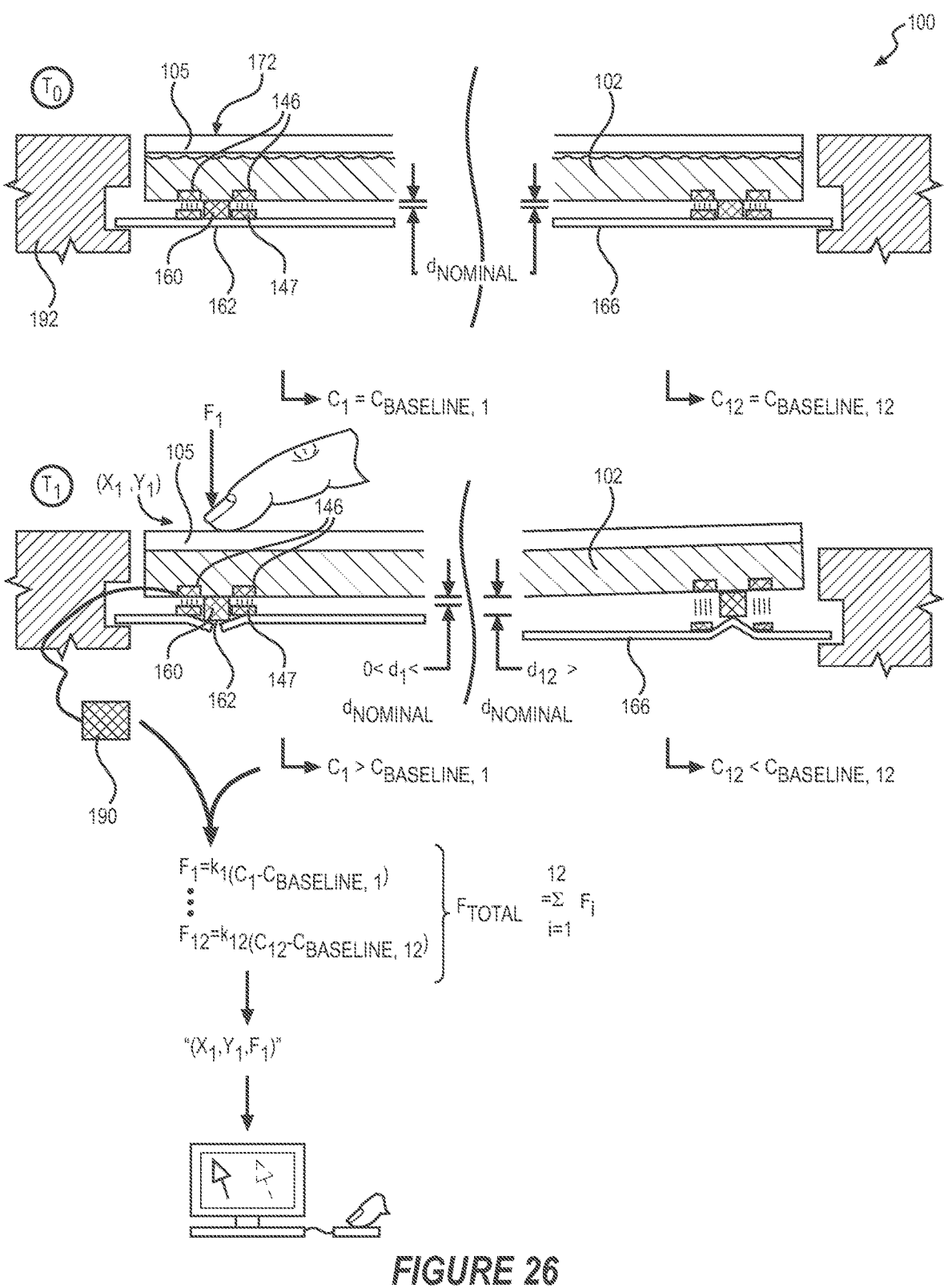
FIG. 26 is a flowchart representation of one variation of the system.
Figure 27A:
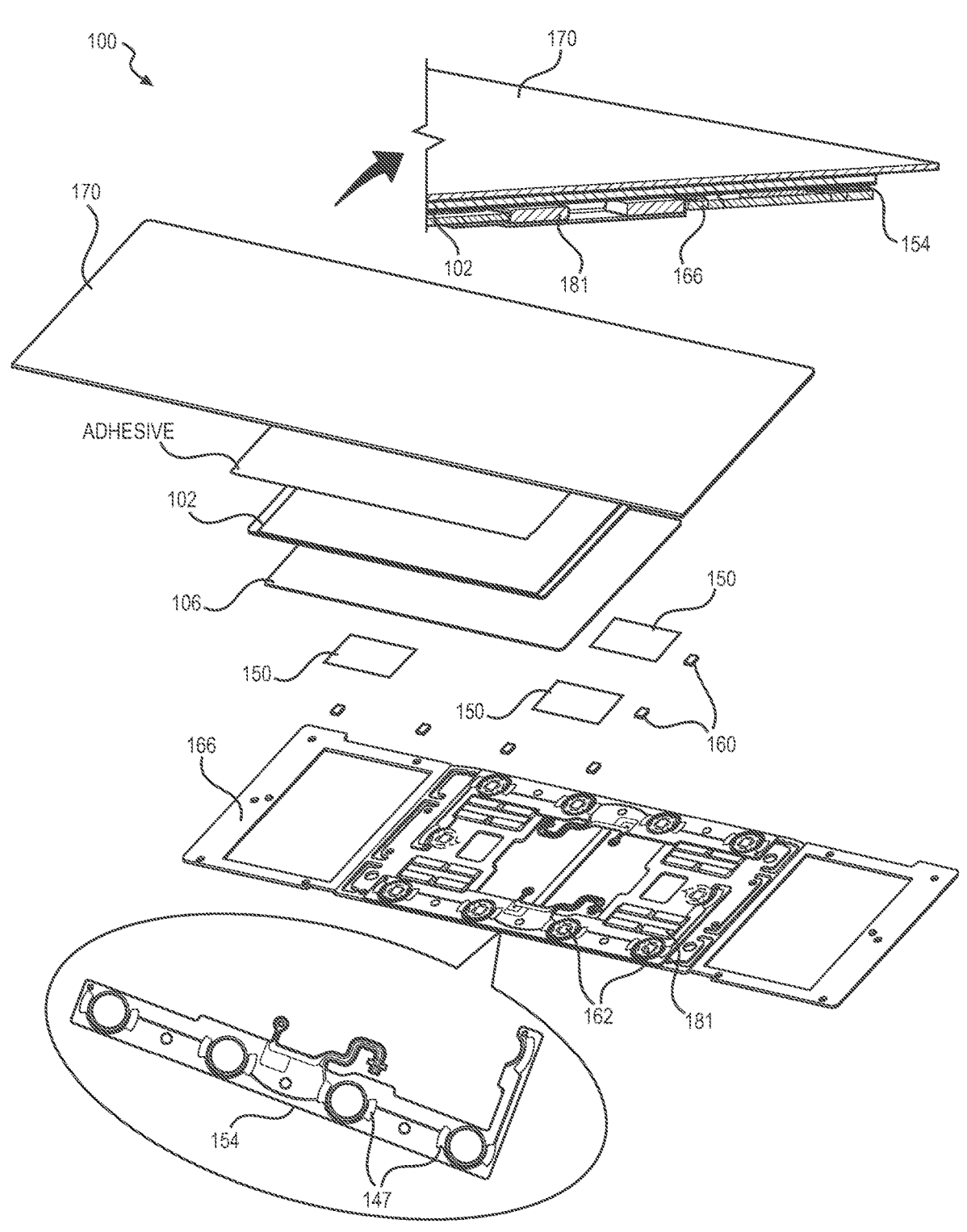
FIGS. 27A and 27B are schematic representations of one variation of the system.
Figure 27B:
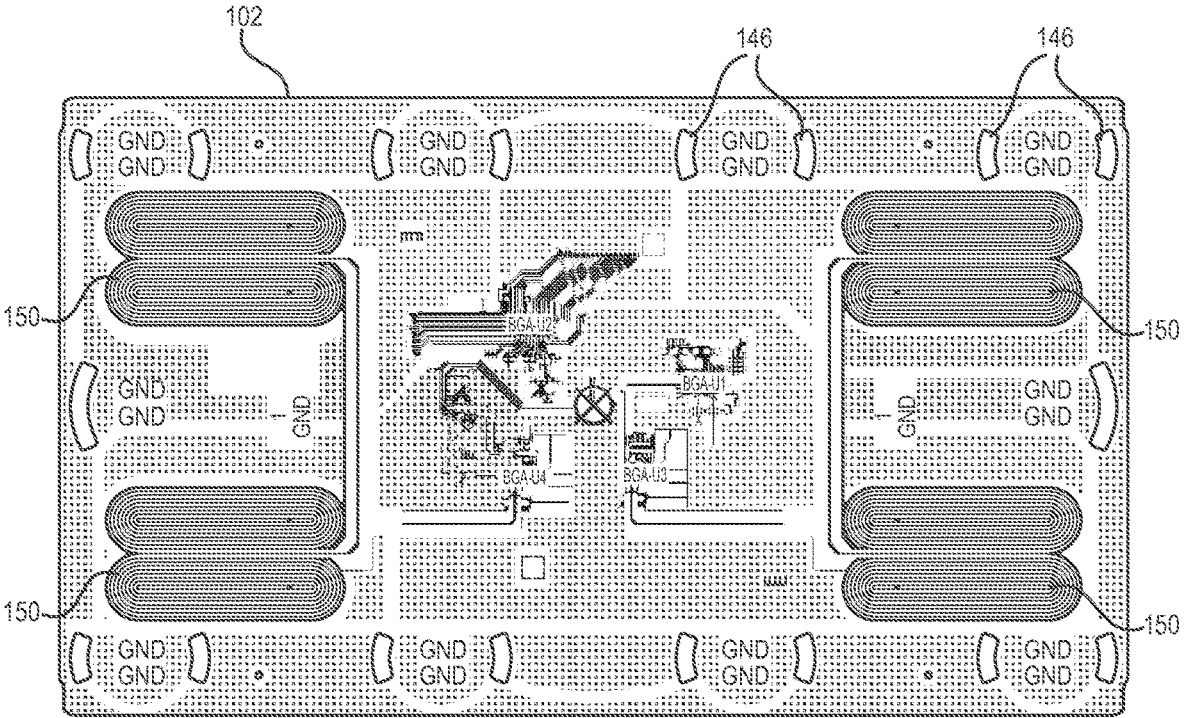

As shown in FIG. 22, a system 100 for a touch sensor includes: a substrate 102 including a first electrode 146; a cover layer 170; a first spacer element 160; a second electrode 147; and a controller 190.

The substrate 102 includes: a first support location arranged proximal a lateral edge of the substrate 102; and a first electrode 146 (e.g., sense electrode) arranged proximal the first support location.

The cover layer 170 defines a touch sensor surface 172 arranged over the substrate 102.

The first spacer element 160: is coupled to the substrate 102 at the first support location; and is configured to couple the substrate 102 to a baseplate 166 and to yield to (i.e., "elastically deform in response to") displacement of the substrate 102 relative the baseplate 166 responsive to forces applied to the touch sensor surface 172.

The second electrode 147 (e.g., drive electrode) is: arranged below the substrate 102 and opposite the first electrode 146 to define a nominal gap between the first electrode 146 and the second electrode 147; and configured to effect electrical values of the first electrode 146 responsive to displacement of the first electrode 146 toward the second electrode 147.

The controller 190 is configured to: detect a first touch input at a first location on the touch sensor surface 172; read a set of electrical values from the first electrode 146; and interpret a first force magnitude of the first touch input based on the set of electrical values.

2. Applications

Generally, the system 100 defines a force sensor for a human-computer interface and includes: a baseplate 166 mounted to a chassis 192 of a computing device, facing and offset from the bottom layer 140 of the substrate 102, and extending proximal the set of spring elements 162; a first set of electrodes 146 (e.g., sense electrodes) arranged across a bottom layer 140 of the substrate 102; and a second set of electrodes 147 (e.g., drive electrodes) arranged across a top layer 104 of the baseplate 166 facing and offset from the bottom layer 140 of the substrate 102 and configured to capacitively couple the first set of electrodes 146 arranged on the substrate 102, and thereby defining an array of capacitance force sensors exhibiting changes in capacitance values (e.g., charge times, discharge times, or RC-circuit resonant frequencies) as a function of their distances from the substrate 102.

The system 100 further includes the set of spring elements 162: vertically supporting the substrate 102—proximal the second set of electrodes 147 (e.g., drive electrodes)—against the baseplate 166; and yielding (e.g., displace from a nominal plane) to a force applied to the touch sensor surface 172, thereby enabling the substrate 102 to move toward the baseplate 166, which changes the capacitance values between respective drive electrodes on the baseplate 166 and sense electrodes on the substrate 102 proportional to changes in distance between the substrate 102 and the baseplate 166.

Additionally, the system 100 includes a controller 190 configured to execute scan cycles in order to interpret forces and touch inputs applied to the touch sensor surface 172. During these scan cycles, the controller 190 can apply voltage (e.g., 6 volts) across the second set of electrodes 147 (e.g., drive electrodes) arranged at the baseplate 166 to induce capacitive coupling of the second set of electrodes 147 (e.g., drive electrodes) to the first set of electrodes 146 (e.g., sense electrodes) across the substrate 102. By inducing a relatively low drive voltage across the second set of electrodes 147 (e.g., drive electrodes) the system 100 can: reduce power consumption during execution of scan cycles; and maintain a low signal-to-noise ratio of capacitance values read from the first set of electrodes 146 (e.g., sense electrodes) across the substrate 102. The controller 190 can then: calculate a change in distance between a pair of sense and drive electrodes—that form a capacitive force sensor—in the second set of electrodes 147 based on a change in capacitance value read from this pair of sense and drive electrodes from a stored baseline capacitance value of these sense and drive electrodes; and calculate a force carried by the spring element adjacent this pair of sense and drive electrodes based on a stored spring constant of the spring element.

Furthermore, the controller 190 can: calculate a total force applied to the touch sensor surface 172 based on forces carried by each spring element; and/or fuse forces carried by each spring element with input locations detected via the capacitive touch sensor to estimate the force applied by individual touch inputs on the touch sensor surface 172.

2.1 Example: Force Flex Layer

In one example, the system 100 can include: a first force flex layer 152, such as formed of flexible polyethylene terephthalate (or "PET") arranged (e.g., bonded to) a bottom surface of the substrate 102; and including the first set of electrodes 146 (e.g., sense electrodes) arranged (e.g., printed) across the first force flex layer 152. In this example, when the first force flex layer 152 is coupled to the bottom surface of the substrate 102, each electrode, in the first set of electrodes 146: is oriented (e.g., encircles) a support location defined on the bottom surface of the substrate 102; and is connected to a tail extending from the first force flex layer 152 that connects the first set of electrodes 146 (e.g., sense electrodes) to a controller 190 (e.g., external controller 190 or controller 190 on substrate 102 via SMT).

Similarly, the system 100 can include: a second force flex layer 154 (e.g., flexible PET layer) arranged (e.g., bonded to) a top surface of the baseplate 166 arranged opposite the substrate 102; and including the second set of electrodes 147 (e.g., drive electrodes) arranged (e.g., printed) across the second force flex layer 154. In this example, the first force flex layer 152: is arranged parallel and offset the second force flex layer 154 to align the first set of electrodes 146 with the second set of electrodes 147 across the second force flex layer 154; and cooperates with the second force flex layer 154 to define an array of force sensors arranged below the touch sensor surface 172. Additionally, the second force flex layer 154 can tail: electrically connected to the second set of electrodes 147 (e.g., drive electrodes); and coupling the second set of electrodes 147 (e.g., drive electrodes) to the controller 190 (e.g., external controller 190).

Accordingly, the system 100 can thus: drive the second set of electrodes 147 (e.g., drive electrodes) to induce capacitive coupling between the first set of electrodes 146 (e.g., sense electrodes) and the second set of electrodes 147 (e.g., drive electrodes); read a first set of electrical values (e.g., capacitance values) from the first set of electrodes 146 (e.g., sense electrodes); and transform the first set of electrical values to a force magnitude applied on the touch sensor surface 172.

Therefore, the system 100 can: receive application of a load on the touch sensor surface 172 resulting in vertical displacement of the substrate 102 including the first force flex layer 152 toward the second force flex layer 154 facing the first force flex layer 152; induce a first change in electrical values across an array of force sensors defined by the first force flex layer 152 and the second force flex layer 154; read the electrical values from the array of force sensors; and interpret force magnitudes applied at the touch sensor surface 172 based on the set of electrical values from the array of force sensors.

3. Substrate and Touch Sensor

Figure 6:
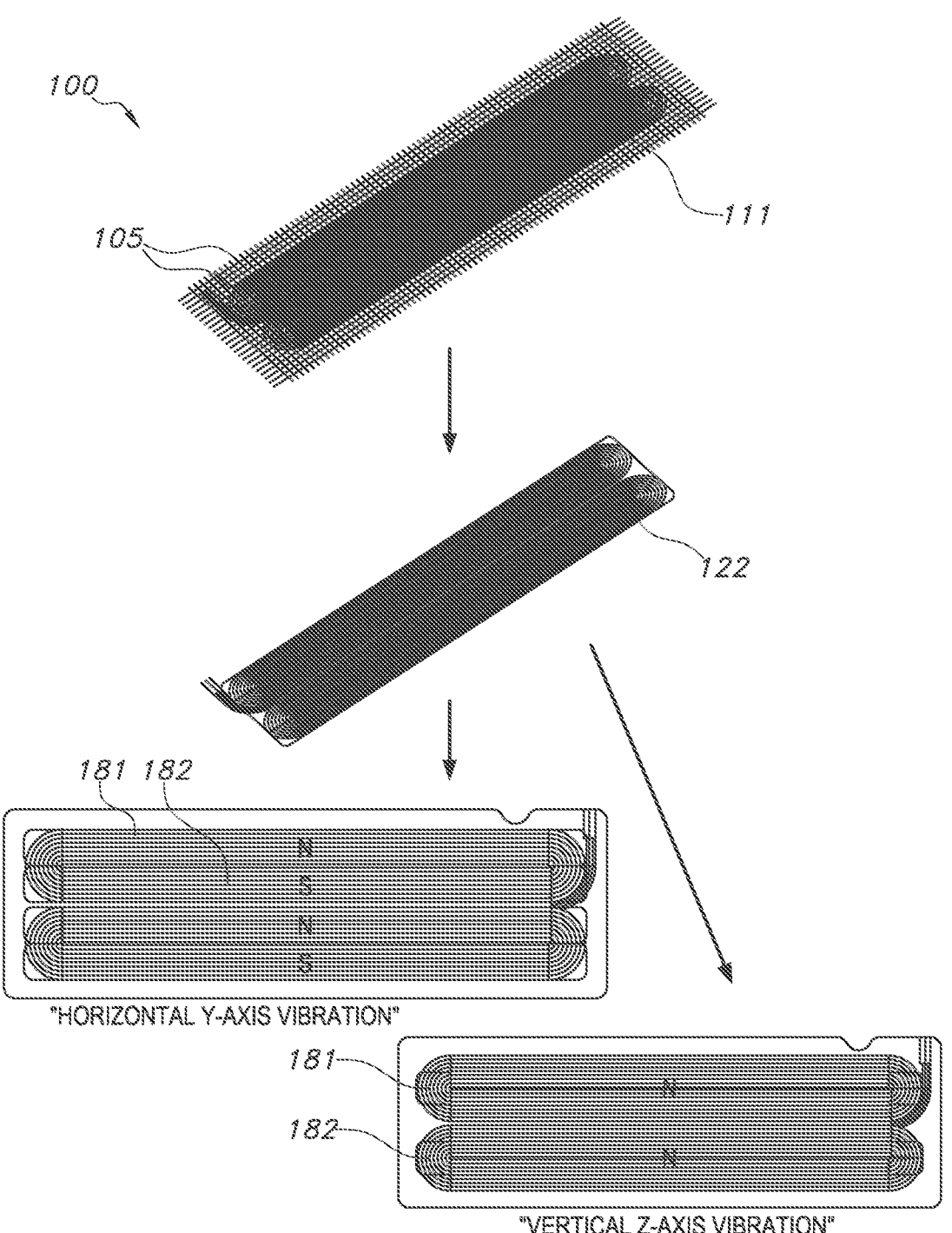
FIG. 6 is a schematic representation of one variation of the system.
Figure 12:
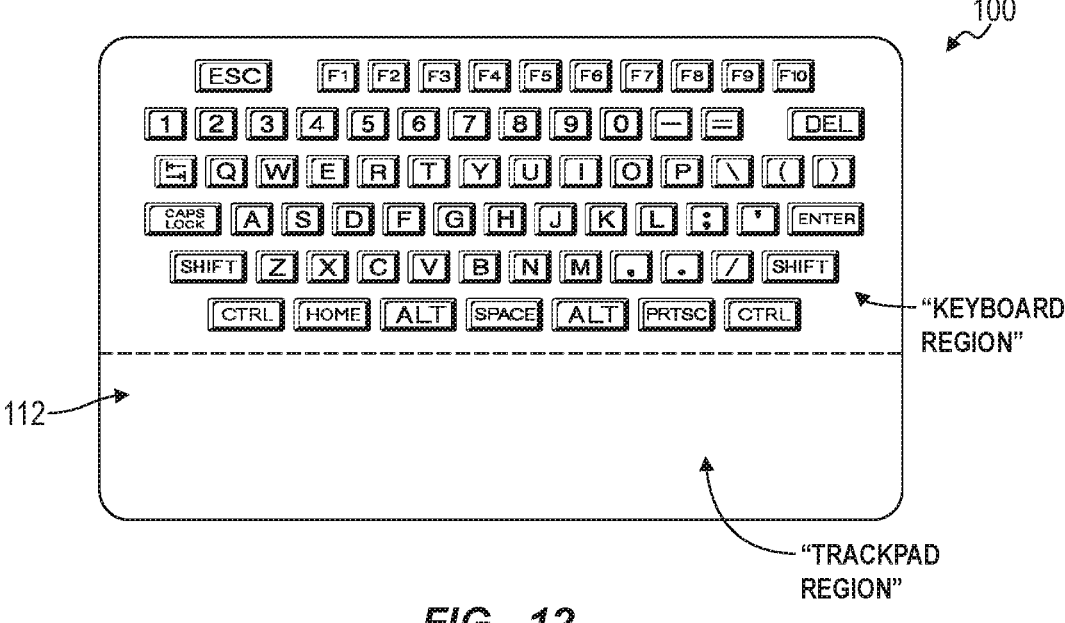
FIG. 12 is a schematic representation of one variation of the system.
Figures 13A, 13B, 13C:
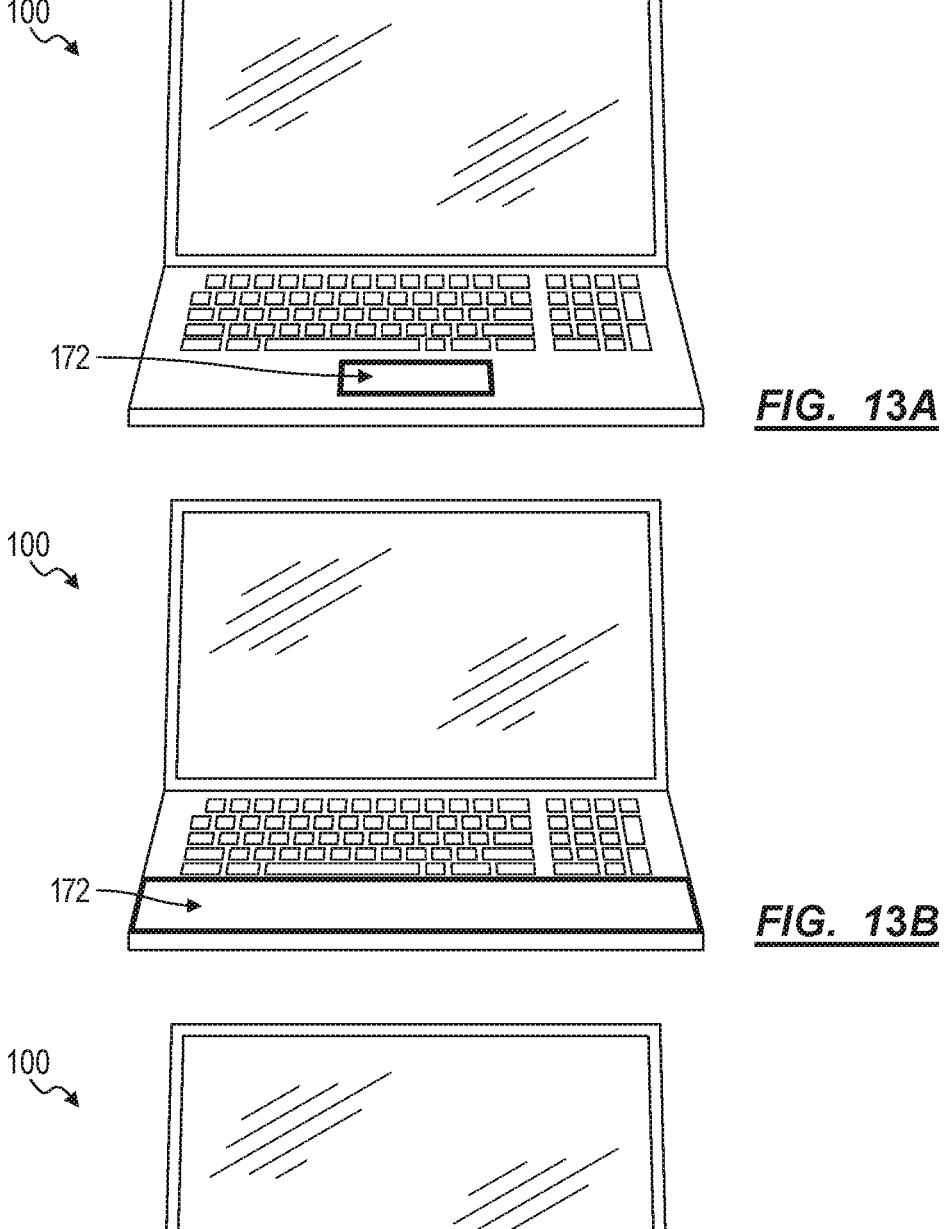
FIGS. 13A, 13B, and 13C are schematic representations of one variation of the system.
Figure 14:
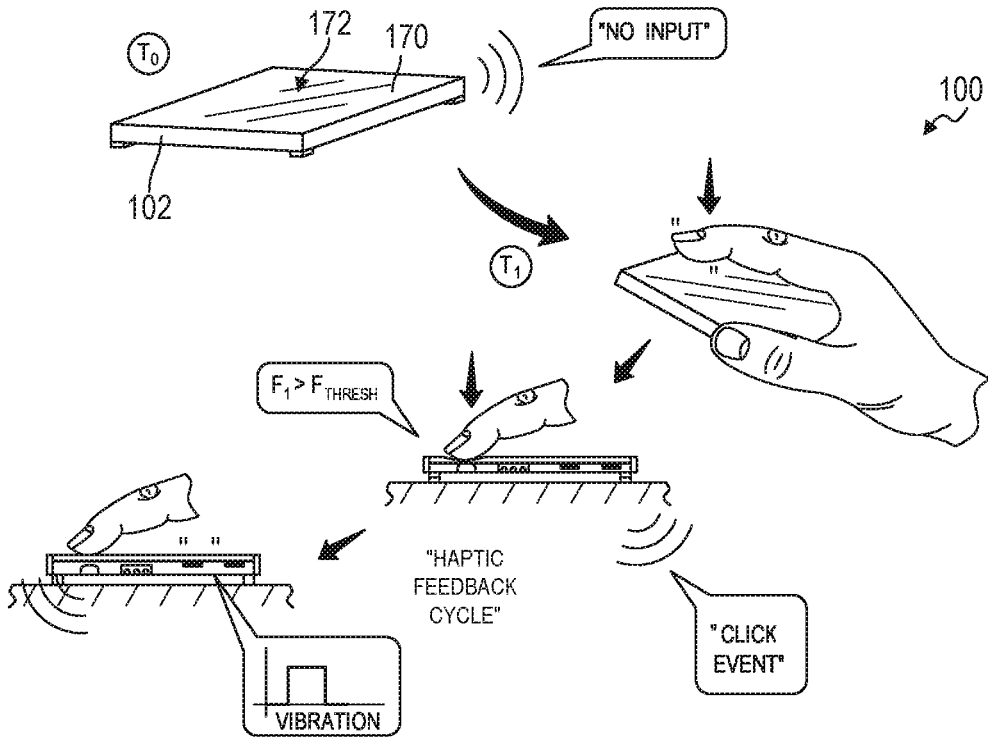
FIG. 14 is a flowchart representation of one variation of the system.
Figure 15:
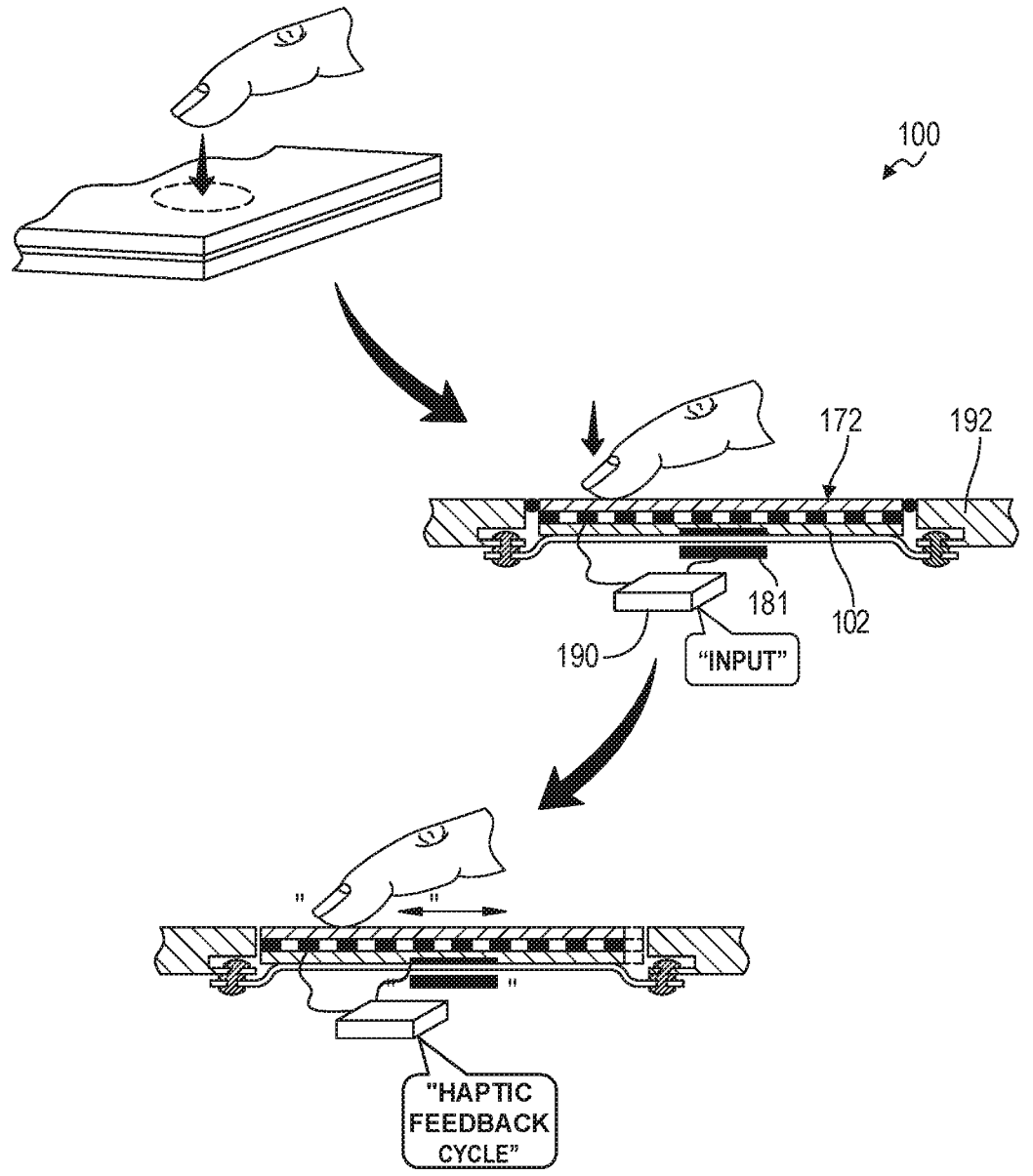
FIG. 15 is a flowchart representation of one variation of the system.

As shown in FIGS. 6 and 12, the system 100 includes a substrate 102 that includes a set of (e.g., six) conductive layers etched to form a set of conductive traces; a set of (e.g., five) substrate layers interposed between the stack of conductive layers; and a set of vias that connect the set of conductive tracers through the set of substrate layers. For example, the substrate 102 can include a six-layer, rigid fiberglass PCB.

In particular, a top conductive layer and/or a second conductive layer of the substrate 102 can include a set of traces that cooperate to form an array (e.g., a grid array) of drive and sense electrode pairs 105 within a touch sensor. Subsequent conductive layers of the substrate 102 below the touch sensor can include interconnected spiral traces that cooperate to form a single- or multi-core, single- or multi-winding, multi-layer inductor 150. Furthermore, a bottom conductive layer and/or a penultimate conductive layer of the substrate 102 can include a set of interdigitated electrodes distributed about the perimeter of the substrate 102 to form a sparse array of force sensors.

3.1 Resistive Touch Sensor

In one implementation, the first and second conductive layers of the substrate 102 include columns of drive electrodes and rows of sense electrodes (or vice versa) that terminate in a grid array of drive and sense electrode pairs 105 on the top layer 104 of the substrate 102. In this implementation, the system 100 further includes a force-sensitive layer 174: arranged over the top conductive layer of the substrate 102 (e.g., interposed between the top layer 104 of the substrate 102 and the cover layer 170); and exhibiting local changes in contact resistance across the set of drive and sense electrode pairs 105 responsive to local application of forces on the cover layer 170 (i.e., on the touch sensor surface 172.)

Accordingly, during a scan cycle, the controller 190 can: serially drive the columns of drives electrodes; serially read electrical values—(e.g., voltages) representing electrical resistances across drive and sense electrode pairs 105—from the rows of sense electrodes; detect a first input at a first location (e.g., an (x, y) location) on the touch sensor surface 172 based on deviation of electrical values-read from a subset of drive and sense electrode pairs 105 adjacent the first location—from baseline resistance-based electrical values stored for this subset of drive and sense electrode pairs 105; and interpret a force magnitude of the first input based on a magnitude of this deviation. As described below, the controller 190 can then drive an oscillating voltage across the multi-layer inductor 150 in the substrate 102 during a haptic feedback cycle in response to the force magnitude of the first input exceeding a threshold input force.

The array of drive and sense electrode pairs 105 on the first and second conductive layers of the substrate 102 and the force-sensitive layer 174 can thus cooperate to form a resistive touch sensor readable by the controller 190 to detect lateral positions, longitudinal positions, and force (or pressure) magnitudes of inputs (e.g., fingers, styluses, palms) on the touch sensor surface 172.

3.2 Capacitive Touch Sensor

In another implementation, the first and second conductive layers of the substrate 102 include columns of drive electrodes and rows of sense electrodes (or vice versa) that terminate in a grid array of drive and sense electrode pairs 105 on the top conductive layer (or on both the top and second conductive layers) of the substrate 102.

During a scan cycle, the controller 190 can: serially drive the columns of drive electrodes; serially read electrical values (e.g., voltage, capacitance rise time, capacitance fall time, resonant frequency)—representing capacitive coupling between drive and sense electrode pairs 105—from the rows of sense electrodes; and detect a first input at a first location (e.g., an (x, y) location) on the touch sensor surface 172 based on deviation of electrical values-read from a subset of drive and sense electrode pairs 105 adjacent the first location—from baseline capacitance-based electrical values stored for this subset of drive and sense electrode pairs 105. For example, the controller 190 can implement mutual capacitance techniques to read capacitance values between these drive and sense electrode pairs 105 and to interpret inputs on the touch sensor surface 172 based on these capacitance values.

The array of drive and sense electrode pairs 105 on the first and second conductive layers of the substrate 102 and the force-sensitive layer 174 can thus cooperate to form a capacitive touch sensor readable by the controller 190 to detect lateral and longitudinal positions of inputs (e.g., fingers, styluses, palms) on the touch sensor surface 172.

3.3 Touchscreen

In one variation, the system 100 includes (or interfaces with) a touchscreen 196 arranged over the substrate and that includes: a digital display; a touch sensor arranged across the display; and a cover layer arranged over the display and defining the touch sensor surface 172. Accordingly, in this variation, the controller is configured to drive the oscillating voltage across the multi-layer inductor during the haptic feedback cycle in response to the touchscreen 196 detecting the input on the touch sensor surface.

In particular, in this variation, the substrate 102 can: receive or integrate with a touch screen (i.e., an integrated display and touch sensor); and can cooperate with the first magnetic element 181 and the controller 190 to vibrate the touch sensor surface over the touchscreen 196 responsive to an input on the touch sensor surface, such as detected by a separate controller coupled to the touchscreen 196.

4. Multi-layer Inductor

As described above, the system 100 includes a multi-layer inductor 150 formed by a set of interconnected spiral traces fabricated directly within conductive layers within the substrate 102.

Generally, the total inductance of a single spiral trace may be limited by the thickness of the conductive layer. Therefore, the system 100 can include a stack of overlapping, interconnected spiral traces fabricated on a set of adjacent layers of the substrate 102 to form a multi-layer, multi-turn, and/or multi-core inductor that exhibits greater inductance—and therefore greater magnetic coupling to the set of magnetic elements—than a single spiral trace on a single conductive layer of the substrate 102. These spiral traces can be coaxially aligned about a common vertical axis (e.g., centered over the set of magnetic elements) and electrically interconnected by a set of vias through the intervening substrate layers of the substrate 102.

Furthermore, the substrate 102 can include conductive layers of different thicknesses. Accordingly, spiral traces within thicker conductive layers of the substrate 102 can be fabricated with narrower trace widths and more turns, and spiral traces within thinner conductive layers of the substrate 102 can be fabricated with wider trace widths and fewer turns in order to achieve similar electrical resistances within each spiral trace over the same coil footprint. For example, lower conductive layers within the substrate 102 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 150 and the set of magnetic elements during a haptic feedback cycle. Conversely, in this example, the upper layers of the substrate 102—which include many (e.g., thousands of) drive and sense electrode pairs 105 of the touch sensor—can include thinner layers of conductive material.

4.1 Single Core+Even Quantity of Coil Layers

Figure 2:
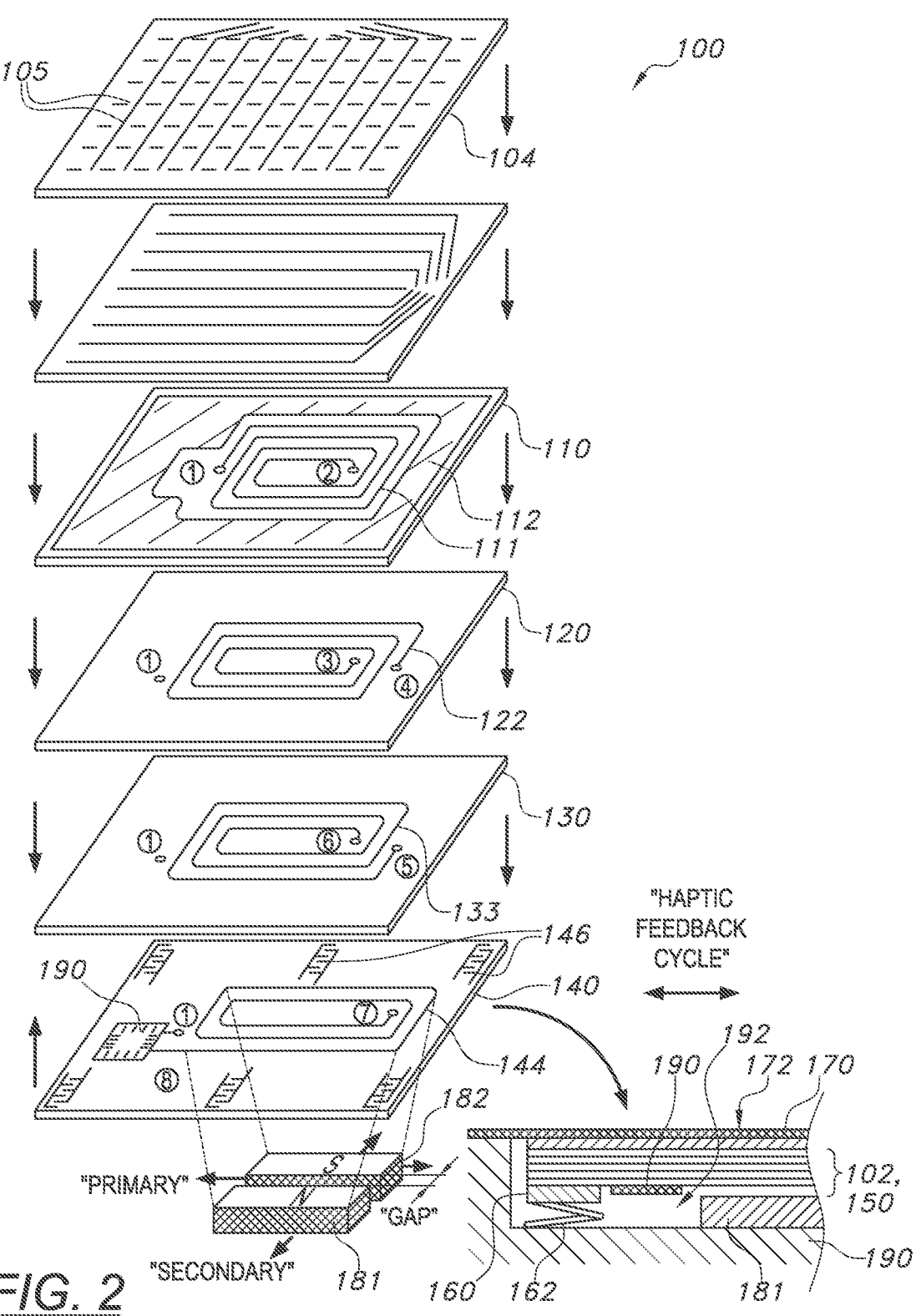
FIG. 2 is a schematic representation of one variation of the system.

In one implementation shown in FIG. 2, the substrate 102 includes an even quantity of spiral traces fabricated within an even quantity of substrate layers within the substrate 102 to form a single-coil inductor.

In one example, the substrate 102 includes: a top layer 104 and an intermediate layer 106 containing the array of drive and sense electrode pairs 105; a first inductor layer 110; a second inductor layer 120; a third inductor layer 130; and a fourth (e.g., a bottom) layer. In this example, the first inductor layer 110 includes a first spiral trace 111 coiled in a first direction and defining a first end and a second end. In particular, the first spiral trace 111 can define a first planar coil spiraling inwardly in a clockwise direction from the first end at the periphery of the first planar coil to the second end proximal a center of the first planar coil. The second inductor layer 120 includes a second spiral trace 122 coiled in a second direction opposite the first direction and defining a third end—electrically coupled to the second end of the first spiral trace 111—and a fourth end. In particular, the second spiral trace 122 can define a second planar coil spiraling outwardly in the clockwise direction from the third end proximal the center of the second planar coil to the fourth end at a periphery of the second planar coil.

Similarly, the third inductor layer 130 includes a third spiral trace 133 coiled in the first direction and defining a fifth end—electrically coupled to the fourth end of the second spiral trace 122—and a sixth end. In particular, the third spiral trace 133 can define a third planar coil spiraling inwardly in the clockwise direction from the fifth end at the periphery of the third planar coil to the sixth end proximal a center of the third planar coil. Furthermore, the fourth layer includes a fourth spiral trace 144 coiled in the second direction and defining a seventh end-electrically coupled to the sixth end of the first spiral trace 111- and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 can be coupled to the third end of the second spiral trace 122 by a first via; the fourth end of the second spiral trace 122 can be coupled to the fifth end of the third spiral trace 133 by a second via; the sixth end of the third spiral trace 133 can be coupled to the seventh end of the fourth spiral trace 144 by a third via; and the first, second, third, and fourth spiral traces 111, 122, 133, 144 can cooperate to form a single-core, four-layer inductor. The controller 190 (or a driver): can be electrically connected to the first end of the first spiral trace 111 and the eighth end of the fourth spiral trace 144 (or "terminals" of the multi-layer inductor 150); and can drive these terminals of the multi-layer inductor 150 with an oscillating voltage during a haptic feedback cycle in order to induce an alternating magnetic field through the multi-layer inductor 150, which couples to the magnetic elements and oscillates the substrate 102 within the chassis 192. In particular, when the controller 190 drives the multi-layer inductor 150 at a first polarity, current can flow in a continuous, clockwise direction through the first, second, third, and fourth spiral traces 111, 122, 133, 144 to induce a magnetic field in a first direction around the multi-layer inductor 150. When the controller 190 reverses the polarity across terminals of the multi-layer inductor 150, current can reverse directions and flow in a continuous, counter-clockwise direction through the first, second, third, and fourth spiral traces 111, 122, 133, 144 to induce a magnetic field in a second, opposite direction at the multi-layer inductor 150.

Furthermore, in this implementation, because the multi-layer inductor 150 spans an even quantity of conductive layers within the substrate 102, the terminals of the multi-layer inductor 150 can be located on the peripheries of the first and last layers of the substrate 102 and thus enable direct connection to the controller 190 (or driver).

4.2 Single Core+Odd Quantity of Coil Layers

Figure 1:
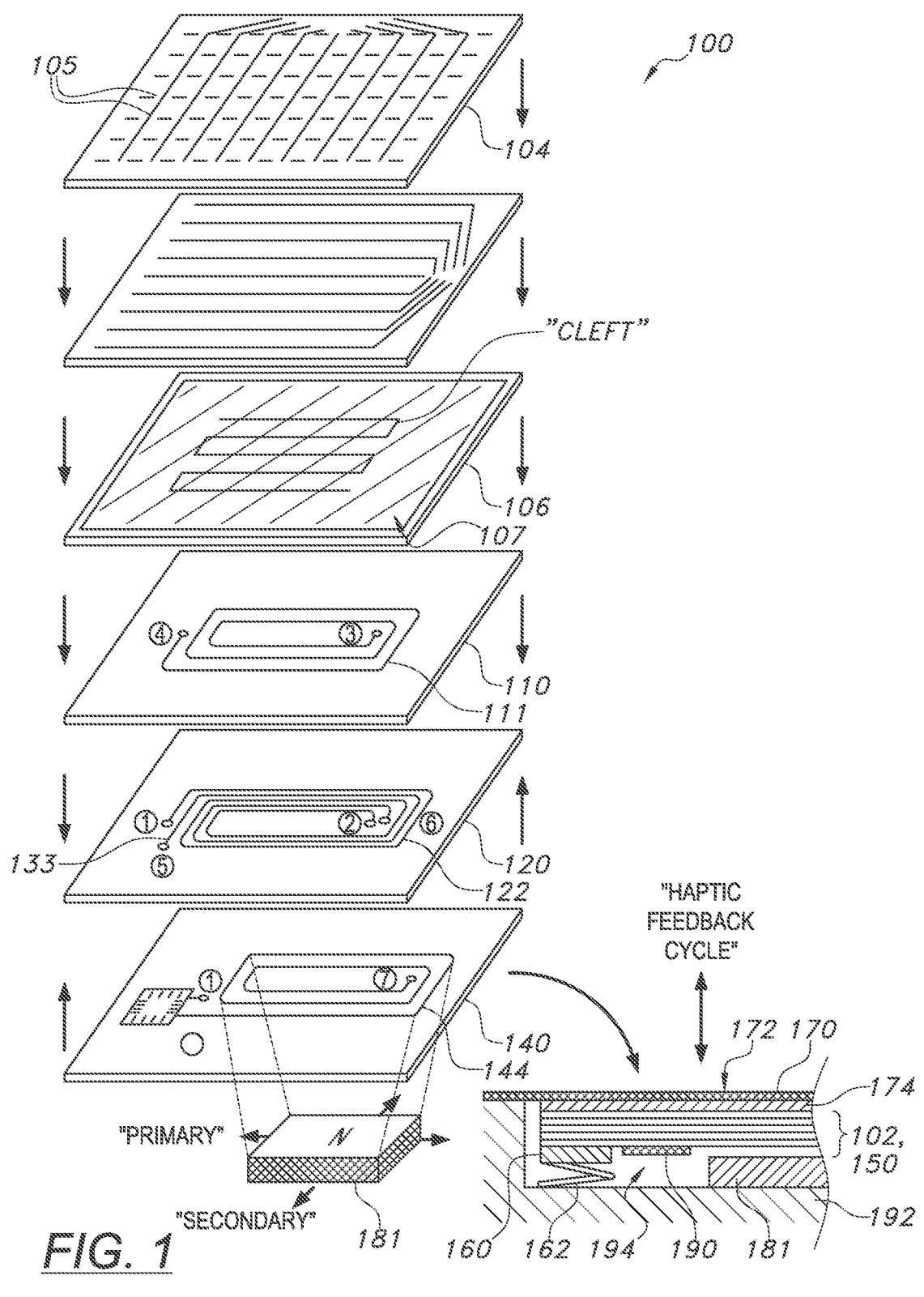
FIG. 1 is a schematic representation of a system.

In another implementation shown in FIG. 1, the multi-layer inductor 150 spans an odd number of (e.g., three, five) conductive layers of the substrate 102. In this implementation, a conductive layer of the substrate 102 can include two parallel and offset spiral traces that cooperate with other spiral traces in the multi-layer inductor 150 to locate the terminals of the multi-layer inductor 150 at the periphery of the multi-layer inductor 150 for direct connection to the controller 190 or driver.

In one example, the substrate 102 includes: a top layer 104 and an intermediate layer 106 containing the array of drive and sense electrode pairs 105; a first inductor layer 110; a second inductor layer 120; a third inductor layer 130; and a fourth (e.g., a bottom) layer. In this example, the first inductor layer 110 includes a ground electrode (e.g., a continuous trace): spanning the footprint of the array of drive and sense electrode pairs 105 in the top and intermediate layers 104, 106; driven to a reference potential by the controller 190; and configured to shield the drive and sense electrode pairs 105 from electrical noise generated by the multi-layer inductor 150.

In this example, the third inductor layer 130 includes a first spiral trace 111 coiled in a first direction and defining a first end and a second end. In particular, the first spiral trace 111 can define a first planar coil spiraling inwardly in a clockwise direction from the first end at the periphery of the first planar coil to the second end proximal a center of the first planar coil. The second inductor layer 120 includes a second spiral trace 122 coiled in a second direction opposite the first direction and defining a third end—electrically coupled to the second end of the first spiral trace 111 in the third inductor layer 130—and a fourth end. In particular, the second spiral trace 122 can define a second planar coil spiraling outwardly in the clockwise direction from the third end proximal the center of the second planar coil to the fourth end at a periphery of the second planar coil.

The third inductor layer 130 further includes a third spiral trace 133 coiled in the first direction and defining a fifth end—electrically coupled to the fourth end of the second spiral trace 122 in the second inductor layer 120—and a sixth end. In particular, the third spiral trace 133 can define a third planar coil: spiraling inwardly in the clockwise direction from the fifth end at the periphery of the third planar coil to the sixth end proximal a center of the third planar coil; and nested within the first planar coil that also spirals inwardly in the clockwise direction within the third inductor layer 130.

Furthermore, the fourth layer includes a fourth spiral trace 144 coiled in the second direction and defining a seventh end-electrically coupled to the sixth end of the first spiral trace 111—and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 within the third inductor layer 130 can be coupled to the third end of the second spiral trace 122 within the second inductor layer 120 by a first via; the fourth end of the second spiral trace 122 within the second inductor layer 120 can be coupled to the fifth end of the third spiral trace 133 within the third inductor layer 130 by a second via; the sixth end of the third spiral trace 133 within the third inductor layer 130 can be coupled to the seventh end of the fourth spiral trace 144 within the fourth layer by a third via; and the first, second, third, and fourth spiral traces 111, 122, 133, 144 can cooperate to form a single-core, three-layer inductor. The controller 190: can be electrically connected to the first end of the first spiral trace 111 within the third inductor layer 130 and the eight end of the fourth spiral trace 144 within the fourth layer (or "terminals" of the multi-layer inductor 150); and can drive these terminals of the multi-layer inductor 150 with an oscillating voltage during a haptic feedback cycle in order to induce an alternating magnetic field through the multi-layer inductor 150, which couples to the magnetic elements and oscillates the substrate 102 within the chassis 192. In particular, when the controller 190 drives the multi-layer inductor 150 at a first polarity, current can flow in a continuous, clockwise direction through the first, second, third, and fourth spiral traces 111, 122, 133, 144 within the second, third, and fourth layers of the substrate 102 to induce a magnetic field in a first direction around the multi-layer inductor 150. When the controller 190 reverses the polarity across terminals of the multi-layer inductor 150, current can reverse directions and flow in a continuous, counter-clockwise direction through the first, second, third, and fourth spiral traces 111, 122, 133, 144 to induce a magnetic field in a second, opposite direction at the multi-layer inductor 150.

Therefore, in this implementation, the substrate 102 can include an even number of single-coil layers and an odd number of two-coil layers selectively connected to form a multi-layer inductor 150 that includes two terminals located on the periphery of the multi-layer inductor 150.

4.3 Double Core+Even Quantity of Coil Layers

Figure 3:
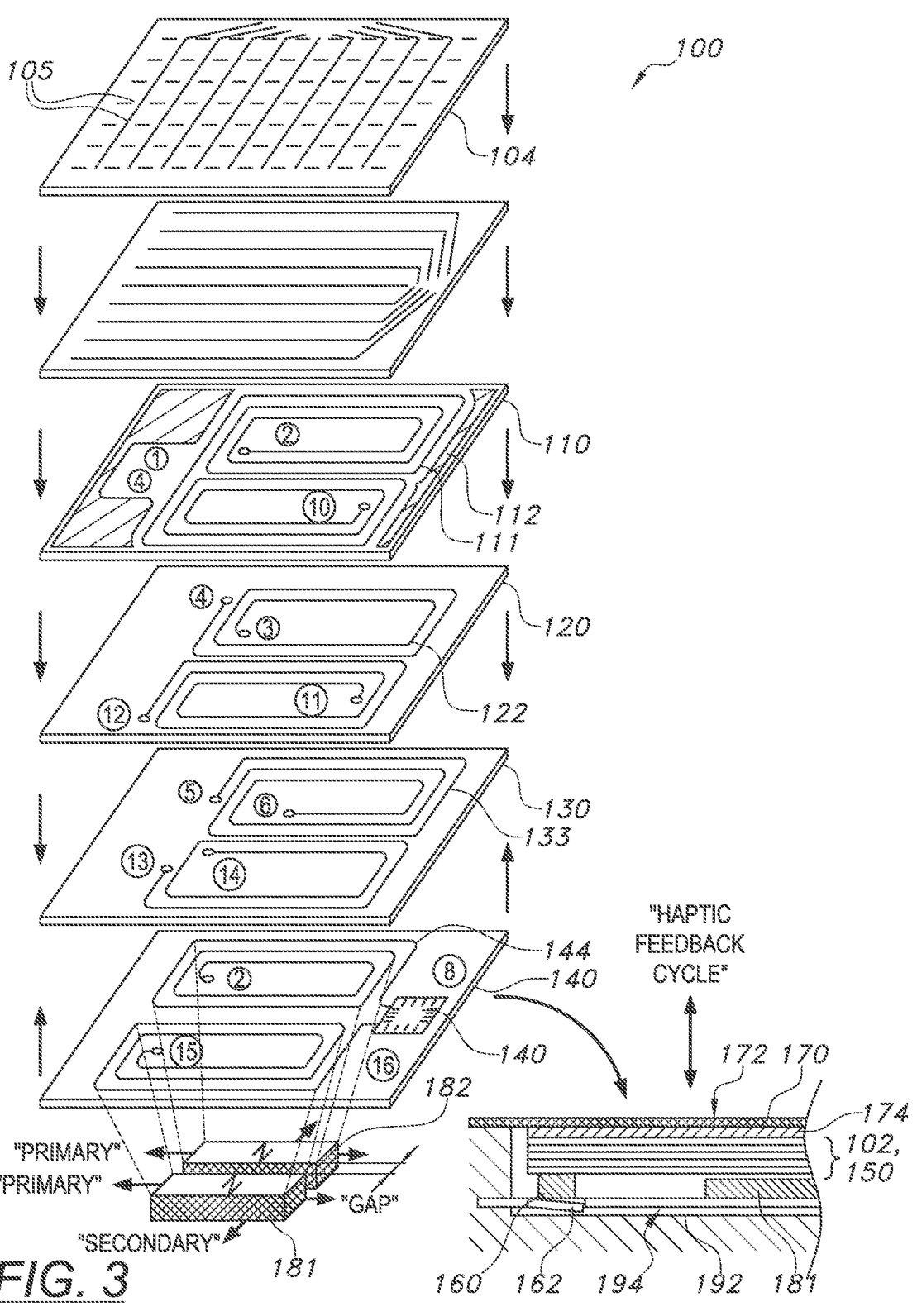
FIG. 3 is a schematic representation of one variation of the system.
Figure 7:
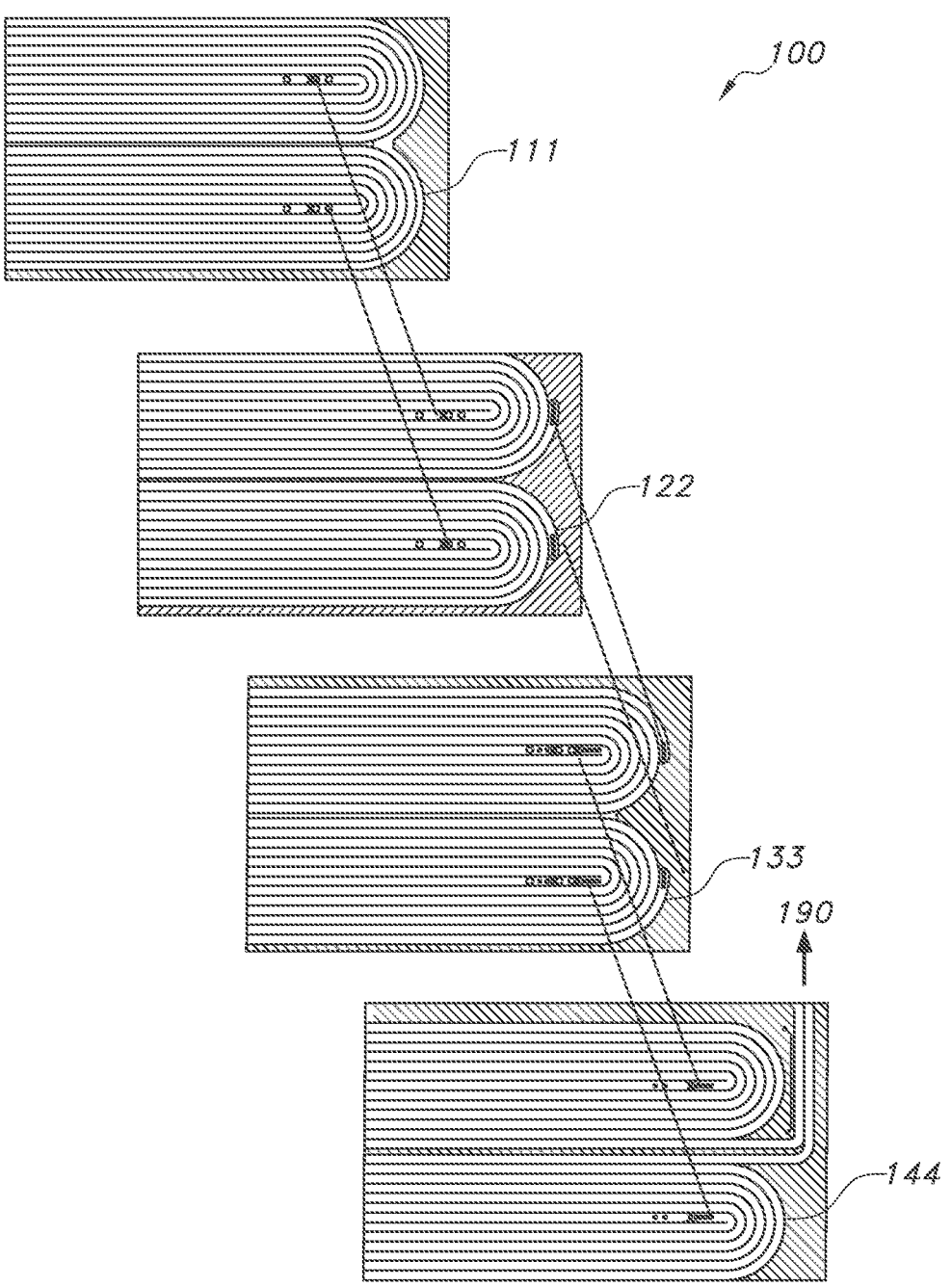
FIG. 7 is a schematic representation of one variation of the system.
Figure 8A:
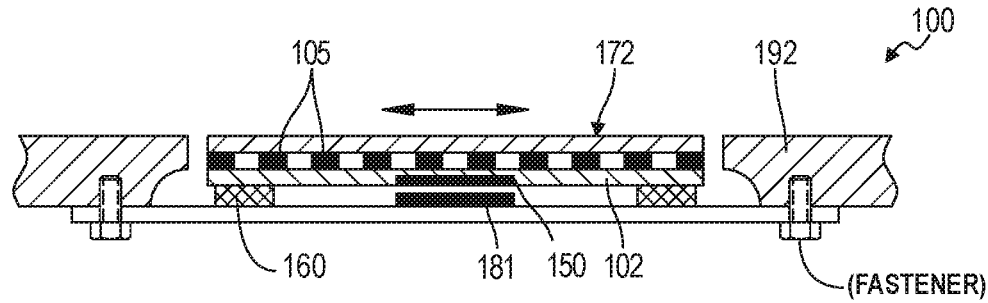
FIGS. 8A and 8B are schematic representations of one variation of the system.
Figure 8B:
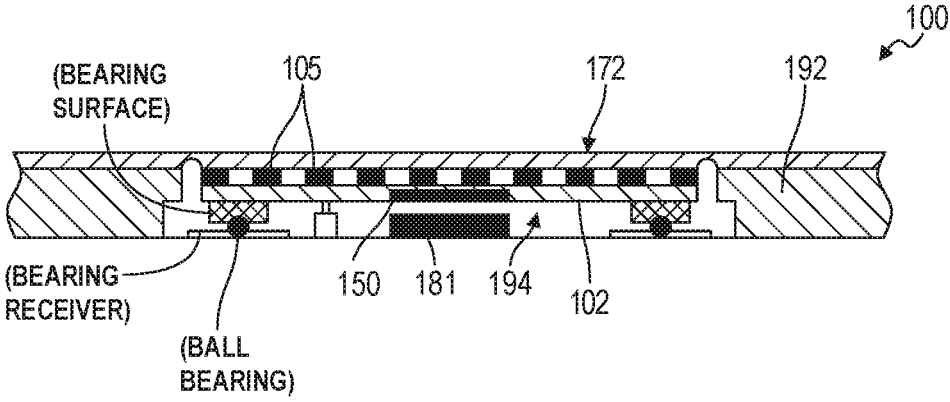

In another implementation shown in FIGS. 3 and 7, the substrate 102 includes an even quantity of spiral traces fabricated within an even quantity of substrate layers within the substrate 102 to form a dual-core inductor (that is, two separate single-core inductors connected in series).

In one example, the substrate 102 includes: a top layer 104 and an intermediate layer 106 containing the array of drive and sense electrode pairs 105; a first inductor layer 110; a second inductor layer 120; a third inductor layer 130; and a fourth (e.g., a bottom) layer.

In this example, the first inductor layer 110 includes a first spiral trace 111 coiled in a first direction and defining a first end and a second end. In particular, the first spiral trace 111 can define a first planar coil spiraling inwardly in a clockwise direction from the first end at the periphery of the first planar coil to the second end proximal a center of the first planar coil. The second inductor layer 120 includes a second spiral trace 122 coiled in a second direction opposite the first direction and defining a third end—electrically coupled to the second end of the first spiral trace 111—and a fourth end. In particular, the second spiral trace 122 can define a second planar coil spiraling outwardly in the clockwise direction from the third end proximal the center of the second planar coil to the fourth end at a periphery of the second planar coil. The third inductor layer 130 includes a third spiral trace 133 coiled in the first direction and defining a fifth end—electrically coupled to the fourth end of the second spiral trace 122—and a sixth end. In particular, the third spiral trace 133 can define a third planar coil spiraling inwardly in the clockwise direction from the fifth end at the periphery of the third planar coil to the sixth end proximal a center of the third planar coil. Furthermore, the fourth layer includes a fourth spiral trace 144 coiled in the second direction and defining a seventh end—electrically coupled to the sixth end of the first spiral trace 111—and an eighth end. In particular, the fourth spiral trace 144 can define a fourth planar coil spiraling outwardly in the clockwise direction from the seventh end proximal the center of the fourth planar coil to the eighth end at a periphery of the fourth planar coil.

Accordingly: the second end of the first spiral trace 111 can be coupled to the third end of the second spiral trace 122 by a first via; the fourth end of the second spiral trace 122 can be coupled to the fifth end of the third spiral trace 133 by a second via; the sixth end of the third spiral trace 133 can be coupled to the seventh end of the fourth spiral trace 144 by a third via; and the first, second, third, and fourth spiral traces 111, 122, 133, 144 can cooperate to form a first single-core, four-layer inductor.

Furthermore, in this example, the first inductor layer 110 includes a fifth spiral trace adjacent the first spiral trace 111, coiled in the second direction, and defining a ninth end— coupled to the first end of the first planar coil—and a tenth end. In particular, the fifth spiral trace can define a fifth planar coil spiraling inwardly in a clockwise direction from the ninth end at the periphery of the fifth planar coil to the tenth end proximal a center of the fifth planar coil. The second inductor layer 120 includes a sixth spiral trace adjacent the second spiral trace 122, coiled in the first direction, and defining an eleventh end—electrically coupled to the tenth end of the fifth spiral trace—and a twelfth end. In particular, the sixth spiral trace can define a sixth planar coil spiraling outwardly in the clockwise direction from the eleventh end proximal the center of the sixth planar coil to the twelfth end at a periphery of the sixth planar coil. The third inductor layer 130 includes a seventh spiral trace adjacent the third spiral trace 133, coiled in the second direction, and defining a thirteenth end—electrically coupled to the twelfth end of the sixth spiral trace—and a fourteenth end. In particular, the seventh spiral trace can define a seventh planar coil spiraling inwardly in the clockwise direction from the thirteenth end at the periphery of the seventh planar coil to the fourteenth end proximal a center of the seventh planar coil. Furthermore, the fourth layer includes an eighth spiral trace adjacent the fourth spiral trace 144, coiled in the first direction, and defining a fifteenth end—electrically coupled to the fourteenth end of the seventh spiral trace—and a sixteenth end. In particular, the eighth spiral trace can define an eighth planar coil spiraling outwardly in the clockwise direction from the fifteenth end proximal the center of the eighth planar coil to the sixteenth end at a periphery of the eighth planar coil.

Accordingly: the tenth end of the fifth spiral trace can be coupled to the eleventh end of the sixth spiral trace by a fourth via; the twelfth end of the sixth spiral trace can be coupled to the thirteenth end of the seventh spiral trace by a fifth via; the fourteenth end of the seventh spiral trace can be coupled to the fifteenth end of the eighth spiral trace by a sixth via; and the fifth, sixth, seventh, and eighth spiral traces can cooperate to form a second single-core, four-layer inductor.

Furthermore, the first end of the first spiral trace 111 can be coupled to (e.g., form a continuous trace with) the ninth end of the fifth spiral trace within the first conductive layer. The first and second single-core, four-layer inductors can therefore be fabricated in series to form a four-layer, dual-core inductor with the eighth and sixteenth ends of the fourth and eighth spiral traces, respectively, forming the terminals of the four-layer, dual-core inductor. Therefore, when these first and second multi-layer inductors are driven to a first polarity, current can flow in a continuous circular direction through both the first multi-layer inductor such that the first and second multi-layer inductors produce magnetic fields in the same phase and in the same direction.

The controller 190 (or a driver): can be electrically connected to these terminals and can drive these terminals with an oscillating voltage during a haptic feedback cycle in order to induce: a first alternating magnetic field through the first single-core, four-layer inductor (formed by the first, second, third, and fourth spiral traces 111, 122, 133, 144); and a second alternating magnetic field—in phase with the first alternating magnetic field—through the second single-core, four-layer inductor (formed by the fifth, sixth, seventh, and eighth spiral traces). In particular, when the controller 190 drives the four-layer, dual-core inductor at a first polarity, current can flow: in a continuous, clockwise direction through the first, second, third, and fourth spiral traces 111, 122, 133, 144 to induce a magnetic field in a first direction around the first single-core, four-layer inductor; and in a continuous, clockwise direction through the fifth, sixth, seventh, and eighth spiral traces to induce a magnetic field in the first direction around the second single-core, four-layer inductor. When the controller 190 reverses the polarity across terminals of the dual-core, four-layer inductor, current can reverse directions to: flow in a continuous, counterclockwise direction through the first, second, third, and fourth spiral traces 111, 122, 133, 144 to induce a magnetic field in a second, opposite direction around the first single-core, four-layer inductor; and in a continuous, counterclockwise direction through the fifth, sixth, seventh, and eighth spiral traces to induce a magnetic field in the second direction around the second single-core, four-layer inductor.

4.4 Double Core+Odd Quantity of Coil Layers

In a similar implementation, the substrate 102 includes an odd quantity of spiral traces fabricated within an odd quantity of substrate layers within the substrate 102 to form a dual-core inductor.

For example, in this implementation, the dual-core inductor can include two single-coil, three-layer inductors connected in series. In this example, each single-coil, three-layer inductors includes: an even number of single-coil layers; and an odd number of two-coil layers selectively connected to form a single-coil, three-layer inductor that includes two terminals located on the periphery of the single-coil, three-layer inductor, as described above.

5. Magnetic Element

Generally, the system 100 includes a set of magnetic elements: rigidly coupled to the chassis 192 beneath the multi-layer inductor 150; and configured to magnetically couple to the multi-layer inductor 150 during a haptic feedback cycle, thereby applying an oscillating force to the multi-layer inductor 150 and oscillating the substrate 102—and therefore the touch sensor surface 172—within the receptacle 194 during this haptic feedback cycle.

In particular, the spiral traces within the multi-layer inductor 150 can span a coil footprint, such as a rectangular or ellipsoidal footprint including: long sides parallel to a primary axis of the multi-layer inductor 150; and short sides parallel to a secondary axis of the multi-layer inductor 150. For example: the substrate 102 can be five-inches in width and three-inches in length; the touch sensor surface 172 can span an area approximately 5 inches by 3 inches over the substrate 102; and the coil footprint of each single-core multi-layer inductor 150 within the substrate 102 can be approximately 1.5 inches in length and 0.5 inches in width with the primary axis of the single-core multi-layer inductor 150 extending laterally across the width of the substrate 102.

5.1 Horizontal Oscillation: Single-core Multi-layer Inductor

In one implementation, the set of magnetic elements are arranged relative to the multi-layer inductor 150 in order to induce an oscillating force—between the multi-layer inductor 150 and the magnetic elements—parallel to the touch sensor surface 172 such that the substrate 102 oscillates horizontally in a plane parallel to the touch sensor surface 172 during a haptic feedback cycle, as shown in FIGURES two and 4A.

Figure 4A:
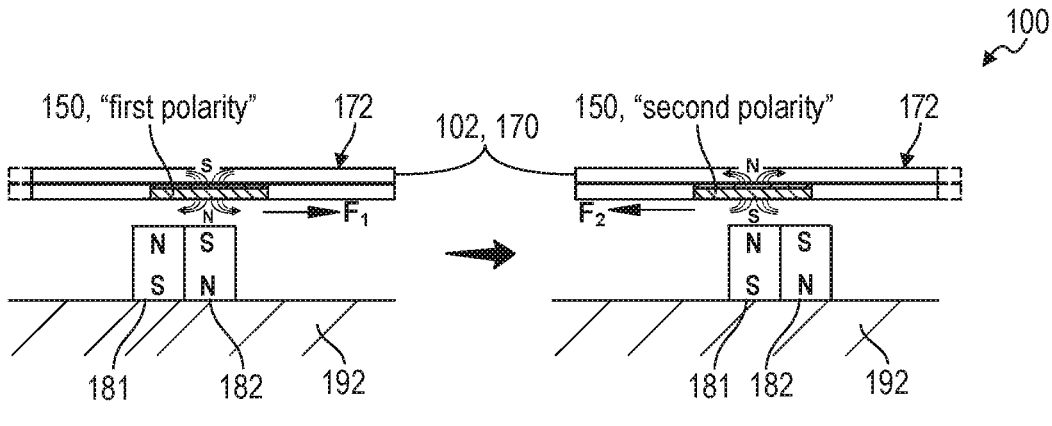
FIGS. 4A and 4B are flowchart representations of variations of the system.

In this implementation, the system 100 can include a first magnetic element 181: arranged in a receptacle 194 defined by the chassis 192 of the device; defining a first magnetic polarity facing the multi-layer inductor 150; and extending along a first side of the primary axis. In this implementation, the system 100 can similarly include a second magnetic element 182: arranged in the receptacle 194; defining a second magnetic polarity facing the multi-layer inductor 150; and extending along a second side of the primary axis adjacent the first magnetic element 181. In particular, the first magnetic element 181 can be arranged immediately adjacent and the second magnetic element. The first and second magnetic elements 181, 182 can be arranged directly under the multi-layer inductor 150 and can face the multi-layer inductor 150 with opposing polarities, as shown in FIG. 4A. When the controller 190 drives the multi-layer inductor 150 with an alternating voltage (or current), the multi-layer inductor 150 can generate a magnetic field that extends vertically through the substrate 102 (e.g., normal to the touch sensor surface 172) and interacts with the opposing magnetic fields of the first and second magnetic elements 181, 182. More specifically, when the controller 190 drives the multi-layer inductor 150 to a positive voltage during a haptic feedback cycle, the multi-layer inductor 150 can generate a magnetic field that extends vertically through the substrate 102 in a first vertical direction, which: attracts the first magnetic element 181 (arranged with the first polarity facing the multi-layer inductor 150); repels the second magnetic element 182 (arranged with the second polarity facing the multi-layer inductor 150); yields a first lateral force a first lateral direction; and shifts the substrate 102 laterally in the first lateral direction. When the controller 190 then reverses the voltage across the multi-layer inductor 150 during this haptic feedback cycle, the multi-layer inductor 150 can generate a magnetic field that extends vertically through the substrate 102 in the opposing vertical direction, which: repels the first magnetic element 181; attracts the second magnetic element 182; yields a second lateral force an second, opposite lateral direction; and shifts the substrate 102 laterally in the second lateral direction.

Therefore, by oscillating the polarity of the multi-layer inductor 150, the controller 190 can: induce oscillating interactions (i.e., alternating attractive and repelling forces)—parallel to the touch sensor surface 172—between the multi-layer inductor 150 and the magnetic elements; and thus oscillate the substrate 102 and touch sensor surface 172 horizontally (e.g., within a plane parallel to the touch sensor surface 172).

Therefore, in this implementation, the spiral traces of the single-core multi-layer inductor 150 can define: a first length (e.g., 1.5 inches) along the primary axis of the multi-layer inductor 150; and a first width (e.g., 0.5 inch)—less than first length—along the secondary axis of the multi-layer inductor 150. Furthermore, the first magnetic element 181 can define: a length parallel to and offset from the primary axis and approximating the first length of the spiral traces; and a second width parallel to the secondary axis of the multi-layer inductor 150 and approximately half of the first width of the spiral traces. The second magnetic element 182 can similarly define: a length parallel to and offset from the primary axis and approximating the first length of the spiral traces; and a width parallel to the secondary axis of the multi-layer inductor 150 and approximately half of the first width of the spiral traces. The first and second magnetic elements 181, 182 can be abutted and arranged on each side of the primary axis of the multi-layer inductor 150.

For example, the set of magnetic elements can include a permanent dipole magnet arranged in the receptacle 194 of the device and centered under the multi-layer inductor 150 such that the two poles of the set of magnetic elements are located on opposite sides of the primary axis of the multi-layer inductor 150. As described above, the set of magnetic elements can also include a set of permanent dipole magnets arranged in an antipolar configuration (e.g., a Halbach array).

The controller 190 (or the driver) can therefore polarize the multi-layer inductor 150 by applying an alternating voltage across the first and second terminals of the multi-layer inductor 150, thereby inducing an alternating current through the set of spiral traces, inducing an alternating magnetic field normal to the touch sensor surface, inducing oscillating magnetic coupling between the multi-layer inductor 150 and the set of magnetic elements, and thus vibrating the substrate 102 in a plane parallel to the touch sensor surface 172 during a haptic feedback cycle.

5.2 Horizontal Oscillation: Dual-core Multi-layer Inductor

Similarly, in the implementation described above in which the substrate 102 includes two adjacent single-core, multi-layer inductors 150 connected in series, the system 100 can include: a first magnetic element 181 arranged in the receptacle 194, defining a first magnetic polarity facing the first single-core multi-layer inductor 150, and extending along a first side of a first primary axis of the first single-core multi-layer inductor 150; a second magnetic element 182 arranged in the receptacle 194, defining a second magnetic polarity facing the first single-core multi-layer inductor 150, and extending along a second side of the first primary axis adjacent the first magnetic element 181; a third magnetic element arranged in the receptacle 194, defining the second magnetic polarity facing the second single-core multi-layer inductor 150, and extending along a first side of a second primary axis of the second single-core multi-layer inductor 150; and a fourth magnetic element arranged in the receptacle 194, defining the first magnetic polarity facing the second single-core multi-layer inductor 150, and extending along a second side of the second primary axis adjacent the third magnetic element, as shown in FIG. 6.

Accordingly, by oscillating the polarity of the first and second single-core multi-layer inductors 150—which include traces that spiral in the same direction and are therefore in phase—the controller 190 can: induce oscillating interactions parallel to the touch sensor surface 172 between the first single-core multi-layer inductor 150, the first magnetic element 181, and the second magnetic element 182 and between the second single-core multi-layer inductor 150, the third magnetic element, and the fourth magnetic element; and thus oscillate the substrate 102 and touch sensor surface 172 horizontally (e.g., within a plane parallel to the touch sensor surface 172).

5.3 Vertical Oscillation

Figure 4B:
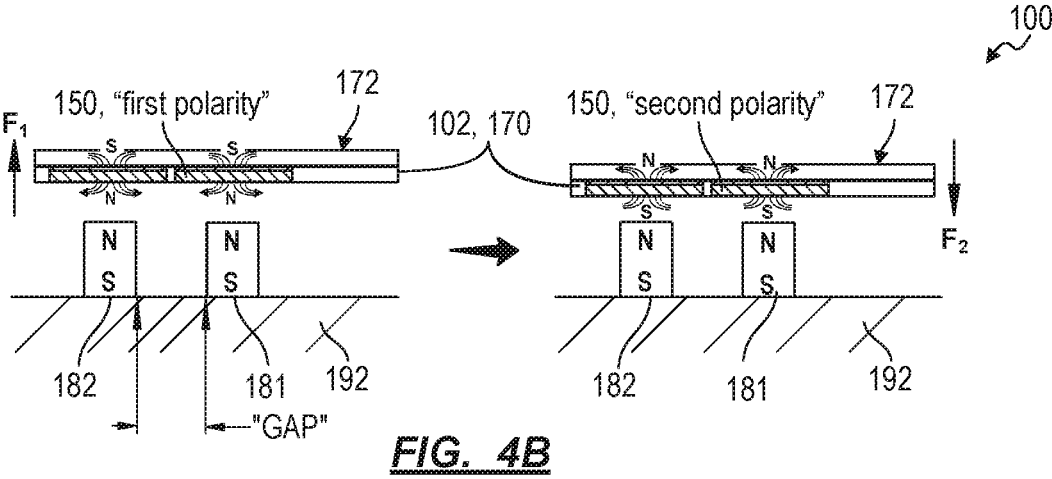
Figure 5A:
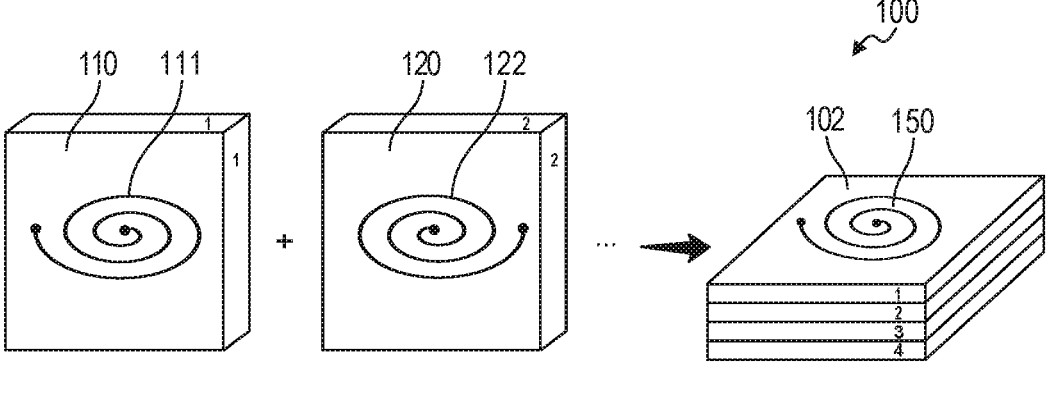
FIGS. 5A and 5B are flowchart representations of one variation of the system.
Figure 5B:
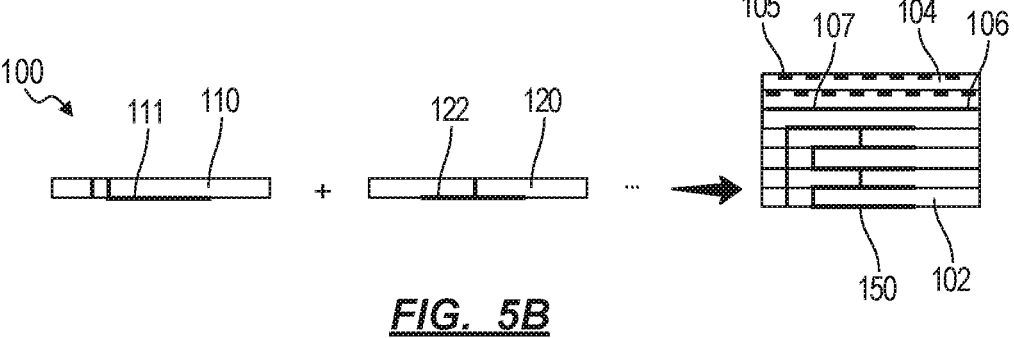

In another implementation, the set of magnetic elements are arranged relative to the multi-layer inductor 150 in order to induce an oscillating force-between the multi-layer inductor 150 and the magnetic elements-normal to the touch sensor surface 172 such that the substrate 102 oscillates vertically within the chassis 192 during a haptic feedback cycle, as shown in FIGS. 1 and 4B.

In the implementation described above in which the substrate 102 includes a single-core multi-layer inductor 150, the system 100 can include a first magnetic element 181: arranged in the receptacle 194 of the chassis 192; defining a first magnetic polarity facing the single-core multi-layer inductor 150; approximately centered under the multi-layer inductor 150; and extending laterally across the primary axis of the multi-layer inductor 150. The first magnetic element 181 can thus generate a magnetic field that extends predominantly vertically toward the multi-layer inductor 150 and that is approximately centered under the multi-layer inductor 150. More specifically, the first magnetic element 181 can generate a magnetic field that extends predominately normal to the touch sensor surface 172 proximal the center of the multi-layer inductor 150. As shown in FIG. 4B, when the controller 190 drives the multi-layer inductor 150 to a positive voltage during a haptic feedback cycle, the multi-layer inductor 150 can generate a magnetic field that extends vertically through the substrate 102 in a first vertical direction, which: repels the first magnetic element 181 (arranged with the first polarity facing the multi-layer inductor 150); yields a first vertical force in a first vertical direction; and lifts the substrate 102 vertically off of the first magnetic element 181. When the controller 190 then reverses the voltage across the multi-layer inductor 150 during this haptic feedback cycle, the multi-layer inductor 150 can generate a magnetic field that extends vertically through the substrate 102 in a second, opposite vertical direction, which: attracts the first magnetic element 181; yields a second vertical force in a second, opposite vertical direction; and draws the substrate 102 downward and back toward the first magnetic element 181.

Therefore, by oscillating the polarity of the multi-layer inductor 150, the controller 190 can: induce oscillating interactions (i.e., alternating attractive and repelling forces)—normal to the touch sensor surface 172—between the multi-layer inductor 150 and the first magnetic element 181; and thus oscillate the substrate 102 and touch sensor surface 172 vertically (e.g., normal to the touch sensor surface 172).

Furthermore, the system 100 can be reconfigured for vertical and horizontal oscillations of the touch sensor surface 172 by exchanging: a single magnetic element that spans the full width of and is centered under the multi-layer inductor 150; for a pair of opposing magnetic elements arranged under the multi-layer inductor 150 and on each of the primary axis of the multi-layer inductor 150 with no or minimal other modifications to the system 100, as shown in FIG. 6.

5.4 Vertical Oscillation: Dual-core Multi-layer Inductor

Similarly, in the implementation described above in which the substrate 102 includes two adjacent single-core, multi-layer inductors 150 connected in series and in phase (i.e., phased by zero degrees), the system 100 can include a first magnetic element 181: arranged in the receptacle 194; defining a first magnetic polarity facing the first single-core multi-layer inductor 150; approximately centered under the first single-core multi-layer inductor 150; and extending laterally across the primary axis of the first single-core multi-layer inductor 150. The system 100 can similarly include a second magnetic element 182: arranged in the receptacle 194 adjacent the first magnetic element 181; defining the first magnetic polarity facing the second single-core multi-layer inductor 150; approximately centered under the second single-core multi-layer inductor 150; and extending laterally across the primary axis of the second single-core multi-layer inductor 150, as shown in FIGS. 3 and 4B.

Accordingly, by oscillating the polarity of the first and second single-core multi-layer inductors 150—which are in phase—the controller 190 can: induce oscillating interactions normal to the touch sensor surface 172 between the first single-core multi-layer inductor 150 and the first magnetic element 181 and between the second single-core multi-layer inductor 150 and the second magnetic element 182; and thus oscillate the substrate 102 and touch sensor surface 172 vertically (e.g., normal to the touch sensor surface 172).

6. Chassis Integration+Force Sensors

As described above, the substrate 102 is flexibly mounted to the chassis 192 (e.g., within or over a receptacle 194 defined by the chassis 192) to enable the substrate 102 to oscillate horizontally or vertically relative to the chassis 192 during a haptic feedback cycle. Generally, the system 100 can include: a substrate 102 including a first set of electrodes 146 (e.g., sense electrodes); and a baseplate 166 including a second set of electrodes 147 (e.g., drive electrodes) cooperating with the first set of electrodes 146 to form an array of force sensors (e.g., capacitive force sensors). In particular, the baseplate 166: is mounted within the chassis 192; and includes the second set of electrodes 147 arranged (e.g., printed) across a top surface of the baseplate 166. Additionally, the substrate 102: includes the first set of electrodes 146 arranged across a bottom layer 140 of the substrate 102; and is coupled to the baseplate 166 via a set of spacer elements 160 locating the first set of electrodes 146 in alignment to the second set of electrodes 147 to form the array of force sensors. As described below, the first set of electrodes 146 arranged across the substrate 102 can be interchanged between a set of sense electrodes and/or a set of drive electrodes. Similarly, the second set of electrodes 147 arranged across the baseplate 166 can be interchanged between a set of sense electrodes and/or a set of drive electrodes.

6.1 Substrate

As described above and shown in FIG. 1, the substrate 102 can include: a top layer 104; and a bottom layer 140 that defines a set of support locations. The substrate 102 further includes a first set of electrodes 146 (e.g., sense electrodes) arranged across the bottom layer 140 and adjacent (e.g., encircling, abutting) the support locations. The first set of electrodes 146 (e.g., sense electrodes) can be printed directed across the bottom layer 140 of the substrate 102 and/or can be integrated into a rigid or flexible PCB layered over the bottom layer 140 of the substrate 102.

6.1.1 Sense Electrodes

In one implementation, the system 100 includes: each support location, in the set of support locations, arranged about a perimeter of the bottom layer 140 of the substrate 102; and the first set of electrodes 146 (e.g., sense electrodes) arranged across the bottom layer 140 adjacent the support locations.

For example, the set of support locations can include: a first subset of support locations arranged proximal corner edges of the bottom layer 140 of the substrate 102; and a second subset of support locations arranged proximal lateral side edges of the bottom layer 140 of the substrate 102 between the corner edges. In this example, each sense electrode, in the first set of electrodes 146 (e.g., sense electrodes): can be arranged adjacent a first side of a support location, in the set of support locations; and define a shape encircling the support location—such as a semi-circular shape (e.g., horseshoe shape, crescent shape) encircling the support location, and/or a crenellation shape encircling the support location—on the first side of the support locations.

Additionally or alternatively in this example, sense electrodes in the first set of electrodes 146 (e.g., sense electrodes) can be arranged: proximal the lateral side edges of the bottom layer 140 of the substrate 102 abutting to the set of support locations about the perimeter of the bottom layer 140 of the substrate 102; and/or proximal a center of the bottom layer 140 of the substrate 102 abutting to support locations about the center of the bottom layer 140 of the substrate 102. In particular, sense electrodes can extend partially about a first lateral side edge of the bottom layer 140 of the substrate 102, and/or arranged proximal about a corner edge of the bottom layer 140 of the substrate 102 abutting to the set of support locations about the perimeter of the bottom layer 140 of the substrate 102.

The system 100 can therefore: accommodate sense electrodes of varying shapes and sizes on the bottom layer 140 of the substrate 102 to maintain uniformity across the substrate 102; and reduce sensitivity to noise during scan cycles—by the controller 190—to read capacitance values from the first set of electrodes 146 (e.g., sense electrodes) on the bottom layer 140 of the substrate 102.

6.1.2 Mutual Capacitance Force Sensors

In one implementation shown in FIG. 1, the array of capacitance force sensors—formed by the second set of electrodes 147 (e.g., drive electrodes) of the baseplate 166 and the first set of electrodes 146 (e.g., sense electrodes) of the substrate 102—are arranged in a mutual-capacitance configuration adjacent each support location.

For example, each capacitance force sensor can include: a sense electrode arranged on the bottom layer 140 of the substrate 102 adjacent a first side of a support location; and a drive electrode (e.g., conductive trace) fabricated on the top layer 104 of the baseplate 166 opposite the first side of the support location and in vertical alignment to the sense electrode. In this example, the first set of electrodes 146 (e.g., sense electrodes) and the second set of electrodes 147 (e.g., drive electrodes) within the array of capacitive force sensors can capacitively couple each other, and an airgap between the substrate 102 and the baseplate 166 can form an air dielectric between the first set of electrodes 146 (e.g., sense electrodes) and the second set of electrodes 147 (e.g., drive electrodes).

In the foregoing example, in response to application of a force input on the touch sensor surface 172, the adjacent spring elements can then yield (i.e., displace from a nominal plane) such that the first set of electrodes 146 (e.g., sense electrodes) of the substrate 102 move closer to the second set of electrodes 147 (e.g., drive electrodes) on the baseplate 166, thereby reducing the air gap between the first set of electrodes 146 (e.g., sense electrodes) and the second set of electrodes 147 (e.g., drive electrodes). The reduced distance between the substrate 102 and the baseplate 166 thus increases the effective dielectric between the first set of electrodes 146 (e.g., sense electrodes) and second set of electrodes 147 (e.g., drive electrodes) thus increasing the capacitance of the first set of electrodes 146 (e.g., sense electrodes) and the second set of electrodes 147 (e.g., drive electrodes). The capacitance value of the capacitance force sensor may therefore deviate from a baseline capacitance value—such as in the form of an increase in the charge time of the capacitance force sensor and an increase in the discharge time of the capacitance force sensor, or a decrease in the resonant frequency of the capacitance force sensor—when the touch sensor surface 172 is depressed over the capacitance force sensor.

In another example, the system 100 includes: the first set of electrodes 146 defining a set of sense electrodes arranged across a periphery of the bottom layer 140 of the substrate 102; and a second set of electrodes 147 defining a set of drive electrodes arranged about a top surface of the baseplate 166 and in alignment with the set of sense electrodes. Thus, the set of sense electrodes cooperate with the set of drive electrodes to form an array of capacitive force sensors arranged below the touch sensor surface 172. Accordingly, the system 100 can: drive the set of drive electrodes thus inducing capacitive coupling between the set of sense electrodes and the set of drive electrodes; read capacitive values from the set of sense electrodes across the substrate 102; and interpret a force magnitude applied on the touch sensor surface 172 based on the capacitive values representing vertical displacement of the set of sense electrodes toward the set of drive electrodes.

Therefore, in this implementation, the controller 190 can, during a scan cycle: (serially) drive each drive electrode in the set of drive electrodes, such as by a target voltage, over a target time interval, or with an alternating voltage of a particular frequency; read a set of capacitance values—from each sense electrode in the set of sense electrodes—that represent measures of mutual capacitances between the set of sense electrodes and the set of drive electrodes of the array of capacitive force sensors; and interpret a distribution of forces applied to the touch sensor surface 172 based on this set of capacitance values.

6.1.3 Self-Capacitance Force Sensors

In one implementation, the array of capacitance force sensors-formed by the second set of electrodes 147 (e.g., drive electrodes) of the baseplate 166 and the first set of electrodes 146 (e.g., sense electrodes) of the substrate 102—are arranged in a self-capacitance configuration adjacent each support location.

For example, each capacitance force sensor can include a single electrode arranged on bottom layer 140 of the substrate 102 (e.g., encircling) a support location, and the baseplate 166 can be grounded to function as a common second electrode for each capacitance sensor. In this example, the single electrode within a capacitance sensor and the baseplate 166 can capacitively couple, and an air gap between the substrate 102 and the baseplate 166 can form an air dielectric between the capacitance force sensor and the baseplate 166.

Therefore, in this implementation, the controller 190 can, during a scan cycle, drive the baseplate 166 to a reference (e.g., ground) potential; (serially) drive each capacitance sensor, such as by a target voltage, over a target time interval, or with an alternating voltage of a particular frequency; read a set of capacitance values—from each sense electrode in the first set of electrodes 146 (e.g., sense electrodes)—that represent measures of self capacitances between the capacitance force sensors and the baseplate 166; and interpret a distribution of forces applied to the touch sensor surface 172 based on this set of capacitance values and known spring constants in the set of spring elements 162.

In another implementation, the system 100 can implement a combination of mutual capacitance force sensors and self-capacitance force sensors to interpret force applied to the touch sensor surface 172. In this implementation, the controller 190 can sequentially execute scan cycles to read mutual capacitance values and self-capacitance values from the electrodes on the substrate 102 and the baseplate 166.

6.1.4 Capacitive Coupling

In one implementation, the system 100 includes the first set of electrodes 146 (e.g., sense electrodes) in vertical alignment with the second set of electrodes 147 (e.g., drive electrodes) offset from the first set of electrodes 146 to form a set of force sensors. In particular, a sense electrode, in the first set of electrodes 146 (e.g., sense electrodes) vertically aligns to a drive electrode, in the second set of electrodes 147 (e.g., drive electrodes) to form a capacitive force sensor. In this implementation, manufacturing procedures and/or loads applied on the touch sensor surface 172 can result in skewed (or "slanted") alignment between the sense electrode and the drive electrode, which can result in defective capacitive coupling between the sense electrode and the drive electrode of the force sensor. Thus, the system 100 can include: a sense electrode spanning a first area; and a drive electrode spanning a second area constrained within the first area below the sense electrode to ensure vertical alignment between the sense electrode and the drive electrode in the force sensor regardless of manufacturing processes and/or loads applied to the touch sensor surface 172. The system 100 can then include this configuration across the first set of electrodes 146 and the second set of electrodes 147 to ensure capacitive coupling between the first set of electrodes 146 (e.g., sense electrodes) and the second set of electrodes 147 (e.g., drive electrodes).

For example, the system 100 can include a sense electrode, in the first set of electrodes 146 (e.g., sense electrodes): spanning a first area across the bottom layer 140 of the substrate 102; and encircling a support location at the bottom layer 140 for the substrate 102. Furthermore, the system 100 includes a drive electrode, in the second set of electrodes 147 (e.g., drive electrodes): spanning a second area, less than the first area, across a top surface of the baseplate 166; and aligned within the first area of the sense electrode to form a capacitive force sensor.

Therefore, the system 100 can: receive application of a load on the touch sensor surface 172 resulting in skewed displacement between the first set of electrodes 146 (e.g., sense electrodes) and the second set of electrodes 147 (e.g., drive electrodes); read a set of electrical values from the first set of electrodes 146 (e.g., sense electrodes); and interpret a force magnitude applied over the touch sensor surface 172 based on deviation of the set of electrical values from baseline electrical values across the set of force sensors.

6.1.5 Capacitive Touch Sensor

As described above, the system 100 can further include a capacitive touch sensor arranged across the top layer 104 of the substrate 102. In one implementation, the capacitive touch sensor includes: an array of drive electrodes and sense electrodes arranged on the top layer 104 of the substrate 102; and a cover layer 170 (e.g., a glass film) arranged over the substrate 102 to enclose the array of drive electrodes and sense electrodes and to form the touch sensor surface 172 (e.g., a "tactile surface") over the substrate 102. In this implementation, the system 100 can include: a first quantity of capacitance force sensors that form a first quantity of pressure sensors between the substrate 102 and the baseplate 166; and a second quantity of drive electrodes and sense electrodes that form a second quantity of pixels—at least two orders of magnitude greater than the first quantity—in the capacitive touch sensor.

Accordingly, the system 100 can output: a location (e.g., (x, y) coordinate) of a touch input applied on the touch sensor surface 172; and a force magnitude of the touch input applied at the location on the touch sensor surface 172. For example, the system 100 can: read a first set of electrical values from the array of drive and sense electrode pairs 105 across the top layer 104 of the substrate 102; and interpret a lateral position and a longitudinal position of a first touch input on the touch sensor surface 172 based on the first set of electrical values. The system 100 can then: read a second set of electrical values from the first set of electrodes 146 (e.g., sense electrodes) arranged across the bottom layer 140 of the substrate 102; interpret a first force magnitude for the first touch input on the touch sensor surface 172 based on the second set of electrical values; and output the lateral position, the longitudinal position, and the first force magnitude of the first touch input.

6.2 Spring Elements

Generally, the system 100 includes a set of spring elements 162: coupled (e.g., bonded, riveted, soldered) to the substrate 102 at the set of support locations; configured to support the substrate 102 on a baseplate 166 coupled to a chassis 192 of a computing device; and configured to yield to displacement of the substrate 102 downward toward the baseplate 166 responsive to forces applied to the touch sensor surface 172.

6.2.1 Unitary Spring Elements and Baseplate Structure

In one implementation, the system 100 includes a baseplate 166 that: includes a unitary structure that spans the bottom layer 140 of the substrate 102; and defines the set of spring elements 162 aligned to the set of support locations on the substrate 102.

In one example, the baseplate 166 includes a thin-walled structure (e.g., a 20-gage, or 0.8-millimeter-thick stainless-steel sheet) that is machined, stamped, punched, etched, or laser-cut to form a flexure aligned to each support location. Thus, in this example, each spring element can define a flexure—such as a multi-arm spiral flexure—configured to: laterally and longitudinally locate the system 100 over the chassis 192; and deflect inwardly and outwardly from a nominal plane defined by the thin-walled plate.

More specifically, in this example, the baseplate 166 can include a unitary metallic sheet structure arranged between the substrate 102 and the chassis 192 and defining a nominal plane. Each spring element: can be formed (e.g., fabricated) in the unitary metallic structure; can define a stage coupled to a spacer opposite the bottom layer 140 of the substrate 102; can include a flexure fabricated in the unitary metallic sheet structure; and can be configured to return to approximate the nominal plane in response to absence of a touch input applied to the touch sensor surface 172.

6.2.2 Spring Element Locations

In one implementation, the substrate 102 defines a rectangular geometry with support locations: proximal the perimeter of this rectangular geometry; and proximal a center of this rectangular geometry. Accordingly, the set of spring elements 162 can cooperate to support the perimeter and the center of the substrate 102 against the baseplate 166 of the computing device. In this implementation, the substrate 102 and the cover layer 170—arranged over the capacitive touch sensor—can cooperate to form a semi-rigid structure that resists deflection between the set of support locations.

For example, with the perimeter of the substrate 102 supported by the set of spring elements 162, the substrate 102 and the cover layer 170 can exhibit less than 0.3 millimeters of deflection out of a nominal plane when a force of ~1.6 Newtons (i.e., 165 grams, equal to an "click" input force threshold) is applied to the center of the touch sensor surface 172. The substrate 102 and the cover layer 170 can therefore cooperate to communicate this applied force to the perimeter of the substrate 102 and thus into the set of spring elements 162 below. As described above, the set of spring elements 162 can support the perimeter and the center of the substrate 102, and the substrate 102 and the cover layer 170 can form a substantially rigid structure in order to achieve a ratio of applied force to vertical displacement of the substrate 102 that is approximately consistent or that changes linearly across the total area of the touch sensor surface 172.

In another example, the system 100 includes the baseplate 166 including a set of spring elements 162: formed about a periphery of the baseplate 166; and facing the bottom layer 140 of the substrate 102. In particular, each spring element, in the set of spring elements 162: is arranged proximal a lateral edge of the baseplate 166; defines a first stage facing a support location, in the set of support locations, across the bottom layer 140 of the substrate 102; and is configured to yield to displacement of the substrate 102 downward toward the baseplate 166 responsive to forces applied to the touch sensor surface 172. In this example, the system 100 includes each spacer element: coupling an adjacent support location (e.g., via a spacer element), in the set of support locations, on the bottom layer 140 of the substrate 102; and is arranged adjacent a drive electrode, in the second set of electrodes 147 (e.g., drive electrodes), facing the substrate 102.

Therefore, the system 100 can: receive application of a touch input on the touch sensor surface 172 to yield (i.e., displace from a nominal plane) the set of spring elements 162 arranged below the substrate 102 resulting in a displacement of the substrate 102 toward the baseplate 166; and affect capacitance values between the first set of electrodes 146 (e.g., sense electrodes) and the second set of electrodes 147 (e.g., drive electrodes) based on the displacement. The system 100 can thus: read electrical values from the first set of electrodes 146 (e.g., sense electrodes) during the displacement of the substrate 102 and baseplate 166; and interpret force magnitudes applied on the touch sensor surface 172 based on the electrical values.

6.2.3 Spring Force

Furthermore, in the foregoing implementation, the system 100 can include: a first subset of spring elements 162—characterized by a first spring constant—coupled to a first subset of support locations proximal corners of the substrate 102; and a second subset of spring elements 162—characterized by a second spring constant less than the first spring constant—coupled to a second subset of support locations proximal edges of the substrate 102.

6.2.4 Individual Spring Elements

In another implementation, the system 100 includes a set of discrete spring elements arranged in (e.g., bonded to, press-fit into) individual spring receptacle 194s in the baseplate 166 and coupled (e.g., bonded to the bottom layer 140 of the substrate 102 across the set of support locations.

6.2.5 Preloaded Spring Elements

As described above, the substrate 102 can also be biased against the set of spring elements 162 of the baseplate 166 in order to: preload the spring elements; achieve a target nominal air gap between the set of sense electrode of the substrate 102 and the second set of electrodes 147 (e.g., drive electrodes) of the baseplate 166; and achieve baseline capacitance values that fall within sensible ranges for each capacitance sensor.

Thus, the system 100 can enable the controller 190 to detect each sense electrode moving both toward and away from their respective drive electrode on the baseplate 166 based on changes in capacitance, such as responsive to: a force applied to the touch sensor surface 172 over a capacitive sensor; and a force applied to the touch sensor surface 172 remote from the capacitive sensor.

6.3 Baseplate

Generally, the baseplate 166 is configured to: couple to the substrate 102 adjacent the set of spring elements 162; and effect capacitance values of the array of capacitance force sensors responsive to displacement of the substrate 102 toward the baseplate 166.

6.3.1 Drive Electrodes Structure

In one implementation, the system 100 includes a baseplate 166 that includes: a unitary structure that spans the bottom layer 140 of the substrate 102; and the second set of electrodes 147 (e.g., drive electrodes) arranged on a top layer 104 of the baseplate 166 vertically aligned to the first set of electrodes 146 (e.g., sense electrodes) on the bottom layer 140 of the substrate 102.

In one example, the second set of electrodes 147 (e.g., drive electrodes) includes a conductive trace—such as formed from conductive ink (e.g., Ag, C, Cu, etc.), conductive polymers (e.g., PEDOT: PSS), patternable conductive material (e.g., graphene, ITO, metal mesh), and/or rolled annealed metal—across the top layer 104 of the substrate 102 aligned with the first set of electrodes 146 (e.g., sense electrodes) on the bottom layer 140 of the substrate 102. In this example, the second set of electrodes 147 (e.g., drive electrodes) can be printed directly across the top layer 104 of the baseplate 166 and/or can be integrated into a rigid or flexible PCB layered over the top layer 104 of the baseplate 166. Thus, in this example, each drive electrodes can define a segment of the conductive trace-such as a continuous trace across the baseplate 166-configured to align with the first set of electrodes 146 (e.g., sense electrodes) across the bottom layer 140 of the substrate 102 in order to define the array of capacitive sensors.

Therefore, the system 100 can: drive the second set of electrodes 147 (e.g., drive electrodes)—such as by a target voltage (e.g., 6 volts), over a target time interval, and/or with an alternating voltage at a particular frequency—across the top layer 104 of the baseplate 166; and read a set of capacitance values—from the sense electrodes across the bottom layer 140 of the substrate 102 aligned with the second set of electrodes 147 (e.g., drive electrodes)—that represent measures of mutual capacitance in the array of capacitance force electrodes. As a result, the system 100 can increase the signal-to-noise ratio—such as by implementing drive voltages less than 6 volts—from the capacitance values read from the capacitance force sensors to interpret accurate magnitudes of force inputs applied to the touch sensor surface 172.

In another implementation, the second set of electrodes 147 (e.g., drive electrodes) includes: a first subset of drive electrodes arranged across a first region of the top layer 104 of the baseplate 166 and aligned with a first subset of sense electrodes arranged across the bottom layer 140 of the substrate 102; and a second subset of drive electrodes arranged across a second region of the top layer 104 of the baseplate 166 and aligned with a second subset of sense electrodes arranged across the bottom layer 140 of the substrate 102.

In one variation of this implementation, the first subset of drive electrodes and the second subset of drive electrodes can be connected by a single drive across the top layer 104 of the baseplate 166. Additionally, each sense electrode in the first subset of sense electrodes and the second subset of electrodes are individually connected to a sense line across the bottom layer 140 of the substrate 102.

In another variation of this implementation seen in FIGS. 4A and 4B, the first subset of drive electrodes and the second subset of drive electrodes are connected in pairs of drive lines across the top layer 104 of the substrate 102. Additionally, the first subset of sense electrodes can be connected by a first sense line and the second subset of sense electrodes can be connected by a second sense line across the bottom layer 140 of the substrate 102. Therefore, system 100 can selectively drive electrode pairs spanning particular regions of the touch sensor surface 172 and selectively read capacitance values from sense electrodes panning these particular regions of the touch sensor surface 172 to interpret inputs and force magnitudes over these particular regions.

For example, the first subset of drive electrodes includes a first conductive trace: spanning the first region on the top layer 104 of the baseplate 166; and defining first segments in alignment with the first subset of sense electrodes across the bottom layer 140 of the substrate 102. Furthermore, in this example, the second subset of drive electrodes includes a second conductive trace: spanning the second region on the top layer 104 of the baseplate 166; and defining second segments in alignment with the second subset of sense electrodes arranged across the bottom layer 140 of the substrate 102.

Therefore, the system 100 can, in response to detecting a touch input on the touch sensor surface 172 at the first region: drive the first subset of drive electrodes-such as by a target voltage (e.g., 6 volts), over a target time interval, and/or with an alternating voltage at a particular frequency—across the top layer 104 of the baseplate 166; and read a set of capacitance values—from the first subset of sense electrodes arranged across the bottom layer 140 of the substrate 102 and aligned with the first subset of drive electrodes—that represent measures of mutual capacitance in the array of capacitance force electrodes in the first region. As a result, the system 100 can selectively interpret magnitudes of force inputs applied across regions of the touch sensor surface 172 to increase accuracy of the capacitance values read from the sense electrodes while conserving power during scan cycles of the system 100.

6.3.2 Integral Baseplate and Spring Elements

In one implementation, the baseplate 166 defines a single unitary (e.g., metallic) structure: defining the second set of electrodes 147 (e.g., drive electrodes) and the set of spring elements 162 arranged across the top layer 104 of the baseplate 166; and arranged below the substrate 102. In this implementation, the unitary metallic structure can define: a nominal plane between a chassis 192 receptacle 194 and the substrate 102; and a set of capacitive coupling regions adjacent (e.g., aligned to, coaxial with) the set of support locations and the first set of electrodes 146 (e.g., sense electrodes) on the bottom layer 140 of the substrate 102.

In this implementation, each spring element: can be formed in the unitary metallic structure (e.g., by etching, laser cutting); can extend from its adjacent capacitive coupling region; can define a stage coupled to the corresponding support location on the bottom layer 140 for the substrate 102 (e.g., via a spacer element); and can be configured to return approximately the nominal plane in response to absence of a touch input applied to the touch sensor surface 172.

Additionally, in this implementation the second set of electrodes 147 (e.g., drive electrodes): can be formed in the unitary metallic structure (e.g., by a conductive trace printed on the baseplate 166); can be located proximal its adjacent capacitive coupling region; and can be configured to capacitively couple the sense electrodes on the bottom layer 140 of the substrate 102 to define the set of capacitive force sensors.

In the foregoing implementation, the unitary structure can be rigidly mounted to the chassis 192 of a computing device to therefore: rigidly locate the capacitive coupling regions relative to the substrate 102 and within a nominal plane; and enable the stages of the spring elements to move vertically relative to the nominal plane and the capacitive coupling regions defined by the unitary metallic structure.

Thus, each sense electrode on the bottom layer 140 of the substrate 102 can: capacitively couple to an adjacent drive electrode on an adjacent capacitive coupling region on the unitary metallic structure; and move toward this adjacent capacitive coupling region in response to application of a force on the touch sensor surface 172 proximal the capacitance force sensor, which changes the capacitance value of the capacitance force sensor proportional to compression of the adjacent spring element and therefore proportional to the portion of force carried by the spring element.

Furthermore, in this implementation, the unitary metallic structure can be fastened directly to the chassis 192 of the computing device. Alternatively, the unitary metallic structure can be mounted (e.g., fastened, riveted, welded, crimped) to a separate chassis 192 interface that is then fastened or otherwise mounted to the chassis 192.

6.3.3 Spacer Elements

As described in U.S. patent application Ser. No. 17/191, 631, which is incorporated in its entirety by this reference: the top layer 104 of the substrate 102 includes an array of drive and sense electrode pairs 105 arranged in a grid array and at a first density; and a bottom layer 140 of the substrate 102 includes a first set of electrodes 146 (e.g., a sparse perimeter array of sense electrodes, as described above) located proximal a perimeter of the substrate 102 at a second density less than the first density. In this implementation, the system 100 further includes a set of spacer elements 160 (e.g., short elastic columns or buttons, adhesive films) coupled to the bottom layer 140 of the substrate 102 at each support location, in the set of support locations, at the substrate 102 to support the substrate 102 on the chassis 192 of the device. In particular, each spacer element 160: is arranged (e.g., bonded) to a support location at the bottom layer 140 of the substrate 102 proximal a first set of electrodes 146 (e.g., sense electrode); and is configured to compress responsive to a load applied on the touch sensor surface 172 that compresses the spacer element 160 against the substrate 102 thereby effecting electrical values between the first electrode on the substrate 102 and the second electrode arranged below the substrate 102.

Accordingly, in this implementation, the controller 190 can: read a first set of electrical values—representing capacitive coupling between drive and sense electrode pairs 105—from the set of drive and sense electrode pairs 105; and detect a first input at a first location on the touch sensor surface 172 based on deviation of electrical values—read from a subset of drive and sense electrode pairs 105 adjacent the first location—from baseline capacitance values stored for this subset of drive and sense electrode pairs 105. During this same scan cycle, the controller 190 can also: read a second set of electrical values (e.g., capacitive coupling)—representing compression of the set of spacer elements 160—from the first set of electrodes 146; interpret a force magnitude of the first input based on magnitudes of deviations of electrical (e.g., capacitance) values from baseline electrical values across the set of electrodes; and drive an oscillating voltage across the multi-layer inductor 150 during a haptic feedback cycle in response to the force magnitude of the first input exceeding a threshold input force.

Generally, in this configuration, the set of spacer elements 160: are interposed between the bottom layer 140 of the substrate 102 and the base of the receptacle 194; and vertically support the substrate 102 within the receptacle 194.

In one implementation, each spacer element 160 includes a coupon: bonded to the bottom face of the substrate 102 and to the base of the receptacle 194; and formed in a low-durometer or elastic material that deflects laterally (or "shears") to enable the substrate 102 to translate laterally within the receptacle 194 responsive to alternating magnetic coupling between the multi-layer inductor 150 and the set of magnetic elements during a haptic feedback cycle. In another implementation, each spacer element 160 includes: a coupon bonded to the bottom face of the substrate 102; and a bottom face coated or including a low-friction material configured to slide across the base of the receptacle 194 to enable the substrate 102 to translate laterally in the receptacle 194 during a haptic feedback cycle while also vertically supporting the substrate 102 over the receptacle 194. In yet another implementation and as described below, each spacer element 160 is mounted to a spring or flexure element—which is mounted to the chassis 192—that enables the spacer element 160 to move laterally within the receptacle 194 while vertically supporting the substrate 102 within the receptacle 194.

In this configuration, the bottom conductive layer of the substrate 102 can include a pair of drive and sense electrodes proximal each spacer element location about the perimeter of the substrate 102 to form a force sensor. The controller 190 can thus: read an electrical value (or a voltage representing electrical resistance) across the force sensor proximal the spacer element location; and transform this electrical value into a force magnitude carried from the touch sensor surface 172. In particular, the system 100 can include multiple spacer elements 160, and the controller 190 can: read electrical values from electrodes proximal each spacer element location; convert these electrical values into force magnitudes carried by each spacer element 160; and aggregate these force magnitudes into a total force magnitude of an input on the touch sensor surface 172.

Therefore, in this configuration, the substrate 102 can define a unitary structure including a dense array of drive and sense electrode pairs 105 that form a touch sensor, a column of spiral traces that form a multi-layer inductor 150, and a sparse array of drive and sense electrode pairs 105 that form a set of force sensors that support the substrate 102 on the chassis 192.

6.4 Force Flex Layers

In one implementation, the system 100 includes: the first set of electrodes 146 (e.g., sense electrodes) arranged (e.g., printed) across a first force flex layer 152 (e.g., flexible PET layer) and the second set of electrodes 147 (e.g., drive electrodes) arranged (e.g., printed) across a second force flex layer 154 (e.g., flexible PET layer) parallel and offset the first force flex layer 152 to define the set of force sensors. In particular, the system 100 includes: the first force flex layer 152 arranged (e.g., bonded) to a bottom surface of the substrate 102; and the second force flex layer 154 arranged (e.g., bonded) to a top surface of the baseplate 166 facing the bottom surface of the substrate 102. Thus, when the substrate 102 and baseplate 166 are arranged in parallel within the chassis 192 and/or receptacle 194, the first set of electrodes 146 (e.g., sense electrodes) across the substrate 102 align with the second set of electrodes 147 (e.g., drive electrodes) across the baseplate 166 to form the set of force sensors below the touch sensor surface 172.

In one example, the first force flex layer 152: defines a rectangular geometry cooperating with the bottom layer 140 of the substrate 102; and includes the first set of electrodes 146 (e.g., sense electrodes) positioned about a periphery of the first force flex layer 152. Accordingly, when the first force flex layer 152 is arranged (e.g., bonded) across the bottom surface of the substrate 102, the first set of electrodes (e.g., sense electrodes) are located (e.g., encircle) proximal the set of support locations across the substrate 102. Similarly, the second force flex layer 154: defines a rectangular geometry cooperating with the top surface of the baseplate 166; and includes the second set of electrodes 147 (e.g., drive electrodes) positioned about a periphery of the second force flex layer 154. Accordingly, when the second force flex layer 154 is arranged (e.g., bonded) across the baseplate 166, the second set of electrodes 147 (e.g., drive electrodes) are located (e.g., encircle) proximal the set of spring elements 162 across the substrate 102 that align with the support locations on the substrate 102.

Therefore, the system 100 can include: the baseplate 166 arranged within a chassis 192 and/or receptacle 194; and the substrate 102 coupled to the baseplate 166 (e.g., via spacer elements) to locate the first force flex layer 152 on the substrate 102 in parallel and offset from the second force flex layer 154 on the baseplate 166 to form the set of force sensors.

In the aforementioned implementation, the first set of electrodes 146 (e.g., sense electrodes) defines a first set of conductive traces: arranged (e.g., etched) across the first force flex layer 152; and extending across a first tail connected to the first force flex layer 152. In this implementation, the first tail can be electrically connected to a controller 190 mounted on the substrate 102 (e.g., via SMT). Similarly, the second set of electrodes 147 (e.g., drive electrodes) defines a second set of conductive traces: arranged (e.g., etched) across the second force flex layer 154; and extending across a second tail connected to the second force flex layer 154. The system 100 can then include the second tail: connected to an external controller 190 (e.g., driver) separate from the first force flex layer 152; and/or extending toward the substrate 102 to couple the controller 190 arranged on the substrate 102. The system 100 can then drive the second set of electrodes 147 (e.g., drive electrodes) to capacitively couple the first set of electrodes 146 (e.g., sense electrodes) to form the first set of force sensors below the touch sensor surface 172.

7. Ground Plane Geometry and Shielding

The substrate 102 can further include a shielding trace fabricated in a conductive layer and configured to shield the touch sensor from electrical noise generated by the multi-layer inductor 150, such as during and after a haptic feedback cycle.

In one implementation, the substrate 102 further includes an intermediate layer 106 interposed between: the top layer 104, which contains the drive and sense electrode pairs 105; and the first inductor layer 110 of the substrate 102 that contains the topmost spiral trace of the multi-layer inductor 150. In this implementation, the intermediate layer 106 can include a contiguous trace area that defines an electrical shield 107 configured to shield the set of drive and sense electrode pairs 105 of the touch sensor from electrical noise generated by the multi-layer inductor 150 when driven with an oscillating voltage by the controller 190 during a haptic feedback cycle. In particular, the controller 190 can drive the electrical shield 107 in the intermediate layer 106 to a reference voltage potential (e.g., to ground, to an intermediate voltage), such as: continuously throughout operation; or intermittently, such as during and/or slightly after a haptic feedback cycle. Thus, when driven to the reference potential, the electrical shield 107 can shield the drive and sense electrode pairs 105 of the touch sensor in the top layer 104 from electrical noise.

Furthermore, as shown in FIG. 1, the electrical shield 107 can include a cleft—such as in the form of a serpentine break across the width of the electrical shield 107—in order to prevent circulation of Eddy currents within the electrical shield 107, which may otherwise: create noise at the drive and sense electrode pairs 105 in the touch sensor above; and/or induce a second magnetic field opposing the magnetic field generated by the multi-layer inductor 150, which may brake oscillation of the substrate 102 during a haptic feedback cycle.

Additionally or alternatively, in the configuration described above in which the system 100 includes electrodes 146 at deflection spacer locations on the bottom layer 140 of the substrate 102, the first inductor layer 110 on the substrate 102—arranged below the top layer 104 and/or the intermediate layer 106 and containing the first spiral trace 111 of the multi-layer inductor 150—can include an electrical shield 107 separate from and encircling the first spiral trace 111. In this implementation, the controller 190 can drive both this electrical shield 107 in the first inductor layer 110 and the multi-layer inductor 150 to a reference voltage potential (e.g., to ground, to an intermediate voltage)—outside of haptic feedback cycles—in order to: shield these electrodes 146 from electrical noise from outside of the system 100; and/or shield the drive and sense electrode pairs 105 in the touch sensor from electrical noise generated by these electrodes 146. Therefore in this implementation, the first inductor layer 110 of the substrate 102—containing the first spiral trace 111 of the multi-layer inductor 150—can further include a shield electrode trace 112 adjacent and offset from the first spiral trace 111; and the controller 190 can drive the shield electrode trace 112 and the first spiral trace 111 to a reference potential in order to shield the first set of electrodes 146—at the spacer element locations—from electrical noise when reading electrical values from these electrodes 146.

For example, in this implementation, the controller 190 can drive the multi-layer inductor 150 (or a topmost spiral trace in the multi-layer inductor 150) at a virtual ground potential while scanning and processing resistance (or capacitance) data from drive and sense electrode pairs 105 in the touch sensor in the top conductive layer(s) of the substrate 102 during a scan cycle. The controller 190 can subsequently: detect an input on the touch sensor surface 172 based on a change in resistance (or capacitance) values read from drive and sense electrode pairs 105 in the touch sensor; release the multi-layer inductor 150 from the virtual reference potential; and polarize the multi-layer inductor 150 via a time-varying current signal during a haptic feedback cycle responsive to detecting this input on the touch sensor surface 172. More specifically, the controller 190 can: ground the electrical shield 107 and the multi-layer inductor 150 during a scan cycle in order to shield the touch sensor from electronic noise; and pause scanning of the touch sensor during haptic feedback cycles (e.g., while the multi-layer inductor 150 is polarized) in order to avoid generating and responding to noisy touch images during haptic feedback cycles.

Thus, in this variation, power electronics (e.g., the multi-layer inductor 150) and sensor electronics in both high- and low-resolution sensors (e.g., drive and sense electrode pairs 105 in the touch sensor and electrodes 146 at the spacer element locations, respectively) can be fabricated on a single, unitary substrate 102, thereby eliminating manufacture and assembly of multiple discrete substrates for different haptic feedback and touch-sensing functions and enable the system 100 to perform touch sensing, force-sensing, and haptic feedback functions in a thinner package.

8. Controller

During operation, the controller 190 can: detect application of an input on the touch sensor surface 172 based on changes in electrical (e.g., capacitance or resistance, etc.) values between drive and sense electrode pairs 105 in the touch sensor integrated into the top layer(s) 104 of the substrate 102; characterize a force magnitude of the input based on these electrical values read from the touch sensor and/or based on electrical values read from electrodes 146 in the spacer elements 160 integrated into the bottom layer(s) 140 of the substrate 102; and/or interpret the input as a "click" input if the force magnitude of the input exceeds a threshold force magnitude (e.g., 160 grams). Then, in response to detecting the input and/or interpreting the input as a "click" input, the controller 190 can execute a haptic feedback cycle, such as by transiently polarizing the multi-layer inductor 150 in order to induce alternating magnetic coupling between the multi-layer inductor 150 and the set of magnetic elements and thus vibrating the substrate 102 within the chassis 192, serving haptic feedback to a user, and providing the user with tactile perception of downward travel of the touch sensor surface 172 analogous to depression of a mechanical momentary switch, button, or key.

8.1 Controller and Operation: Force Sensing

Generally, the system 100 includes the controller 190 configured to, during a scan cycle: read a set of capacitance values—from the array of capacitance force sensors—representing compression of the set of spring elements 162 between the baseplate 166 and the substrate 102; and interpret a distribution of forces applied to the touch sensor surface 172 during the scan cycle based on this set of capacitance values and force models representing spring constants of the set of spring elements 162.

In one example, during a first time period in a setup routine or calibration cycle in which no touch input is applied to the touch sensor surface 172, the controller 190 can read capacitance values from the array of capacitive force sensors and store these capacitance values as baseline capacitances—corresponding to absence of a touch input on the touch sensor surface 172—for these pressure sensors. Furthermore, during a second time period in the setup routine or calibration cycle in which a touch input is applied (e.g., with a stylus or finger) to a first region of the touch sensor surface 172 proximal a first spring element: the first spring element yields (i.e., displaces from a nominal plane) to the touch input; and the substrate 102 advances toward the baseplate 166—thus advancing the sense electrode on the substrate 102 toward the drive electrode on the baseplate 166—by a distance proportional to a force magnitude of the touch input.

Accordingly, the controller 190 can then: read a first capacitance value from the first capacitance force sensor during a scan cycle spanning a first time period; calculate a first change in capacitance at the first capacitance force sensor during the first time period based on a difference between the first capacitance value and a stored baseline capacitance value from the first capacitance force sensor; and interpret a portion of the force magnitude of the touch input carried by the first spring element based on (e.g., proportional to) the first change in capacitance value and a stored force model that relates deviation from baseline capacitance to force carried by the first spring element (e.g., based on a spring constant of the first spring element).

In this example, the controller 190 can implement this process for each other discrete capacitance force sensor of the system 100 in order to transform changes in capacitance values detected at each pressure sensor into portion of the total force magnitude of the touch input carried by each spring element during the scan cycle. The controller 190 can then sum these portions to calculate the total force magnitude of the touch input during the first time period. Additionally or alternatively, the controller 190 can fuse these portions of the force magnitude carried by each capacitance force sensor, the known positions of the capacitance force sensors in the system 100, and locations of multiple concurrent, discrete inputs detected on the touch sensor surface 172 via the capacitive touch sensor in order to estimate the force applied by each discrete input.

In another example, the system 100 can: access a force model representing a relationship between a deviation of from a baseline electrical value (e.g., capacitive value) and a force carried a spring element based on a spring constant of the spring element; and interpret the force magnitude of the touch input based on the set of electrical values and the force model. In another example, the system 100 can interpret the force magnitude of the touch input on the touch sensor surface 172 based on: a lateral position and a longitudinal position of the touch input; deviations of the set of electrical values from baseline electrical values across the first set of electrodes 146 (e.g., sense electrodes); and locations of spring elements, in the set of spring elements 162, coupled to the substrate 102.

8.2 Negative Force

In one implementation, the controller 190 implements similar methods and techniques to detect both increases and decreases in forces carried by the array of capacitance force sensors during a scan cycle based on decreases and increases in capacitance, respectively, detected across the array of capacitance sensors. More specifically, application of a force on the touch sensor surface 172 proximal a first corner of the touch sensor surface 172 may both: depress this first corner of the touch sensor surface 172 into the chassis 192; and cause a second, opposite corner of the substrate 102 to lift out of the chassis 192; thereby increasing a force carried by capacitance force sensors adjacent the first corner and reducing a force carried by capacitance force sensors adjacent the second corner.

Therefore, the controller 190 can: detect both increases and decreases in capacitance at the first and second capacitive force sensors in the first and second corners of the substrate 102; interpret positive and negative changes in force carried by the first and second pressure sensors from these increases and decreases in capacitance at the first and second pressure sensors; and combine (e.g., sum) these positive and negative changes in carried forces in order to calculate an accurate total force applied proximal the first corner of the touch sensor surface 172 during the scan cycle.

In one example, the system 100 includes a substrate 102 including: a first support location arranged proximal a first lateral edge of the substrate 102; and a first subset of electrodes, in the first set of electrodes 146 (e.g., sense electrodes) arranged proximal the first location. Additionally, the substrate 102 includes: a second support location arranged proximal a second lateral edge, opposite the first lateral edge, of the substrate 102; and a second subset of electrodes, in the first set of electrodes 146 (e.g., sense electrodes) arranged proximal the second support location. The system 100 also includes the second set of electrodes 147 (e.g., drive electrodes) including: a third subset of electrodes arranged below the first subset of electrodes to form a first force sensor proximal the first lateral edge of the touch sensor surface 172; a fourth subset of electrodes arranged below the second subset of electrodes to form a second force sensor proximal the second lateral edge, opposite the first lateral edge, of the touch sensor surface 172. The system 100 can then: read a first set of electrical values from the first force sensor proximal the first lateral edge of the touch sensor surface 172; and, in response to the first set of electrical values deviating in a first direction from baseline electrical values for the first force sensor, interpret a first compressive force carried at the first support location. Furthermore, the system 100 can: read a second set of electrical values from the second force sensor; and, in response to the second set of electrical values deviating in a second direction, opposite the first direction, from baseline electrical values for the second force sensor, interpret a second tensile force carried at the second support location. Therefore, the system 100 can: interpret the force magnitude of the first touch input applied to the touch sensor surface 172 based on a combination of the first compressive force and the second tensile force.

8.3 Device Wake-Up

In another implementation, the controller 190 can execute scan cycles in order to detect an input on the touch sensor surface 172 and wake a device from a low-power mode. In this implementation, the controller 190 can execute a scan cycle to: detect an input on the touch sensor surface 172; read a set of electrical values from the sense electrodes arranged about the bottom layer 140 of the substrate 102; interpret a force magnitude for the touch input based on the set of electrical values; and in response to this force magnitude exceeding a force threshold, discontinue the device low-power mode to allow for a user to fully operate the device.

9. Haptic Feedback Cycle

In this variation, the multi-layer inductor 150—integrated into the substrate 102- and the set of magnetic elements— housed within the chassis 192 below the multi-layer inductor 150—cooperate to define a compact, integrated multi-layer inductor 150 configured to oscillate the substrate 102 and the touch sensor surface 172 responsive to polarization of the multi-layer inductor 150 by the controller 190 (e.g., in response detecting touch inputs on the touch sensor surface 172). More specifically, the controller 190, in conjunction with a drive circuit, can supply an alternating (i.e., time-varying) drive current to the multi-layer inductor 150 during a haptic feedback cycle, thereby generating a time-varying magnetic field through the multi-layer inductor 150 that periodically reverses direction. Thus, the controller 190 and/or the drive circuit can transiently polarize the multi-layer inductor 150 to generate magnetic forces between the multi-layer inductor 150 and the set of magnetic elements, thereby causing the multi-layer inductor 150 (and thus the substrate 102 and touch sensor surface 172) to be alternately attracted and repelled by poles of the set of magnetic elements and oscillating the touch sensor surface 172 relative to the chassis 192, as shown in FIGS. 16 and 17.

Figure 16:
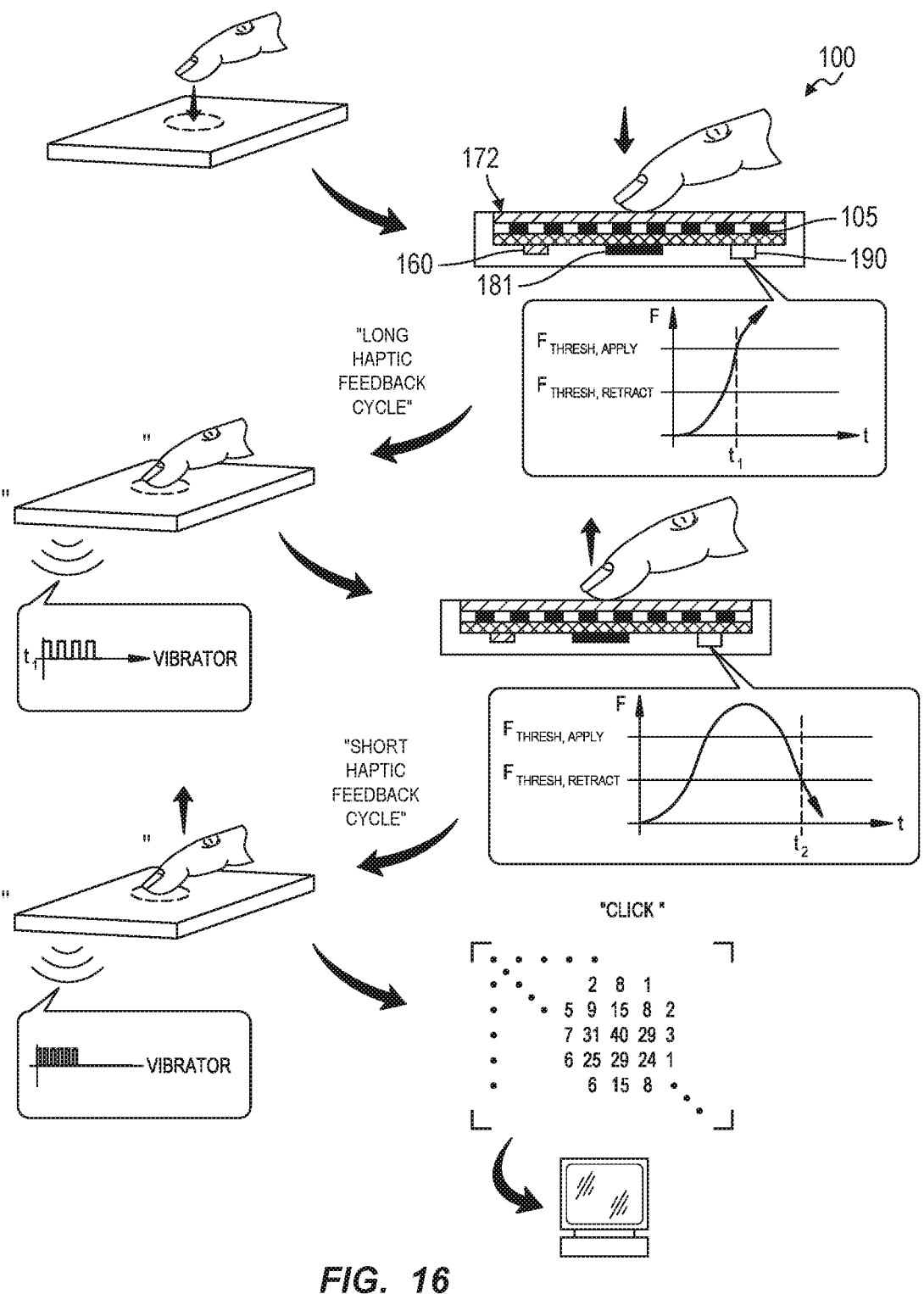
FIG. 16 is a flowchart representation of one variation of the system.
Figure 17:
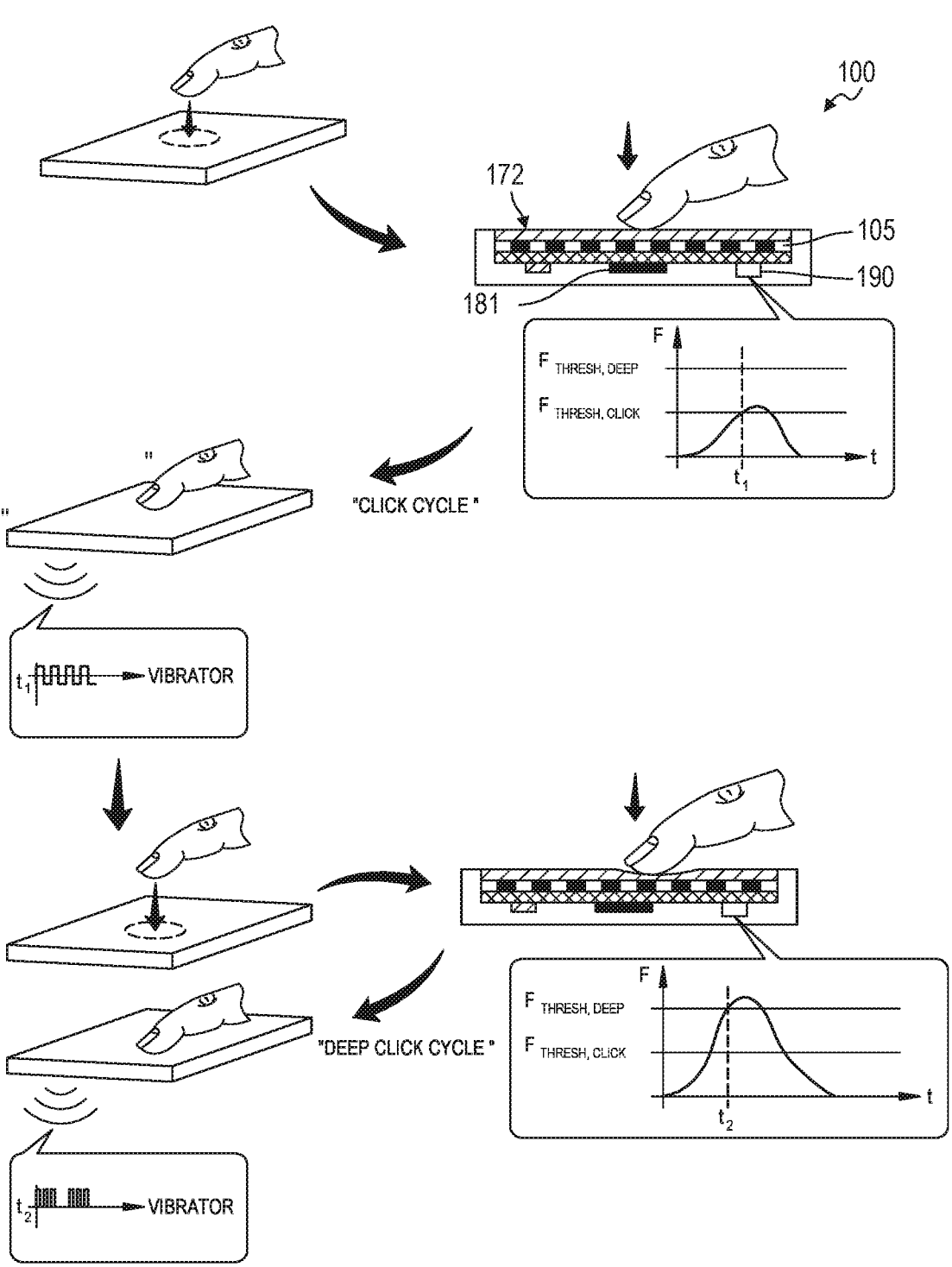
FIG. 17 is a flowchart representation of one variation of the system.
Figure 18:
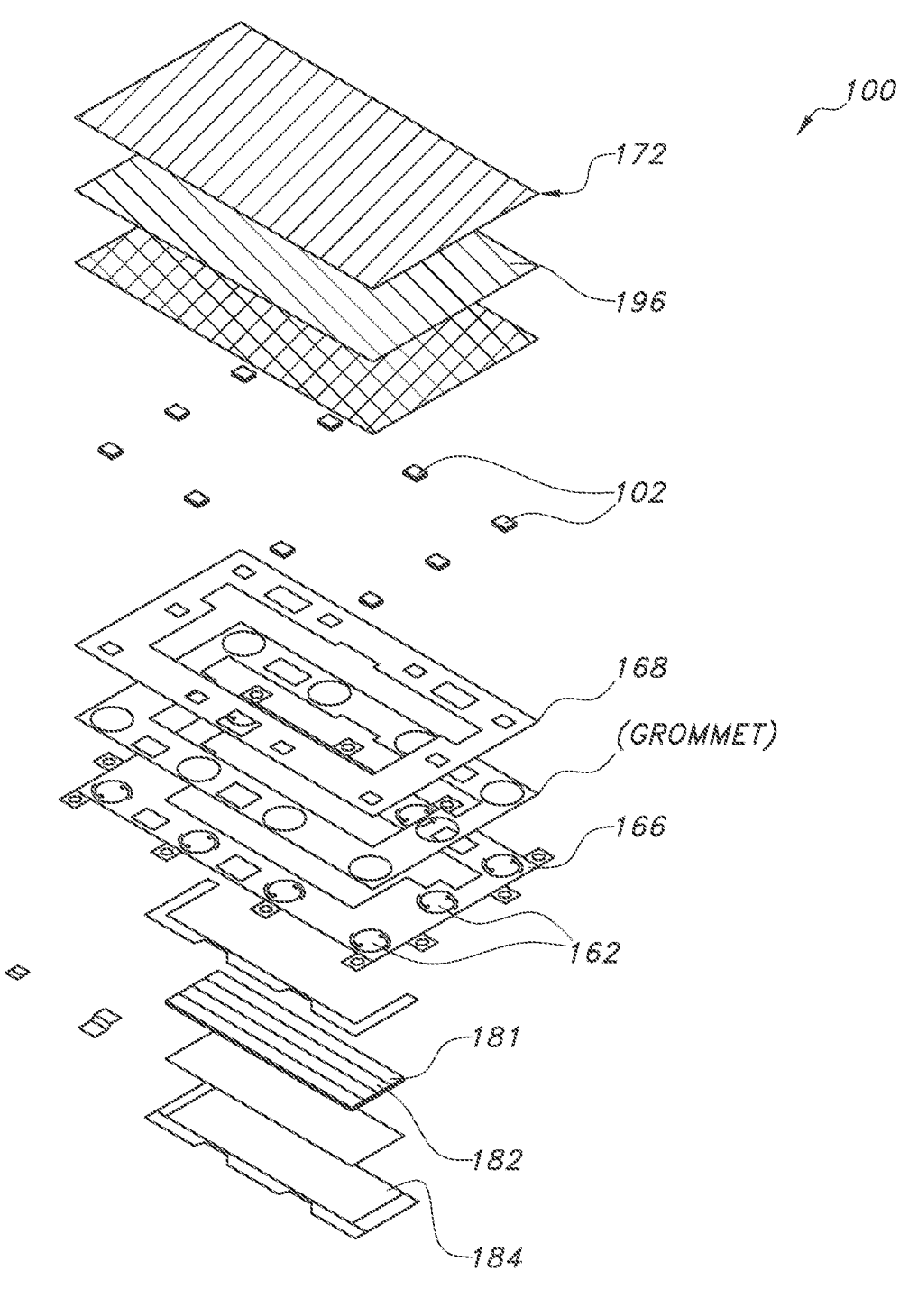
FIG. 18 is a schematic representation of one variation of the system.
Figure 19:
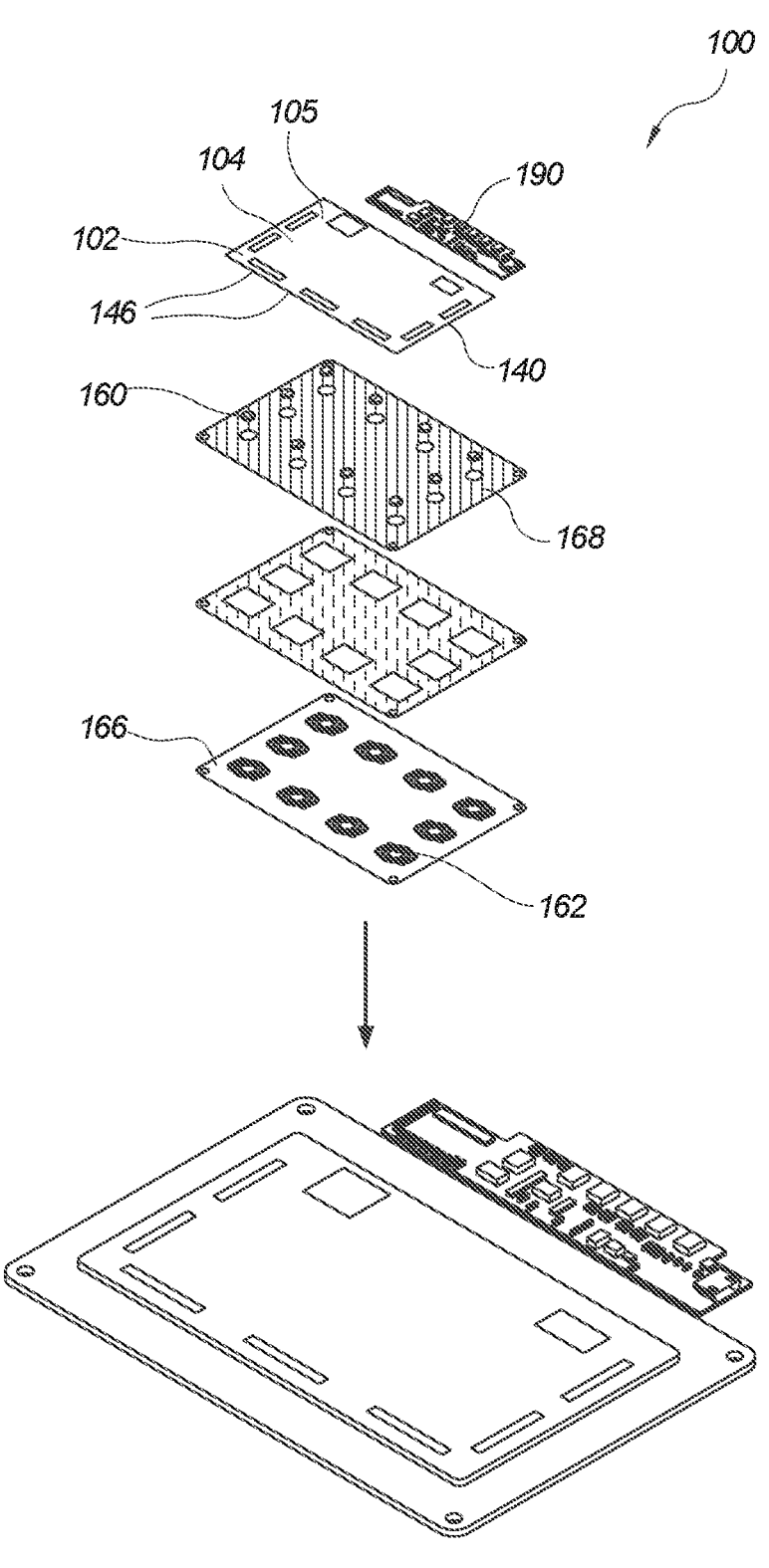
FIG. 19 is a schematic representation of one variation of the system.
Figure 20:
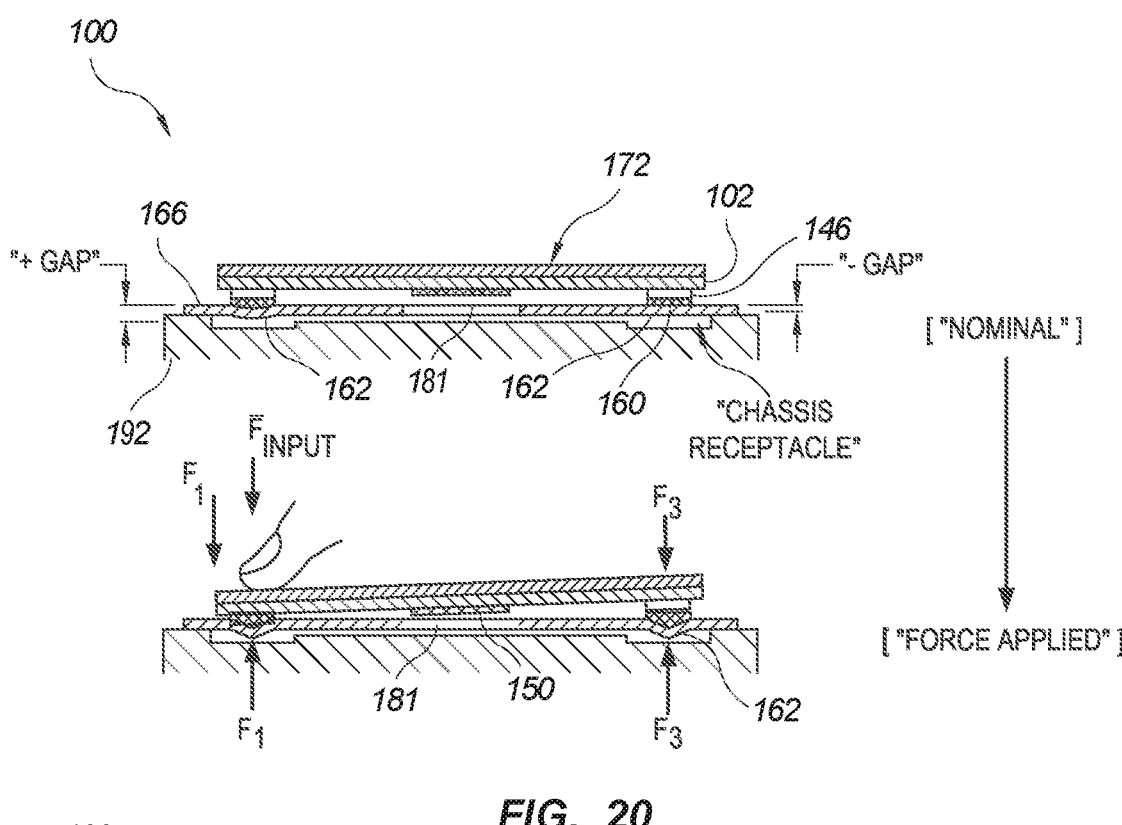
FIG. 20 is a flowchart representation of one variation of the system.
Figure 21:
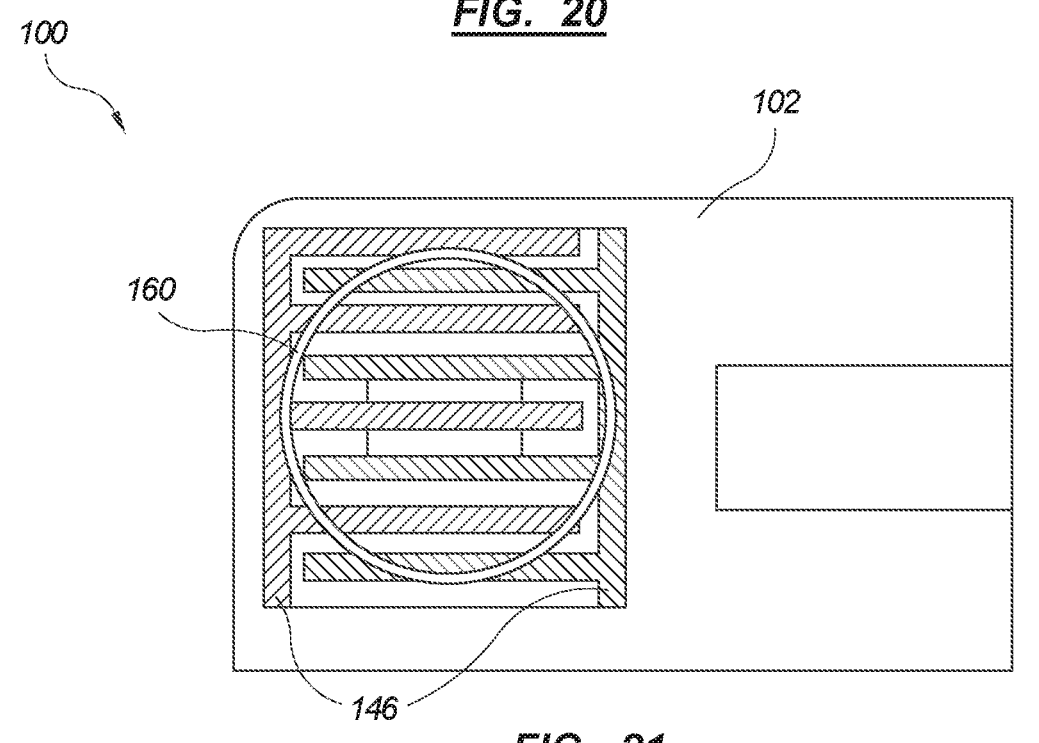
FIG. 21 is a schematic representation of one variation of the system.

In particular, in response to detecting a touch input—on the touch sensor surface 172—that exceeds a threshold force (or pressure) magnitude, the controller 190 drives the multi-layer inductor 150 during a "haptic feedback cycle" in order to tactilely mimic actuation of a mechanical snap button, as shown in FIGS. 16 and 17. For example, in response to such a touch input, the controller 190 can trigger a motor driver to drive the multi-layer inductor 150 with a square-wave alternating voltage for a target click duration (e.g., 250 milliseconds), thereby inducing an alternating magnetic field through the multi-layer inductor 150, which magnetically couples to the set of magnetic elements, induces an oscillating force between the magnetic element and the multi-layer inductor 150, and oscillates the substrate 102 relative to the chassis 192 of the device.

9.1 Standard Click and Deep Click

In one variation, the controller 190: executes a "standard-click haptic feedback cycle" in Blocks S110 and S120 in response to application of a force that exceeds a first force magnitude and that remains less than a second force threshold (hereinafter a "standard click input"); and executes a "deep haptic feedback cycle" in Blocks S114 and S124 in response to application of a force that exceeds the second force threshold (hereinafter a "deep click input"). In this variation, during a deep haptic feedback cycle, the controller 190 can drive the multi-layer inductor 150 for an extended duration of time (e.g., 750 milliseconds), at a higher amplitude (e.g., by driving the haptic feedback cycle at a higher peak-to-peak voltage), and/or at a different (e.g., lower) frequency in order to tactilely indicate to a user that a deep click input was detected at the touch sensor surface 172.

In one example, the controller 190 can: output a left-click control command and execute a standard-click haptic feedback cycle in response to detecting an input of force magnitude between a low "standard" force threshold and a high "deep" force threshold; and output a right-click control command function and execute a deep-haptic feedback cycle in response to detecting an input of force magnitude greater than the high "deep" force threshold. The system 100 can therefore: detect inputs of different force magnitudes on the touch sensor surface 172; assign an input type to an input based on its magnitude; serve different haptic feedback to the user by driving the multi-layer inductor 150 according to different schema based on the type of a detected input; and output different control functions based on the type of the detected input.

9.2 Hysteresis

In one variation, the controller 190 implements hysteresis techniques to trigger haptic feedback cycles during application and retraction of a single input on the touch sensor surface 172. In particular, in this variation, the controller 190 can selectively: drive the multi-layer inductor 150 according to a "down-click" oscillation profile during a haptic feedback cycle in response to detecting a new input—of force greater than a high force threshold (e.g., 165 grams)— applied to the touch sensor surface 172; track this input in contact with the touch sensor surface 172 over multiple scan cycles; and then drive the multi-layer inductor 150 according to an "up-click" oscillation profile during a later haptic feedback cycle in response to detecting a drop in force magnitude of this input to less than a low force threshold (e.g., 60 grams). Accordingly, the system 100 can: replicate the tactile "feel" of a mechanical snap button being depressed and later released; and prevent "bouncing" haptic feedback when the force magnitude of an input on the touch sensor surface 172 varies around the force threshold.

More specifically, when the force magnitude of an input on the touch sensor surface 172 reaches a high force threshold, the controller 190 can execute a single "down-click" haptic feedback cycle—suggestive of depression of a mechanical button—until the input is released from the touch sensor surface 172. However, the controller 190 can also execute an "up-click" haptic feedback cycle—suggestive of release of a depressed mechanical button—as the force magnitude of this input drops below a second, lower threshold magnitude. Therefore, the controller 190 can implement hysteresis techniques to prevent "bouncing" in haptic responses to the inputs on the touch sensor surface 172, to indicate to a user that a force applied to the touch sensor surface 172 has been registered (i.e., has reached a first threshold magnitude) through haptic feedback, and to indicate to the user that the user's selection has been cleared and force applied to the touch sensor surface 172 has been registered (i.e., the applied force has dropped below a second threshold magnitude) through additional haptic feedback.

10. Multiple Multi-layer Inductors

In one variation, the system 100 can also include multiple multi-layer inductor 150 and magnetic element pairs. In one example, the system 100 includes: a first multi-layer inductor 150 arranged proximal a first edge of the substrate 102; and a first magnetic element 181 arranged in the chassis 192 under the first multi-layer inductor 150 and thus proximal the first edge of the substrate 102. In this example, the system 100 can also include: a second magnetic element 182 rigidly coupled to the chassis 192 and offset from the first magnetic element 181; and a second inductor coupled to the substrate 102 below the touch sensor surface 172, arranged proximal a second edge of the substrate 102 opposite the first edge, and configured to magnetically couple to the second magnetic element 182. Furthermore, in this example, the controller 190 can: selectively polarize the first multi-layer inductor 150 responsive to detection of the touch input on the touch sensor surface 172 proximal the first edge of the substrate 102 to oscillate the substrate 102 in the vibration plane relative to the chassis 192 with peak energy perceived proximal this first edge of the substrate 102; and selectively polarize the second inductor responsive to detection of a second touch input on the touch sensor surface 172 proximal the second edge of the substrate 102 to oscillate the substrate 102 in the vibration plane relative to the chassis 192 with peak energy perceived proximal this second edge of the substrate 102.

In a similar implementation, the system 100 can include a first multi-layer inductor 150—as described above—and a second inductor/magnetic element pair that cooperates with the first inductor-magnetic element pair to oscillate the substrate 102. In this variation, the first inductor-magnetic element pair can include a coil mounted to the substrate 102 offset to the right of the center of mass of the substrate 102 by a first distance. The first inductor-magnetic element pair can also include an array of magnets aligned in a row under the multi-layer inductor 150. The array of magnets can cooperate with the multi-layer inductor 150 of the first inductor-magnetic element pair to define an axis of vibration of the first inductor-magnetic element pair. The second inductor-second magnetic element 182 pair can include a coil mounted to the substrate 102 offset to the left of the center of mass of the substrate 102 by a second distance. The second inductor-second magnetic element 182 pair can also include an array of magnets aligned in a row. The array of magnets can cooperate with the multi-layer inductor 150 of the second inductor-second magnetic element 182 pair to define an axis of vibration of the second inductor-second magnetic element 182 pair.

In one implementation, the array of magnets of the first inductor-magnetic element pair can be arranged in a row parallel the array of magnets of the second inductor-second magnetic element 182 pair such that the axis of vibration of the first inductor-magnetic element pair is parallel to the axis of vibration of the second inductor-second magnetic element 182 pair. In this implementation, the multi-layer inductor 150 of the first inductor-magnetic element pair can be mounted to the substrate 102 offset from the center of mass of the substrate 102 by the first distance equal to the second distance between the multi-layer inductor 150 of the second inductor-second magnetic element 182 pair and the center of mass. Therefore, a midpoint between the multi-layer inductor 150 of the first inductor-magnetic element pair and the multi-layer inductor 150 of the second inductor-second magnetic element 182 pair can be coaxial with the center of mass. Therefore, the first inductor-magnetic element pair and second inductor-second magnetic element 182 pair can cooperate to vibrate the substrate 102 along an overall axis of vibration that extends parallel the axis of vibration of the first magnet and the axis of vibration of the second magnet and through the center of mass of the substrate 102.

The controller 190 can drive the first inductor-magnetic element pair to oscillate the substrate 102 at a first frequency and the second inductor-second magnetic element 182 pair to oscillate at a similar frequency in phase with vibration of the first multi-layer inductor 150. Therefore, the first and second multi-layer inductors 150 can cooperate to oscillate the substrate 102 linearly along the overall axis of vibration.

However, the controller 190 can additionally or alternatively drive the first multi-layer inductor 150 to oscillate the substrate 102 at the first frequency and the second multi-layer inductor 150 to oscillate at a second frequency distinct from the first frequency and/or out of phase with vibration of the first multi-layer inductor 150. Therefore, the first and second multi-layer inductors 150 can cooperate to rotate the substrate 102—within a plane parallel the touch sensor surface 172—about the center of mass.

Additionally or alternatively, the controller 190 can selectively drive either the first multi-layer inductor 150 or the second multi-layer inductor 150 to oscillate at a particular time. The controller 190 can selectively (and exclusively) drive the first multi-layer inductor 150 to mimic a sensation of a click over a section of the substrate 102 adjacent the first multi-layer inductor 150. The controller 190 can alternatively drive the second multi-layer inductor 150 to mimic a sensation of a click over a section of the substrate 102 adjacent the second multi-layer inductor 150 while minimizing vibration over a section of the substrate 102 adjacent the first multi-layer inductor 150. For example, the controller 190 can selectively drive the first multi-layer inductor 150 to execute the haptic feedback cycle in order to mimic the sensation of a click on the right side of the substrate 102 (or a "right" click) while the second multi-layer inductor 150 remains inactive.

However, the controller 190 can also drive the first multi-layer inductor 150 to oscillate according to a particular vibration waveform. Simultaneously, the controller 190 can drive the second multi-layer inductor 150 to oscillate according to a vibration waveform out of phase (e.g., 180° out of phase) with the particular vibration waveform of the first multi-layer inductor 150. For example, the second multi-layer inductor 150 can output the vibration waveform of an amplitude smaller than the amplitude of the particular vibration waveform. In this example, the vibration waveform of the second multi-layer inductor 150 can also be 180° out of phase with the particular vibration waveform of the first multi-layer inductor 150. Therefore, the second multi-layer inductor 150 can be configured to counteract (or decrease the amplitude of) the particular vibration waveform output by the first multi-layer inductor 150.

11. Separate Inductor

In one variation, a region of the substrate 102 is routed or otherwise removed to form a shallow recess through a subset of layers of the substrate 102. For example, a three-layer-thick region of the substrate 102 proximal the lateral and longitudinal centers of the substrate 102 can be removed from the bottom face of the substrate 102. A discrete, thin, wire coil can be soldered to a set of vias exposed at a base of the recess and then installed (e.g., bonded, potted) within the recess such that the exposed face of the coil is approximately flush (e.g., within 100 microns) with the bottom face of the substrate 102.

Additionally or alternatively, the system 100 can include: a first integrated inductor fabricated across multiple layers of the substrate 102, as described; and a second coil arranged over and electrically coupled to the first integrated inductor and configured to cooperate with the first integrated inductor to form a larger inductor exhibiting greater magnetic coupling to the adjacent magnetic element. For example, the second coil can include: a multi-loop wire coil; or a second integrated inductor fabricated across multiple layers of a second substrate 102 that is then bonded and/or soldered to the (first) substrate 102 adjacent the first integrated inductor.

12. Waterproofing

Figure 9A:
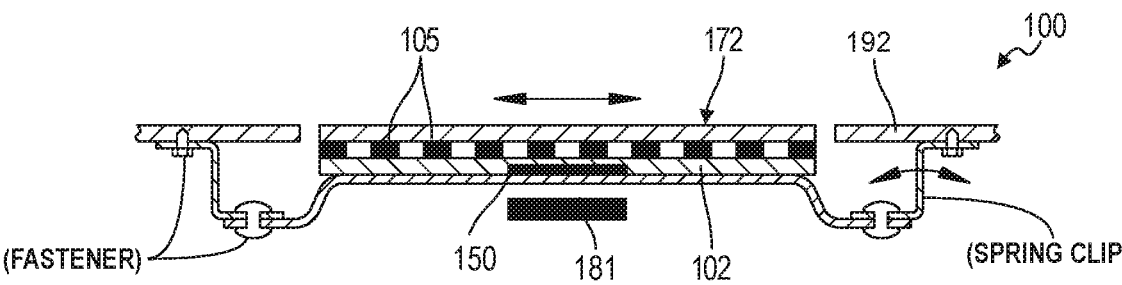
FIGS. 9A, 9B, 9C, and 9D are schematic representations of one variation of the system.
Figure 9B:
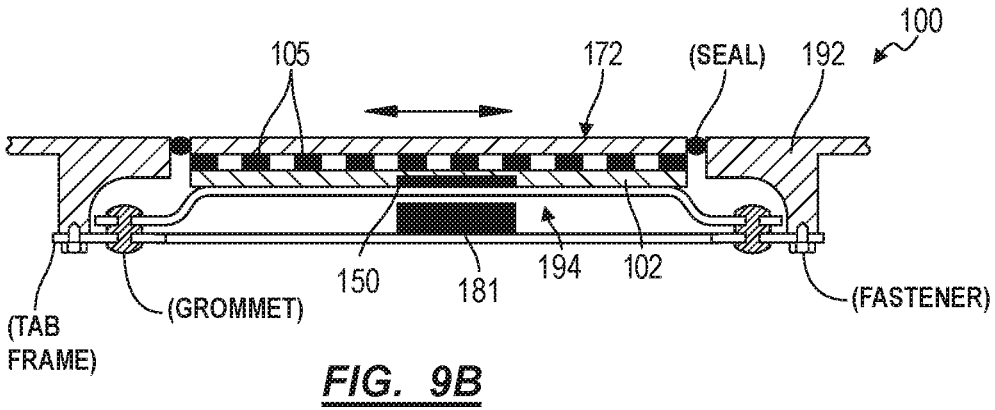
Figure 9C:
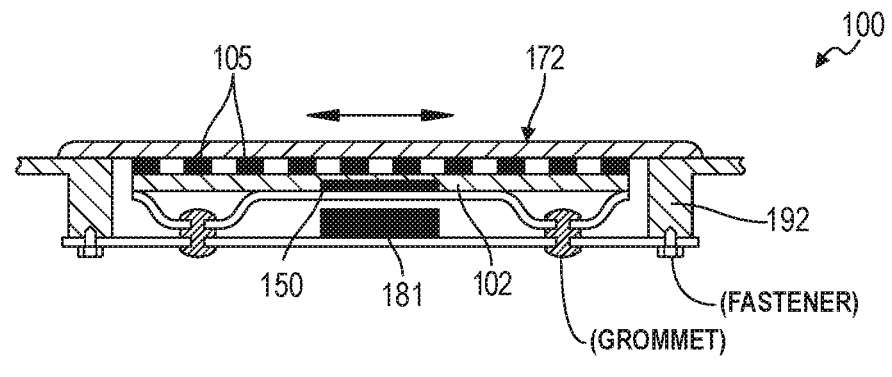
Figure 9D:
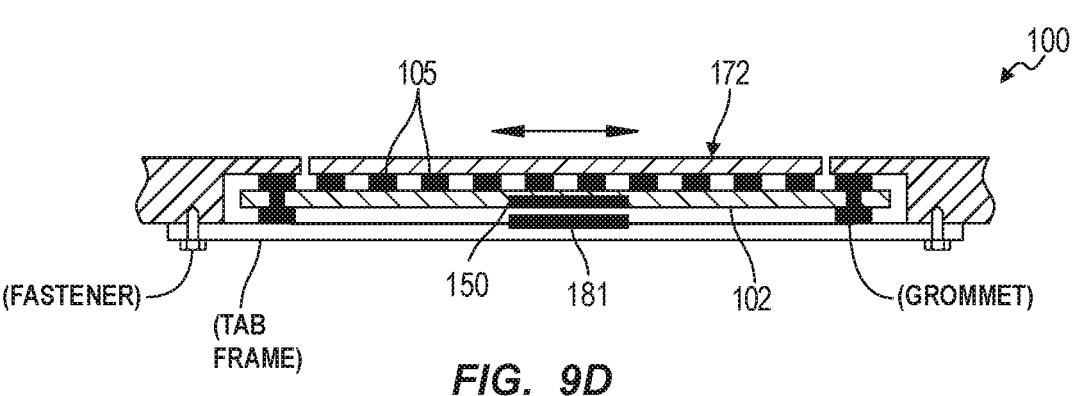
Figure 10:
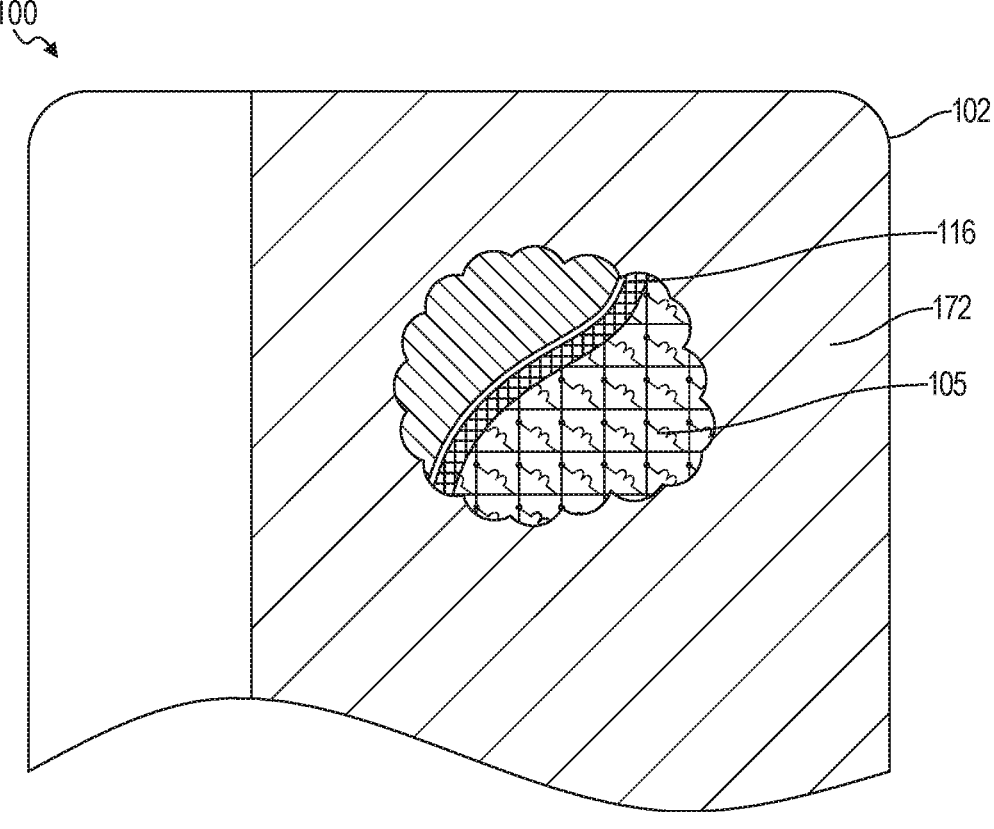
FIG. 10 is a schematic representation of one variation of the system.
Figure 11:
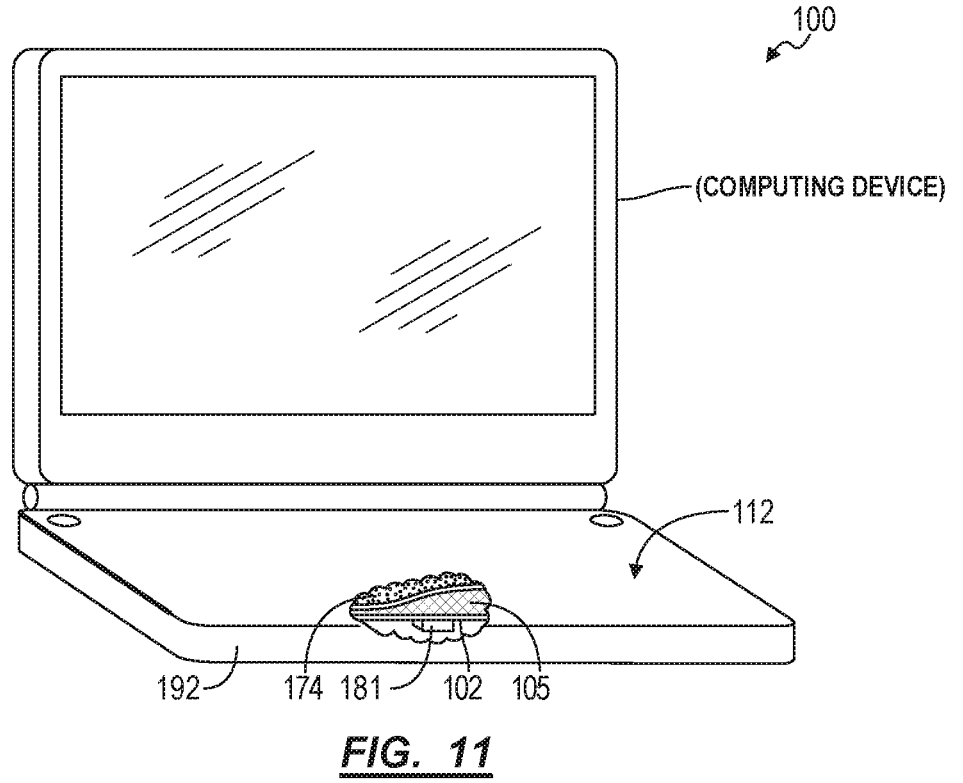
FIG. 11 is a schematic representation of one variation of the system.

In one variation shown in FIGS. 9A and 9B, a waterproofing membrane 164: is applied over the touch sensor; extends outwardly from the perimeter of the substrate 102; is bonded, clamped, or otherwise retained proximal a perimeter of the receptacle 194; and thus cooperates with the chassis 192 to seal the touch sensor, the substrate 102, and the spacer elements 160, etc. within the receptacle 194, thereby preventing moisture and particulate ingress into the receptacle 194 and onto the substrate 102.

For example, the waterproofing membrane 164 can include a silicone or PTFE (e.g., expanded PTFE) film bonded over the touch sensor with an adhesive. The system 100 can also include a glass or other cover layer 170 bonded over the waterproofing membrane 164 and extending up to a perimeter of the substrate 102.

Furthermore, the chassis 192 can define a flange (or "shelf," undercut) extending inwardly toward the lateral and longitudinal center of the receptacle 194. The outer section of the waterproofing member that extends beyond the substrate 102 can be inserted into the receptacle 194 and brought into contact with the underside of the flange. A circumferential retaining bracket or a secondary chassis 192 member can then be fastened to the chassis 192 under the flange and (fully) above the perimeter of the receptacle 194 in order to clamp the waterproofing membrane 164 between the chassis 192 and the circumferential retaining bracket or secondary chassis 192 member, thereby sealing the waterproofing membrane 164 about the receptacle 194.

In one implementation, the waterproofing membrane 164 includes a convolution between the perimeters of the substrate 102 and the receptacle 194. In this implementation, the convolution can be configured to deflect or deform in order to accommodate oscillation of the substrate 102 during a haptic feedback cycle. For example, the waterproofing membrane 164 can include a polyimide film with a semi-circular ridge extending along a gap between the outer perimeter of the substrate 102 and the inner perimeter of the receptacle 194.

In a similar implementation, the substrate 102 and the touch sensor are arranged over the waterproofing membrane 164, which is sealed against the chassis 192 along an underside of the receptacle 194 by a retaining bracket, as described above such that the touch sensor assembly is located fully above a waterproof barrier across the receptacle 194 and such that waterproof membrane oscillates to vibrate the touch sensor assembly when the multi-layer inductor 150 is actuated.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
a substrate comprising a first support location;
a touch sensor surface arranged over the substrate;
a first spring element:
    coupled to the substrate at the first support location; and
    configured to yield to displacement of the substrate responsive to forces applied on the touch sensor surface;
a first electrode arranged on the substrate opposite the touch sensor surface;
a second electrode:
    arranged below the substrate;
    facing and offset below the first electrode; and
    configured to cooperate with the first electrode to output an electrical signal representing a gap height between the first electrode and the second electrode; and
a controller configured to:
    access the electrical signal; and
    interpret a first force magnitude of a first touch input on the touch sensor surface based on the electrical signal;
wherein the first electrode:
    defines a first sense electrode;
    is arranged on a bottom layer of the substrate; and
    encircles the first support location; and
wherein the second electrode:
    defines a second drive electrode capacitively coupled to the first sense electrode;
    is arranged on a baseplate arranged below the substrate; and
    is aligned within the first electrode to form a first capacitive force sensor below the touch sensor surface.

2. The system of claim 1:
wherein the first electrode comprises a first sense electrode arranged proximal an edge of a bottom layer of the substrate;
wherein the second electrode comprises a second drive electrode arranged about a top surface of a baseplate in alignment with the first sense electrode; and
wherein the controller is configured to:
  read a first set of capacitance values between the first sense electrode on the substrate and the second drive electrode on the baseplate; and
  interpret the first force magnitude of the first touch input based on the set of capacitance values.

3. The system of claim 1:
wherein the substrate comprises an array of drive and sense electrode pairs interposed between the first electrode and the touch sensor surface; and
wherein the controller is configured to:
  read a second electrical signal from the array of drive and sense electrode pairs;
  detect a lateral position and a longitudinal position of the first touch input on the touch sensor surface based on the second electrical signal; and
  output the lateral position, the longitudinal position, and the first force magnitude of the first touch input.

4. The system of claim 1:
wherein the first spring element is arranged about an edge of a baseplate;
further comprising a first spacer element interposed between the substrate and the first spring element; and
wherein the second electrode is arranged proximal the first spring element and coaxial.

5. The system of claim 1, wherein the controller is configured to:
  access a force model representing a relationship between deviation from a baseline electrical signal and force carried by the first spring element based on a spring constant of the first spring element; and
  interpret the first force magnitude of the first touch input based on the electrical signal and the force model.

6. The system of claim 1:
wherein the substrate further comprises a second support location offset from the first support location;
further comprising:
  a second spring element:
    coupled to the substrate at the second support location; and
    configured to yield to displacement of the substrate responsive to forces applied on the touch sensor surface;
  a third electrode arranged on the substrate proximal the second support location; and
  a fourth electrode:
    arranged below the substrate;
    facing and offset below the third electrode; and
    configured to cooperate with the third electrode to output a second electrical signal representing a second gap height between the third electrode and the fourth electrode; and
wherein the controller is configured to:
  in response to the electrical signal deviating in a first direction from a first baseline electrical signal for the first electrode, interpret a first compressive force carried by the first spring element at the first support location;
  read a second electrical signal from the fourth electrode; in response to the second electrical signal deviating in a second direction, opposite the first direction, from a second baseline electrical signal for the third electrode, interpret a second tensile force carried by the second spring element; and
  interpret the first force magnitude of the first touch input based on a combination of the first compressive force and the second tensile force.

7. The system of claim 6:
wherein the second electrode and the fourth electrode are electrically coupled and arranged on a baseplate; and
wherein the controller is configured to, in response to detecting the first touch input at a first location proximal the first electrode on the substrate:
  drive a target voltage concurrently across the second electrode and the fourth electrode;
  read the electrical signal from the first electrode; and
  read the second electrical signal from the third electrode.

8. The system of claim 1:
wherein the substrate defines:
  the first support location proximal a first lateral edge of the substrate; and
  a second support location proximal a second lateral edge, opposite the first lateral edge, of the substrate;
further comprising:
  a third electrode arranged on the substrate proximal the second support location;
  a fourth electrode:
    arranged below the substrate;
    facing and offset below the third electrode; and
    configured to cooperate with the third electrode to output electrical signals representing a second gap height between the third electrode and the fourth electrode; and
wherein the controller is configured to:
  detect the first touch input at a first location within a first region of the touch sensor surface over the first support location of the substrate;
  read a second electrical signal from the third electrode at the second region of the touch sensor surface over the second support location of the substrate; and
  interpret the first force magnitude of the first touch input on the touch sensor surface within the first region based on a combination of the first electrical signal and the second electrical signal.

9. The system of claim 1:
wherein the substrate further comprises a set of layers comprising a set of spiral traces arranged across the set of layers to form a multi-layer inductor;
further comprising a first magnetic element defining a first polarity facing the multi- layer inductor;
wherein the controller is configured to, in response to the first force magnitude exceeding a target force magnitude, drive an oscillating voltage across the multi-layer inductor to:
  induce alternating magnetic coupling between the multi-layer inductor and the first magnetic element; and
  oscillate the substrate and the touch sensor surface relative the first magnetic element;
wherein the first spring element is configured to yield to magnetic coupling of the multi-layer inductor to the first magnetic element to enable the substrate and the touch sensor surface to oscillate.

10. The system of claim 1:
wherein the substrate comprises a set of support locations comprising the first support location;

further comprising a set of spring elements:
  comprising the first spring element;
  arranged below the substrate; and
  each spring element in the set of spring elements
    comprising a flexure:
    defining a stage; and
    configured to return to a nominal plane in response
      to absence of forces applied to the touch sensor
      surface; and
  further comprising a set of spacer elements, each spacer
    element in the set of spacer elements:
    interposed between and coupling a support location, in
      the set of support locations, on the substrate to a
      stage of a spring element, in the set of spring
      elements.
11. The system of claim 10, wherein the controller is
configured to interpret the first force magnitude of the first
touch input based on:
  a first lateral position and a first longitudinal position of
    the first touch input on the touch sensor surface;
  deviations of the electrical signal, read from the first
    electrode, from a baseline electrical signal; and
  locations of spring elements supporting the substrate.
12. A system comprising:
  a substrate comprising a set of support locations;
  a first set of electrodes arranged on the substrate and
    proximal the set of support locations;
  a touch sensor surface arranged over the substrate;
  a set of spring elements, each spring element in the set of
    spring elements:
    coupled to the substrate at a support location in the set
      of support locations; and
    configured to yield to downward displacement of the
      substrate responsive to forces applied to the touch
      sensor surface; and
  a second set of electrodes:
    arranged below the substrate;
    facing the first set of electrodes; and
    configured to cooperate with the first set of electrodes
      to output electrical signals representing gap heights
      between electrodes in the first set of electrode and
      electrodes in the second set of electrodes;
  wherein the set of spring elements comprises a unitary
    structure defining a nominal plane;
  wherein each spring element in the set of spring elements
    comprises a flexure:
    formed in the unitary structure;
    defining a stage; and
    configured to return to the nominal plane in response to
      absence of a touch input applied to the touch sensor
      surface; and
  further comprising a set of spacer elements, each spacer
    element in the set of spacer elements:
    interposed between and coupling a support location, in
      the set of support locations, on the substrate to a
      stage of a spring element, in the set of spring
      elements.
13. The system of claim 12, further comprising a con-
troller configured to:
  detect a first touch input at a first location on the touch
    sensor surface;
  read a set of electrical signals from the first set of
    electrodes; and
  interpret a first force magnitude of the first touch input
    based on the set of electrical signals.

38

14. The system of claim 12:
  wherein the first set of electrodes define a first set of sense
    electrodes;
  wherein the second set of electrodes define a second set of
    drive electrodes:
    arranged on a baseplate arranged below the substrate;
      and
    aligned to the first set of sense electrodes to form an
      array of capacitive force sensors below the touch
      sensor surface; and
  further comprising a controller configured to:
    read a set of capacitance values from the array of
      capacitive force sensors below the touch sensor
      surface; and
    interpret a first force magnitude of a first touch input
      based on the set of capacitance values.
15. The system of claim 12:
  further comprising an array of drive and sense electrode
    pairs arranged across a top layer of the substrate;
  wherein the touch sensor surface is arranged over the
    array of drive and sense electrode pairs; and
  further comprising a controller configured to:
    read electrical signals from the array of drive and sense
      electrode pairs;
    detect a lateral position and a longitudinal position of a
      first touch input on the touch sensor surface based on
      electrical signals from the array of drive and sense
      electrode pairs; and
    output the lateral position, the longitudinal position,
      and a first force magnitude of the first touch input.
16. The system of claim 12, further comprising:
  a third set of electrodes arranged on the substrate proxi-
    mal a second set of support locations; and
  a fourth set of electrodes:
    arranged below the substrate;
    facing the third set of electrodes; and
    configured to cooperate with the third set of electrodes
      to output electrical signals representing gap heights
      between the third set of electrodes and the fourth set
      of electrodes; and
  a controller configured to:
    in response to electrical signals, read from the first set
      of electrodes, deviating in a first direction from a first
      baseline electrical signal, interpret a first compres-
      sive force carried by a first spring element;
    in response to electrical signals, read from the third set
      of electrodes, deviating in a second direction, oppo-
      site the first direction, from a second baseline elec-
      trical signal, interpret a second tensile force carried
      by a second spring element; and
    interpret a first force magnitude of a first touch input
      based on a combination of the first compressive force
      and the second tensile force.
17. The system of claim 12, further comprising a con-
troller configured to:
  read a set of electrical signals from the first set of
    electrodes; and
  access a force model representing a relationship between
    deviation from a baseline electrical signal and force
    carried by a first spring element in the set of spring
    elements based on a spring constant of the first spring
    element; and
  interpret a first force magnitude of a first touch input
    based on the set of electrical signals and the force
    model.

* * * * *